(12) United States Patent
Kato

(10) Patent No.: US 6,388,974 B1
(45) Date of Patent: May 14, 2002

(54) RECORDING MEDIUM DRIVING APPARATUS

(75) Inventor: Kazunari Kato, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/413,313

(22) Filed: Oct. 6, 1999

(30) Foreign Application Priority Data

| | | |
|---|---|---|
| Oct. 19, 1998 | (JP) | 10-285660 |
| Feb. 15, 1999 | (JP) | 11-036007 |
| Jun. 2, 1999 | (JP) | 11-155726 |
| Jun. 2, 1999 | (JP) | 11-155727 |
| Jun. 2, 1999 | (JP) | 11-155732 |
| Jun. 21, 1999 | (JP) | 11-174253 |

(51) Int. Cl.[7] ............................................. G11B 33/12
(52) U.S. Cl. ...................................... 369/77.1; 369/77.2
(58) Field of Search ........................... 369/75.2, 77.1, 369/77.2

(56) References Cited

U.S. PATENT DOCUMENTS

| | | | | |
|---|---|---|---|---|
| 5,533,000 A | | 7/1996 | Koizumi | 369/270 |
| 5,572,498 A | * | 11/1996 | Choi | 369/77.2 |
| 5,590,113 A | * | 12/1996 | Choi | 369/270 |
| 5,724,332 A | * | 3/1998 | Ogusu | 369/77.2 |
| 5,737,293 A | * | 4/1998 | Kawamura et al. | 369/77.1 |
| 5,768,240 A | * | 6/1998 | Hiraga | 369/75.2 |
| 5,812,511 A | * | 9/1998 | Kawamura et al. | 369/77.2 |
| 5,867,338 A | * | 2/1999 | Ohira et al. | 369/75.2 |
| 5,933,400 A | * | 8/1999 | Kabasawa | 369/77.2 |
| 6,009,062 A | * | 12/1999 | Nashimoto et al. | 369/77.2 |
| 6,134,206 A | * | 10/2000 | Furukawa et al. | 369/77.2 |
| 6,167,015 A | * | 12/2000 | Jeong | 369/77.1 |
| 6,262,961 B1 | * | 7/2001 | Maeda et al. | 369/77.2 |

* cited by examiner

*Primary Examiner*—Brian E. Miller
(74) *Attorney, Agent, or Firm*—Brinks Hofer Gilson & Lione

(57) ABSTRACT

A recording medium driving apparatus having a disk-shaped first medium, and a second medium formed of a disk housed in a cartridge case, the first and second media being retained at two vertically shifted positions in a frame member, and information being recorded and/or reproduced on and/or from the first and second media by using the same optical pickup. The recording medium driving apparatus includes a driving unit which can be vertically and horizontally moved with respect to the frame member and on which at least the optical pickup and a transporting mechanism for transporting the optical pickup are mounted. The driving unit vertically and horizontally moves in the frame member thereby to selectively oppose the optical pickup to either of the first and second media retained in the two different positions. This arrangement makes it possible to select either of two media simultaneously loaded on the apparatus to record and/or reproduce information to/from the selected medium, thus obviating the necessity for replacing a medium with a target medium, and providing significantly improved convenience.

26 Claims, 38 Drawing Sheets under this specification:

RECORDING MEDIUM DRIVING APPARATUS

BACKGROUND OF THE INVENTION

1. Field of the Invention

The present invention relates to a recording medium driving apparatus capable of recording on and/or reproducing information from two types of media, namely, a disk-shaped type of medium represented by a compact disk (CD) and a type of medium represented by a mini-disk (MD) having a disk housed in a cartridge, while using a common optical pickup.

2. Description of the Related Art

In recent years, the number of types of on-vehicle electronic equipment, in particular, has been increasing. There has been a need for installing, in a vehicle, many types of electronic equipment such as a navigation system and a liquid crystal display in addition to, for example, a CD player and an MD player. In an attempt to meet such a need, if a CD player and an MD player are stacked as commonly done, then a large portion of the effective space of an installation place is occupied by these two types of players, presenting the problem of having limited space remaining for other electronic equipment to be installed.

To solve the aforesaid problem, a recording medium driving apparatus has recently been proposed that is adapted to integrate the mechanisms of a CD player and an MD player so as to permit information to be reproduced from both media, namely, the CD and the MD, by employing a common optical pickup. The recording medium driving apparatus is provided with an insertion slot for inserting and ejecting a CD and an MD in a frame member of its main body, and is further provided in its main body with a turntable capable of rotatively driving a CD and an MD, an optical pickup, and a driving unit on which a transporting mechanism for moving the optical pickup is mounted.

In the recording medium driving apparatus having the configuration generally described above, when a CD or an MD is inserted through the insertion slot, the inserted medium is rotatively driven by the turntable, and the optical pickup is moved along the turning medium thereby to reproduce information that has been recorded on the medium.

The recording medium driving apparatus set forth above allows information to be reproduced from both types of media, CDs and MDs, by using the same optical pickup mounted on the driving unit. This arrangement makes it possible to considerably reduce the thickness or height of the entire apparatus in comparison with a case where a CD player and an MD player are separate mechanisms that are stacked, thus permitting an allowance in space for installing other electronic equipment. However, only one medium, either a CD or an MD, can be loaded on the turntable of the driving unit; therefore, it is impossible to simultaneously insert or place both a CD and an MD in the frame member of the equipment main body. This has posed an inconvenience in that, for example, if information in an MD needs to be reproduced to replace information in a CD that is being reproduced, then the inserted CD must be ejected before the MD can be inserted.

BRIEF SUMMARY OF THE INVENTION

Accordingly, the present invention has been made with a view toward solving the problem described above, and it is an object thereof to provide a recording medium driving apparatus capable of simultaneously accommodating two different types of media and of recording and/or reproducing information to and/or from either of the media that has been selected.

To this end, according to the present invention, there is provided a recording medium driving apparatus having a first medium formed as a disk and a second medium formed of a disk housed in a cartridge case, the first and second media being retained in a frame member at two vertically shifted positions, and information being recorded and/or reproduced on and/or from the first and second media by using a common optical pickup. The recording medium driving apparatus is equipped with a driving unit which can be vertically and horizontally moved with respect to the frame member and on which at least the optical pickup and a transporting mechanism for moving the optical pickup are mounted, wherein the driving unit vertically and horizontally moves in the frame member so as to selectively oppose the optical pickup to either of the first and second media retained at the two different positions.

The first type of media is a disk-shaped recording medium such as, for example, CDs and digital versatile disks (DVDs), and the second type of media is a recording medium such as, for example, MDs formed of disks housed in cartridge cases.

With this arrangement, moving the driving unit vertically and horizontally in the frame member makes it possible to selectively oppose a single optical pickup to either of the two media retained in two different positions shifted in the vertical direction in the frame member. Hence, both media can be simultaneously accommodated in the apparatus, and either one of the media can be selected to record and/or reproduce information, obviating the necessity of changing a medium every time, with consequent excellent convenience.

In the arrangement set forth above, it is preferable that a main chassis held in the frame member is provided with a first mount section in which the first medium is mounted and a second mount section in which the second medium. is mounted, and the driving unit is provided so that it can be moved in a first direction for moving toward or away from the main chassis. When the driving unit is in a position away from the main chassis, the driving unit can be moved in a second direction intersecting with the first direction between a first position, where the optical pickup opposes the first medium loaded in the first mount section, and a second position where the optical pickup opposes the second medium loaded in the second mount section.

With this arrangement, the driving unit can be moved in the first direction to move it away from the main chassis and at the same time or after moving it away therefrom, the driving unit can be moved in the second direction from the first position to the second position or from the second position to the first position so as to bring the driving unit close to the main chassis in the first direction, thereby enabling the single optical pickup to be selectively moved to either of the two media loaded in predetermined positions in the main chassis.

Alternatively, it is preferable in the aforesaid arrangement that a holder for retaining the second medium inserted in the frame member is provided so that it may vertically move in the frame member, the driving unit and the holder are respectively moved vertically at positions where the driving unit and the holder do not flatly overlap so as to allow the vertical relative positions of the driving unit and the holder to be reversed, and horizontal movement of the driving unit causes the driving unit to flatly overlap at least a part of the holder at one side or the other side of the holder in the vertical direction. Further preferably, information is recorded and/or reproduced to and/or from the first medium at the first position where the driving unit overlaps the holder at one side of the holder, while information is recorded and/or reproduced to and/or from the second medium at the second position where the driving unit overlaps the holder at the other side of the holder.

With this arrangement, when the driving unit is moved from one side to the other side or from the other side to the one side of the holder in the vertical direction, the holder is simultaneously moved in the vertical direction. Thus, a vertical moving area required for moving the driving unit between the first position and the second position is reduced, permitting the thickness or height of the entire apparatus to be reduced.

In the arrangement, it is further preferable that a carrying member for inserting or ejecting the first medium in or from the frame member be provided, the carrying member being able to move vertically at the position where it flatly overlaps the holder, the holder and the carrying member be respectively moved away from the first medium in the vertical direction when recording and/or reproducing information to and/or from the first medium, the driving unit be moved horizontally to one side of the holder whereby the optical pickup opposes the first medium, the holder and the carrying member be respectively moved toward the first medium in the vertical direction when recording and/or reproducing information to and/or from the second medium, and the driving unit be moved horizontally to the other side of the holder whereby the optical pickup opposes the second medium.

With this arrangement, the holder and the carrying member are both raised to bring them close to the first medium to perform recording/reproduction to/from the second medium, thus enabling the holder to be raised to a position where it is nearer the first medium without causing it to come in contact with the carrying member. This permits the thickness or height of the entire apparatus to be further reduced.

Further preferably, the foregoing arrangement is provided with insertion slots which are formed in the frame member and through which the first medium and the second medium are inserted and ejected, detecting means for detecting a medium inserted through the insertion slot, a carrying mechanism for carrying a medium into the frame member on the basis of a detection output of the detecting means, a main chassis that movably supports the driving unit between a position where recording and/or reproduction to and/or from the first medium is performed and a position where recording and/or reproduction to and/or from the second medium is performed, an elastic member that elastically and movably supports the main chassis in the frame member, and a locking mechanism for locking or unlocking the main chassis to or from the frame member; wherein the main chassis is unlocked by the locking mechanism when recording and/or reproduction to and/or from one of the first and second medium is performed, and the main chassis is locked by the locking mechanism and the other medium is carried into the frame member by the carrying mechanism when the detecting means detects that the other medium has been inserted through the insertion slot under the foregoing unlocked condition.

With this arrangement, while one of the media is undergoing recording/reproduction, the other medium can be directly inserted through the insertion slot; therefore, both media can be simultaneously accommodated without the necessity of removing one of the media, and recording and/or reproduction to and/or from either of the two media can be accomplished using the same optical pickup. This arrangement also obviates the need for preparatory operations such as, for example, interrupting the drive of a medium under recording/reproduction prior to insertion of the other medium, resulting in excellent convenience.

DETAILED DESCRIPTION OF THE INVENTION

A first embodiment of the present invention will be described with reference to FIG. 1 through FIG. 18.

Figure 1:
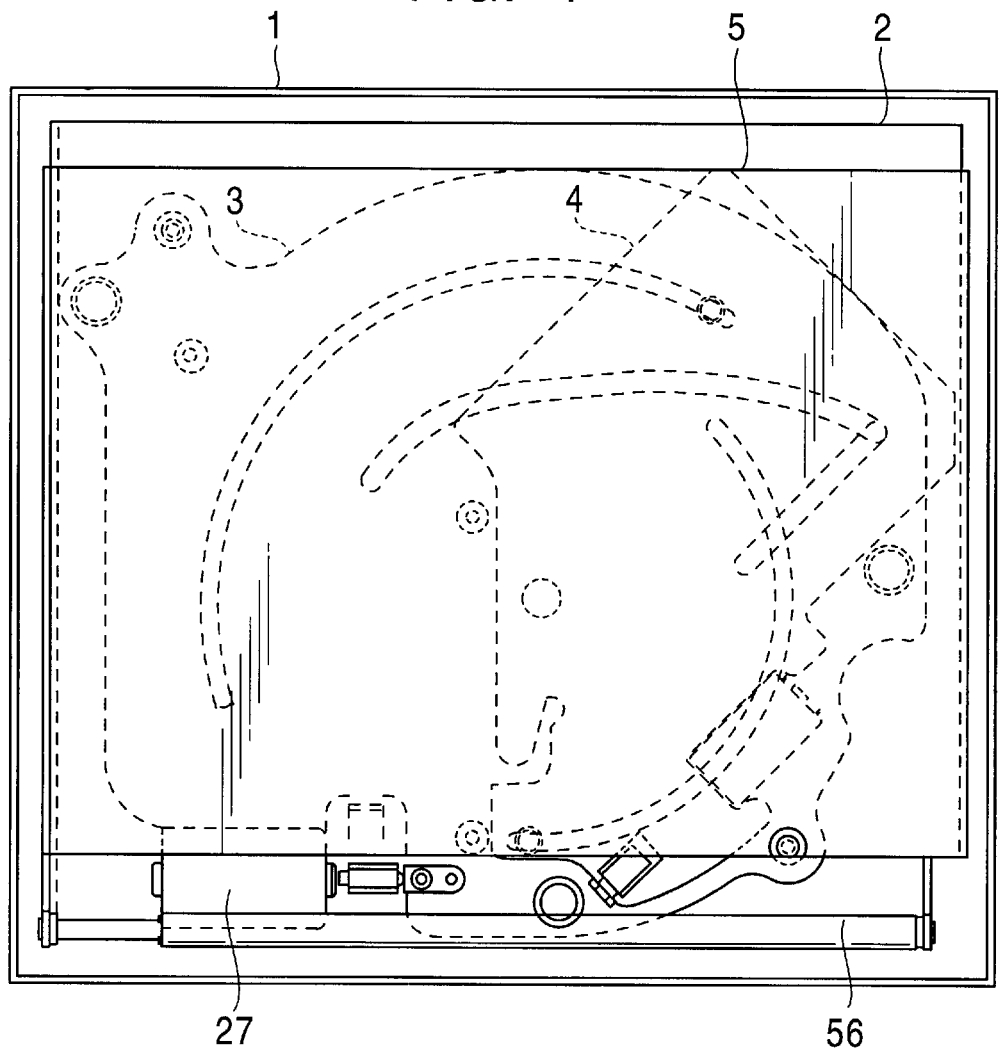
FIG. 1 is a top plan view of a recording medium driving apparatus in accordance with a first embodiment of the invention.
Figure 2:
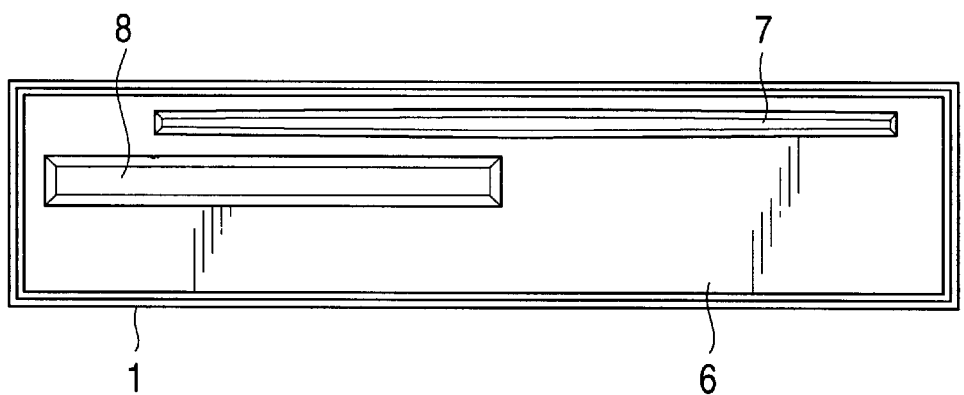
FIG. 2 is a front view of the recording medium driving apparatus.
Figure 18A:
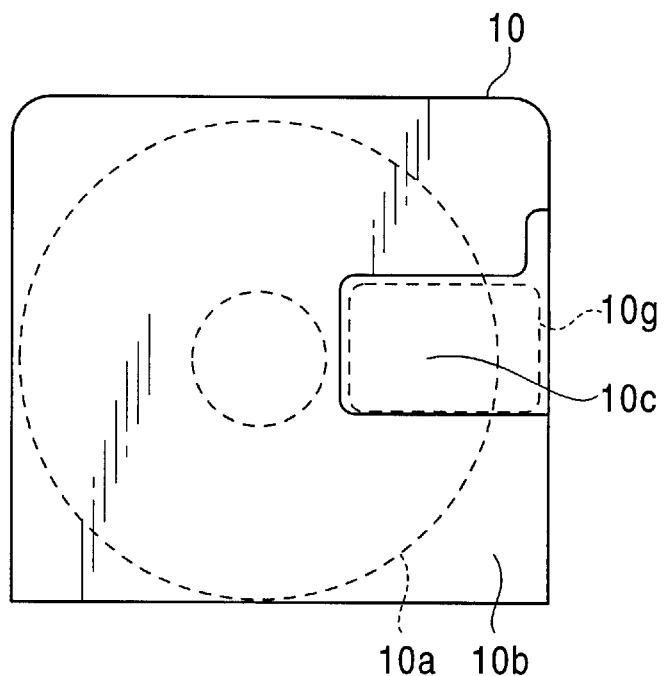
FIG. 18 is a schematic representation of the MD.
Figure 18B:
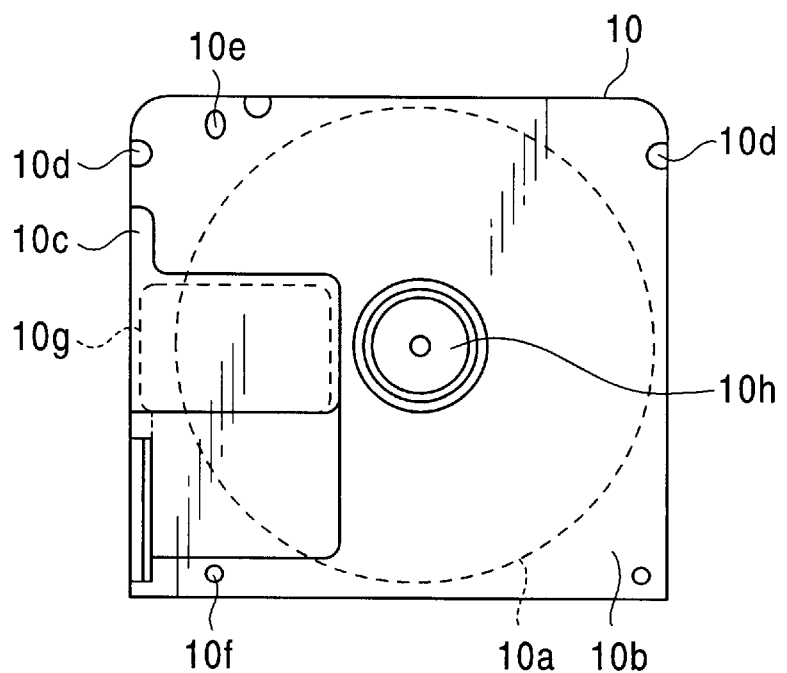

A recording medium driving apparatus in accordance with this embodiment is equipped with a frame member 1 installed at a predetermined position (e.g. in a console) in a vehicle, a main chassis 2 elastically supported in the frame member 1 via a plurality of elastic members 101 such as oil dampers (FIG. 4), a sub-chassis 3 disposed under the main chassis 2, a driving unit 4 rested on the sub-chassis 3, and an arm clamp 5 disposed above the main chassis 2. As shown in FIG. 2, a CD insertion slot 7 and an MD insertion slot 8 are formed in a front plate 6 covering the front surface of the frame member 1, the MD insertion slot 8 being positioned at the bottom left in relation to the CD insertion slot 7. A compact disc (CD) 9, which is a first medium, is inserted in or ejected from the CD insertion slot 7, while a mini-disc (MD) 10, which is a second medium, is inserted in or ejected from the MD insertion slot 8. As well known, the CD 9 is a discrete optical disc, whereas the MD 10 (FIG. 18) has a magneto-optical disk 10a housed in a cartridge case 10b made of a synthetic resin, a metal hub 10h being provided at the center of the magneto-optical disk 10a as shown in FIG. 18B. The cartridge case 10b is provided with a window opening log for partly exposing the magneto-optical disk 10a, and a shutter 10c that closes the window opening 10g. Engaging notches 10d, a pair of locator holes 10e and 10f, etc. are provided at predetermined positions of the rear surface of the cartridge case 10b.

Figure 3:
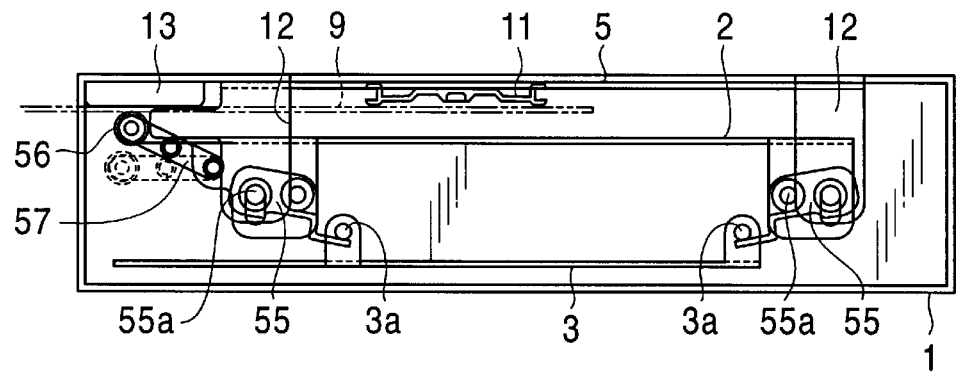
FIG. 3 is a side view of the recording medium driving apparatus.

Referring now to FIG. 3, a damper 11 is rotatably retained on the bottom surface of the arm clamp 5. Coupling pieces 12 are provided at four locations, right and left, of the arm clamp 5 (only one side surface is shown). A guide top 13 formed of a highly smooth resin material is fixed to the bottom surface of the arm clamp 5, the guide top 13 being positioned above a carrying passage of the CD 9 inserted through the CD insertion slot 7.

Figure 4:
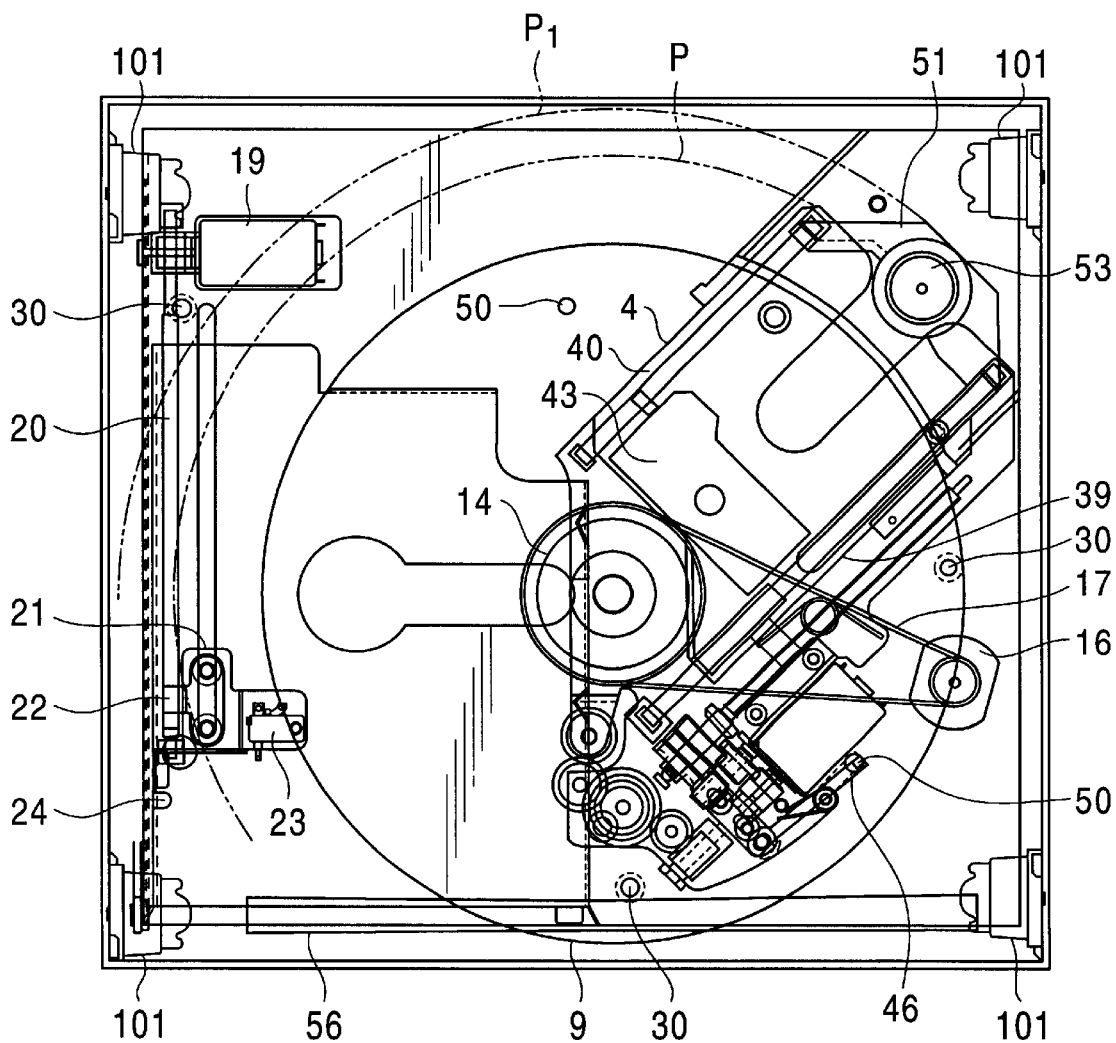
FIG. 4 is a top plan view showing a CD in the reproduction mode.
Figure 9:
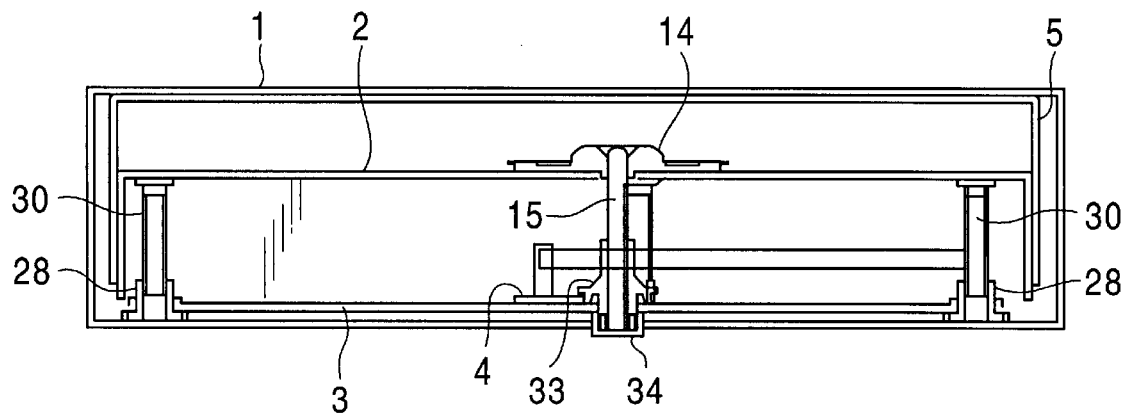
FIG. 9 is a front view showing a standby mode.

Referring to FIG. 4, a first turntable 14 serving as a first mount section on which the CD 9 is positioned and mounted is rotatably installed on the top surface of the main chassis 2, a rotating shaft 15 thereof extending downward, penetrating the main chassis 2 (FIG. 9). A belt 17 is tightly stretched between the first turntable 14 and a CD spindle motor 16 installed on the main chassis 2, and the first turntable 14 is rotatably driven by the CD spindle motor 16. The first turntable 14 is positioned directly under the damper 11. As it will be discussed hereinafter, when the CD 9 is in a reproduction mode, the CD 9 turns while being chucked between the first turntable 14 and the damper 11.

A holder 18 (FIG. 12) functioning as a second mount section on which the MD 10 is positioned and mounted is secured at the left side of the bottom surface of the main chassis 2. The rotating shaft 15 of the first turntable 14 passes by the right side surface of the holder 18 and extends downward (see FIG. 13). A front opening end of the holder 18 faces the MD insertion slot 8, and the MD 10 is inserted through the MD insertion slot 8 to be held by the holder 18. An MD loading motor 19 is installed at left back of the main chassis 2, and a feeding screw 20 that rotates using the motor 19 as a driving source extends along the left side of the top surface of the holder 18. An internal thread portion 22 provided on a bracket 21 threadedly engages the feeding screw 20, so that the bracket 21 moves in the direction of the axis of the feeding screw 20 as the feeding screw 20 rotates. The feeding screw 20 and the bracket 21 make up a second loading mechanism that carries the MD 10 between the MD insertion slot 8 and the holder 18. A detection switch 23, operated as the MD 10 is inserted, is mounted on the bracket 21. The motor 19 runs on the basis of output signals from the detection switch 23. The bracket 21 is provided with a retaining portion 24, and the MD 10 is carried by the retaining portion 24 to a predetermined position of the holder 18. More specifically, the engaging notch 10d formed in the cartridge case 10b of the MD 10 can be engaged with the retaining portion 24. The MD 10 is transferred to a predetermined position in the holder 18 as the bracket 21 moves in the axial direction of the feeding screw 20, with the engaging notch 10d meshed with the retaining portion 24. In the course of the transfer, the shutter 10c is released by a shutter release protuberance (not shown) to expose the magneto-optical disk 10a through the window opening 10d of the cartridge case 10b.

Figure 13:
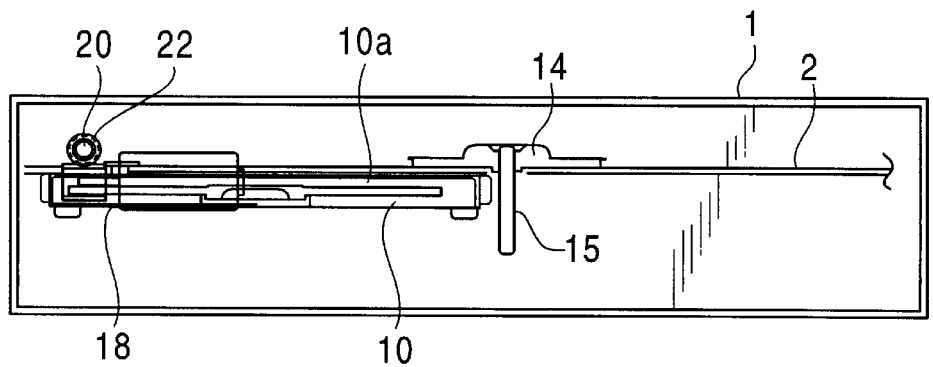
FIG. 13 is a front view showing the loaded MD.
Figure 15:
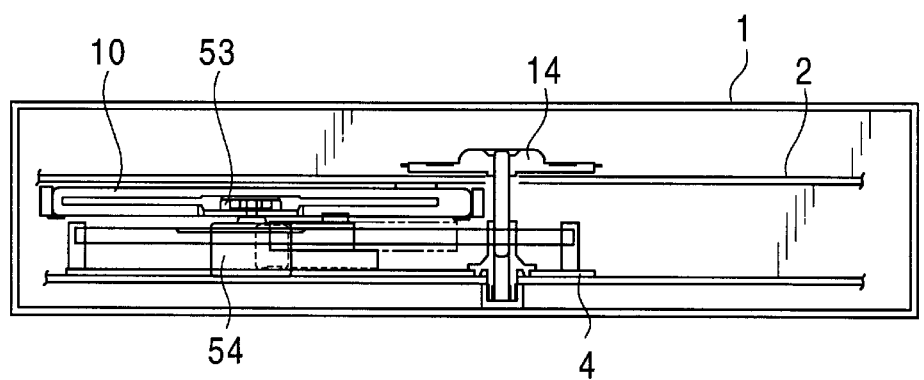
FIG. 15 is a front view of the MD in the recording/reproduction mode.

As shown in FIG. 13 and FIG. 15, the first turntable 14 is provided on the top surface of the main chassis 2, while the holder 18 is provided on the bottom surface of the main chassis 2 in positions shifted in a height direction or a vertical direction, the right side of the holder 18 extending under the bottom surface of the first turntable 14. Hence, the CD 9 mounted on the first turntable 14 and the MD 10 placed in the holder 18 are disposed so that they are vertically overlapped (flatly overlapped), making it possible to reduce the width in the lateral direction or horizontal direction of the frame member 1.

Figure 5:
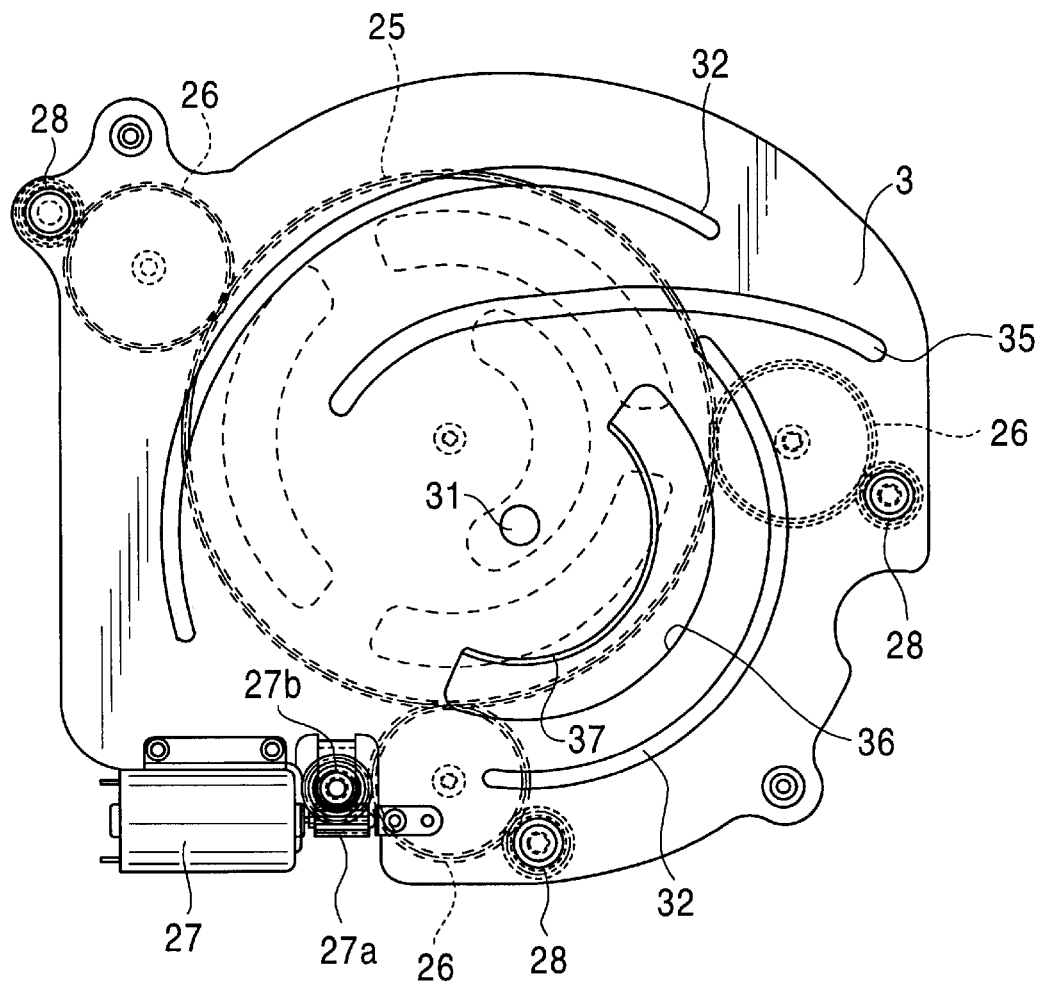
FIG. 5 is a top plan view of a sub-chassis.
Figure 6:
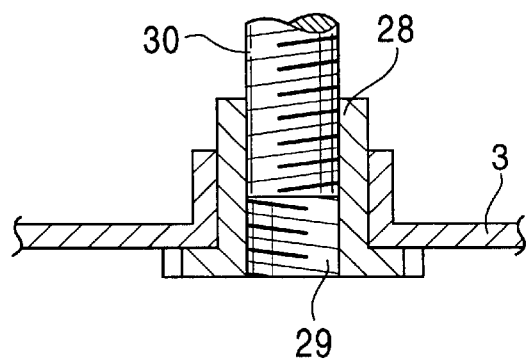
FIG. 6 is a sectional view showing a portion where the main chassis and the sub-chassis are coupled.

Referring to FIG. 5, a large-diameter gear 25 and three small-diameter gears 26 meshing with the large-diameter gear 25 are provided on the bottom surface of the sub-chassis 3. One of the small-diameter gears 26 meshes with the large-diameter gear 25 via a lifting motor 27, a worm gear 27a, and a gear 27b attached to the sub-chassis 3. The small-diameter gears 26 individually mesh with relay gears 28 that are nut members rotatably supported by the sub-chassis 3. Referring to FIG. 6, internal thread portions 29 provided at the centers of the respective relay gears 28 threadedly engage threaded studs 30 provided on the bottom surface of the main chassis 2 (see FIG. 9). Thus, as the lifting motor 27 runs in the forward or reverse direction, the three small-diameter gears 26 rotate in the same direction in synchronization via the large-diameter gear 25, and the relay gears 28 interlocked with the small-diameter gears 26 rotate in threaded engagement with the threaded studs 30. This causes the sub-chassis 3 to travel in the vertical direction or the first direction to move toward or away from the main chassis 2. Thus, the large-diameter gear 25, the small-diameter gears 26, the lifting motor 27, the relay gears 28, and the threaded studs 30 make up a lifting mechanism of the sub-chassis 3. In the foregoing arrangement, the sub-chassis 3 is vertically moved by rotating the relay gears 28; conversely, however, the threaded studs 30 may be rotated to vertically move the sub-chassis 3. A through hole 31 is provided near the center of the sub-chassis 3, and two arc-shaped guide openings 32 are provided around the through hole 31. The sub-chassis 3 is further provided with a cam opening 35 and a cutout 36 located around the through hole 31, an arc-shaped rack 37 being provided around the through hole 31 along the inner peripheral edge of the cutout 36.

Figure 7:
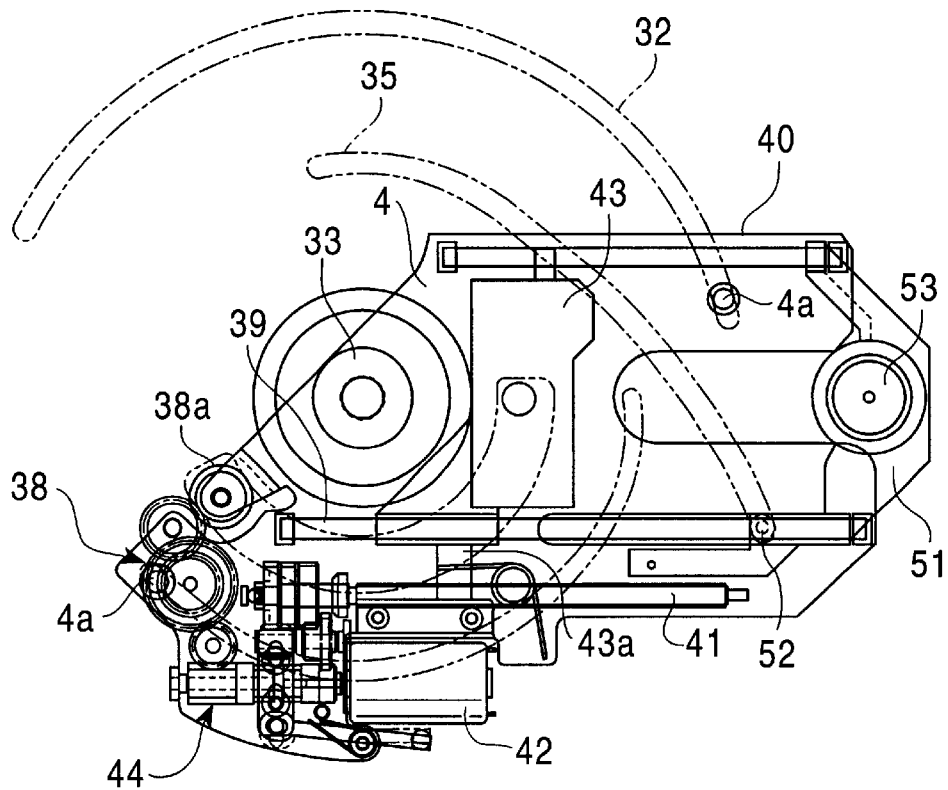
FIG. 7 is a top plan view of a driving unit.
Figure 8:
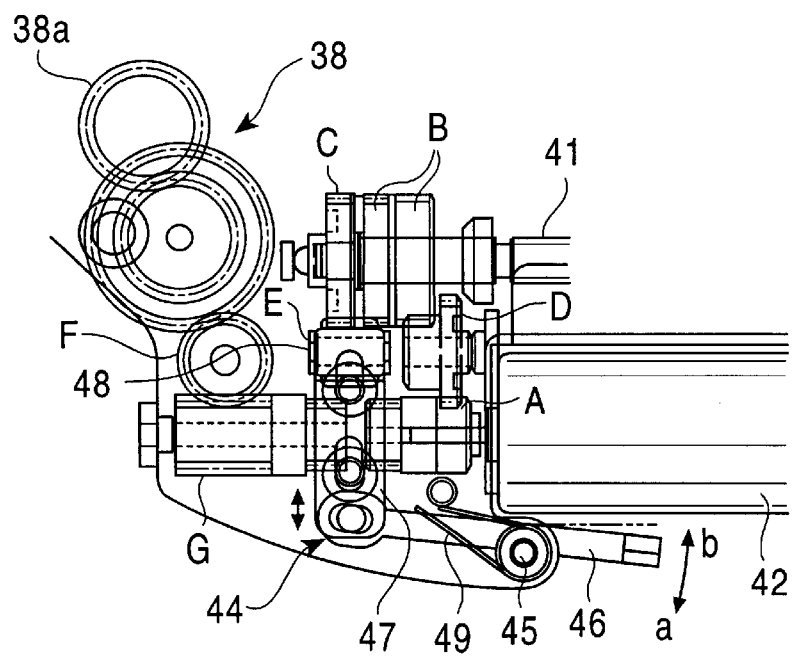
FIG. 8 is a schematic representation of a power switching mechanism.
Figure 10:
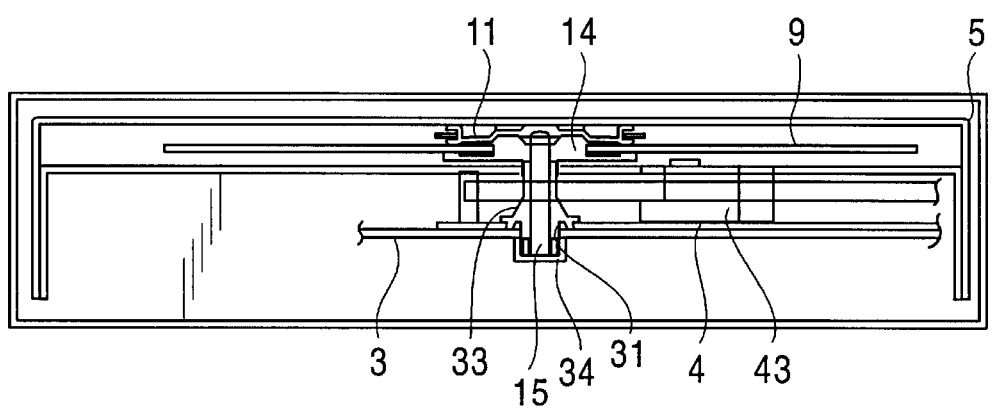
FIG. 10 is a front view showing a CD in the reproduction mode.

The driving unit 4 is rested on the sub-chassis 3, and a bearing 33 is fixed to the driving unit 4 by crimping as shown in FIG. 7. Referring to FIG. 9 and FIG. 10, the bearing 33 is inserted in the through hole 31 of the sub-chassis 3, and the lower end thereof is closed by a cap 34 functioning as a thrust bearing. The rotating shaft 15 of the first turntable 14 is rotatably inserted in the bearing 33 so that it may vertically slide. The lower end of the rotating shaft 15 is in contact with the cap 34 when the sub-chassis 3 is in an up position, while the lower end of the rotating shaft 15 is away from the cap 34 when the sub-chassis 3 is in a down position. The lower end of the rotating shaft 15, however, does not slip out of the bearing 33 even when the sub-chassis 3 is in the down position. Furthermore, a gear train 38 is rotatably supported on the driving unit 4, a gear 38a in a final stage being meshed with the rack 37 of the sub-chassis 3 as shown in FIG. 7 and FIG. 8. Stop pins 4a engaging the guide openings 32 of the sub-chassis 3 are provided on the bottom surface of the driving unit 4. As the gear train 38 rotates to cause the gear 38a to move along the rack 37, the driving unit 4 swings within a predetermined angle range in the direction of the surface of the sub-chassis 3 or in the second direction from the first position shown in FIG. 4 to the second position shown in FIG. 14 on the bearing 33, i.e. the rotating shaft 15 of the first turntable 14. Furthermore, a main shaft 39 and a sub shaft 40, which are parallel to each other, are fixed on the driving unit 4, and a screw shaft 41 is rotatably supported in the vicinity of the main shaft 39. The screw shaft 41 can be rotated by using a thread motor 42, which is installed on the driving unit 4, as its driving source. As the screw shaft 41 rotates, an optical pickup 43 reciprocates along the main shaft 39 and the sub shaft 40 via a nut portion 43a engaging the screw shaft 41. The thread motor 42 is employed also as a driving source of the gear train 38, the torque of the thread motor 42 being transmitted to either the gear train 38 or the screw shaft 41 via a power switching device 44 which will be discussed hereinafter.

Referring to FIG. 8, the power switching device 44 is constructed primarily of a swing lever 46 that can be swung in directions of arrows a and b on a support shaft 45, a holding lever 47 that vertically travels in the drawing as the swing lever 46 swings, and a swing gear 48 rotatably supported by the holding lever 47. The swing lever 46 is always urged in the direction of arrow b by a twist spring 49. A distal end of the swing lever 46 opposes one of paired tapered bosses 50 (see FIG. 4 and FIG. 14) provided on the bottom surface of the main chassis 2, and the distal end of the swing lever 46 moves into contact with or away from the tapered boss 50 as the driving unit 4 vertically moves together with the sub-chassis 3. For the purpose of explanation, if a gear fixed to the rotating shaft of the thread motor 42 is designated as A, gears fixed to the screw shaft 41 are designated as B and C, a gear meshed with the gear A and the gear B is designated as D, the swing gear 48 is designated as E, a gear of the first stage of the gear train 38 is designated as F, and a worm gear meshing with the gear F is designated as G, then the gear E (swing gear 48) can be moved into contact with or away from the gears B and C or the gear G. When the holding lever 47 causes the gear E to descend in the drawing to mesh with the gear A and the gear G, the torque of the thread motor 42 is transmitted to the gear train 38 via the gear A, the gear E, the gear G, and the gear F. When the gear E ascends in the drawing to mesh with the gears B and C, the torque of the thread motor 42 is transmitted to the screw shaft 41 via the gear A, the gear D, the gear B, the gear E, and the gear C.

FIG. 8 shows the driving unit 4 in its up position where it is located near the main chassis 2. In this case, since the distal end of the swing lever 46 is abutted against the tapered boss 50, the swing lever 46 swings in the direction of the arrow a against the spring force of the twist spring 49, causing the swing gear 48 to move away from the gear G to mesh with the gears B and C. Hence, when the thread motor 42 runs under this condition, the torque is transmitted to the screw shaft 41 via the gear A, the gear D, the gear B, the gear E, and the gear C as mentioned above. This causes the optical pickup 43 to reciprocate along the main shaft 39 and the sub shaft 40. Conversely, when the driving unit 4 is in its down position where it is away from the main chassis 2, the distal end of the swing lever 46 is away from the tapered boss 50; hence, the swing lever 46 swings in the direction of the arrow b by the spring force of the twist spring 49, and the swing gear 48 moves away from the gears B and C to mesh with the gears A and G instead. Thus, when the thread motor 42 runs under this condition, the torque is transmitted to the gear train 38 via the gear A, the gear E, the gear G, and the gear F as mentioned above, causing the driving unit 4 to swing on the surface of the sub-chassis 3 on the bearing 33.

As shown in FIG. 7, both ends of a bracket 51 are movably fitted to the main shaft 39 and the sub shaft 40. A boss or engaging portion 52 that engages the cam opening 35 of the sub-chassis 3 in a convexo-concave fashion is provided on the bottom surface of the bracket 51. Therefore, when the driving unit 4 swings on the surface of the sub-chassis 3 on the bearing 33, the boss 52 moves in the cam opening 35 thereby to move the bracket 51 in the axial directions of the main shaft 39 and the sub shaft 40. A second turntable 53 and an MD spindle motor 54 (see FIG. 15) functioning as a driving source for the second turntable 53 are mounted on the top surface of the bracket 51. As it will be discussed hereinafter, in the recording/reproduction mode of the MD 10, the magneto-optical disk 10a of the MD 10 turns with the metal hub 10h at the center thereof magnetically drawn by the second turntable 53.

Referring back to FIG. 3, two rotary levers 55 are rotatably supported by shafts 55a at each of the right and left sides of the main chassis 2. Both ends of each rotary lever 55 are respectively coupled to a coupling piece 12 of the sub-chassis 3 and the arm clamp 5. An arm 57 that rotatably supports a roller 56 is rotatably supported at the front end of the main chassis 2, the arm 57 being urged upward (clockwise in the drawing) by a tension spring, which is not shown. As shown in FIG. 3, in a standby or non-play mode, the sub-chassis 3 is in the down position away from the main chassis 2. At this time, pins 3a protruding from both ends of the sub-chassis 3 push ends on one side of the rotary levers 55 down, causing the arm clamp 5 to go up so as to secure a sufficient space between itself and the main chassis 2, the roller 56 being urged in a direction for pressing itself into contact with the guide top 13. When the sub-chassis 3 is moved to the up position, the arm clamp 5 is moved down by the rotary levers 55 that turn by being interlocked with the sub-chassis 3. The arm clamp 5, which is descending, pushes the arm 57 down in the direction indicated by the dashed line (counterclockwise), causing the roller 56 to move away from the guide top 13. The roller 56 and the guide top 13 constitute a first loading mechanism that transfers the CD 9 between the CD insertion slot 7 and the first turntable 14.

Figure 11:
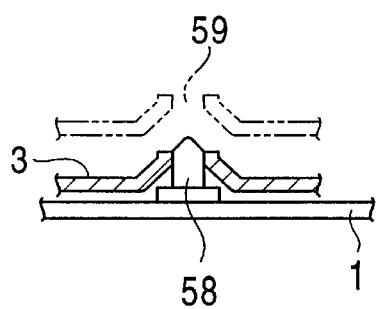
FIG. 11 is a schematic representation of a locking mechanism.

As shown in FIG. 11, locking pins (locking portions) 58 are provided in a standing manner at a plurality of locations on the inner bottom surface of the frame member 1, and the sub-chassis 3 is provided with conical locking holes (locked portions) 59 at locations corresponding to the locking pins 58. The locking pins 58 and the locking holes 59 engage with each other when the sub-chassis 3 is in the down position, thereby fixedly supporting the entire mechanism, which includes the sub-chassis 3 and the main chassis 2 coupled to the sub-chassis 3 via the threaded studs 30, with respect to the frame member 1. Conversely, when the sub-chassis 3 ascends, releasing the engagement between the locking pins 58 and the locking holes 59, the entire mechanism including the main chassis 2 and the sub-chassis 3 is elastically supported by elastic members 101 with respect to the frame member 1.

Referring now to the flow charts shown in FIG. 16 and FIG. 17, the operation of the recording medium driving apparatus configured as set forth above will be described.

First, in the standby mode wherein both media, namely, the CD 9 and the MD 10, have been ejected (or have not yet been inserted), the sub-chassis 3 is in the down position as illustrated in FIG. 9. The rotating shaft 15 of the first turntable 14 is supported by the bearing 33 and away from the cap 34. When the sub-chassis 3 is in the down position, the locking holes 59 engage the locking pins 58, and at the same time, the arm clamp 5 is pressed into contact with the top surface of the frame member 1. Under this condition, the entire mechanism including the main chassis 2 and the sub-chassis 3 is in a locked state wherein it is fixedly supported in all directions, namely, at front, back, right, left, up, and down, with respect to the frame member 1. In the locked state, the roller 56 securely opposes the guide top 13 inside the CD insertion slot 7 and securely opposes the holder 18 inside the MD insertion slot 8.

Figure 16:
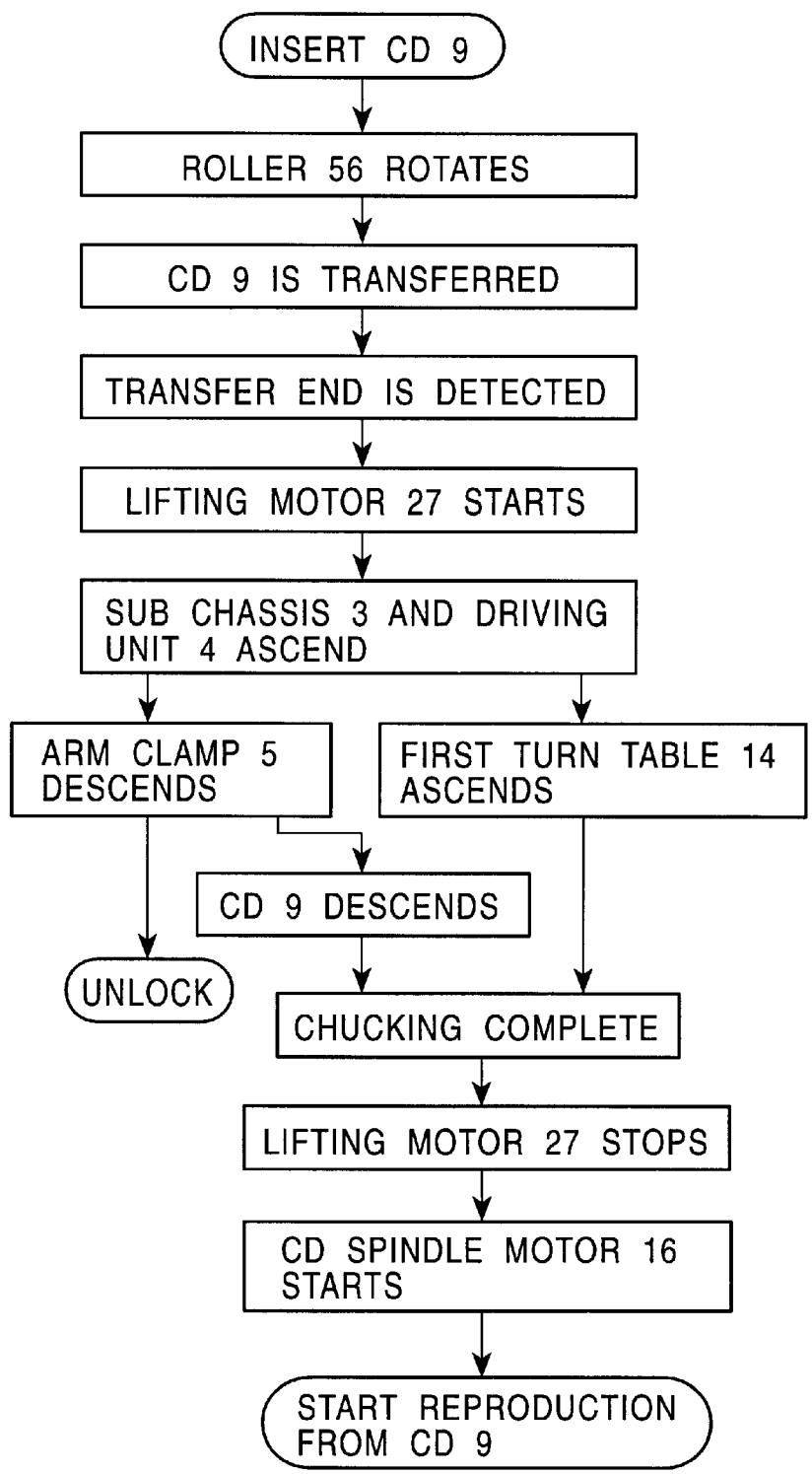
FIG. 16 is a flow chart illustrating a reproducing operation of a CD.

Referring to FIG. 16, to perform reproduction from the CD 9 which has been set in the standby mode, the CD 9 is inserted in the CD insertion slot 7 of the front plate 6. The inserted CD 9 is detected by a detecting means such as a switch or a photosensor, which is not shown, and the roller 56 rotates in response to a detection output so as to transfer the CD 9, which is held between the roller 56 and the guide top 13, to the inside. The moment the center hole of the CD 9 reaches a point directly above the first turntable 14, a detection switch (not shown) outputs a transfer END signal. In response to the detection signal, the rotation of the roller 56 is stopped, so that the CD 9 is stopped directly above the first turntable 14 as shown in FIG. 4. Furthermore, based on the transfer END signal, the lifting motor 27 rotates to lift the sub-chassis 3 along the threaded studs 30 of the main chassis 2, and the driving unit 4 rested on the sub-chassis 3 also ascends. As the sub-chassis 3 ascends, the arm clamp 5 descends via the rotary levers 55. Hence, the CD 9 comes down while being pressed by the damper 11, and the locking holes 59 are released from the locking pins 58, so that the entire mechanism is placed in an unlocked state wherein the entire mechanism is elastically supported with respect to the frame member 1. At the same time, the rotating shaft 15 of the first turntable 14 relatively descends in the bearing 33; therefore, as illustrated in FIG. 10, the lower end of the rotating shaft 15 comes in contact with the cap 34, the first turntable 14 slightly rises, and the CD 9 is chucked between the damper 11 and the first turntable 14. The lifting motor 27 stops upon completion of the chucking operation. The first turntable 14 is turned by the CD spindle motor 16 and the optical pickup 43 on the driving unit 4 is transferred in the radial direction of the CD 9 so as to start the reproduction from the CD 9.

During the reproducing operation of the CD 9, the torque of the thread motor 42 is transmitted to the screw shaft 41 by the power switching device 44. Hence, as shown in FIG. 4, the optical pickup 43 moves on a line of about 45 degrees on the right skew in the drawing while being guided by the main shaft 39 and the sub shaft 40 so as to read information recorded in the CD 9. At this time, the second turntable 53 is located at the outermost peripheral position away from the CD 9, so that the CD 9 is allowed to turn without contacting the second turntable 53. Since the entire mechanism is elastically supported in the frame member 1, the occurrence of such a problem of sound skipping caused by an external vibration directly transmitted to the optical pickup 43 can be inhibited.

Figure 12:
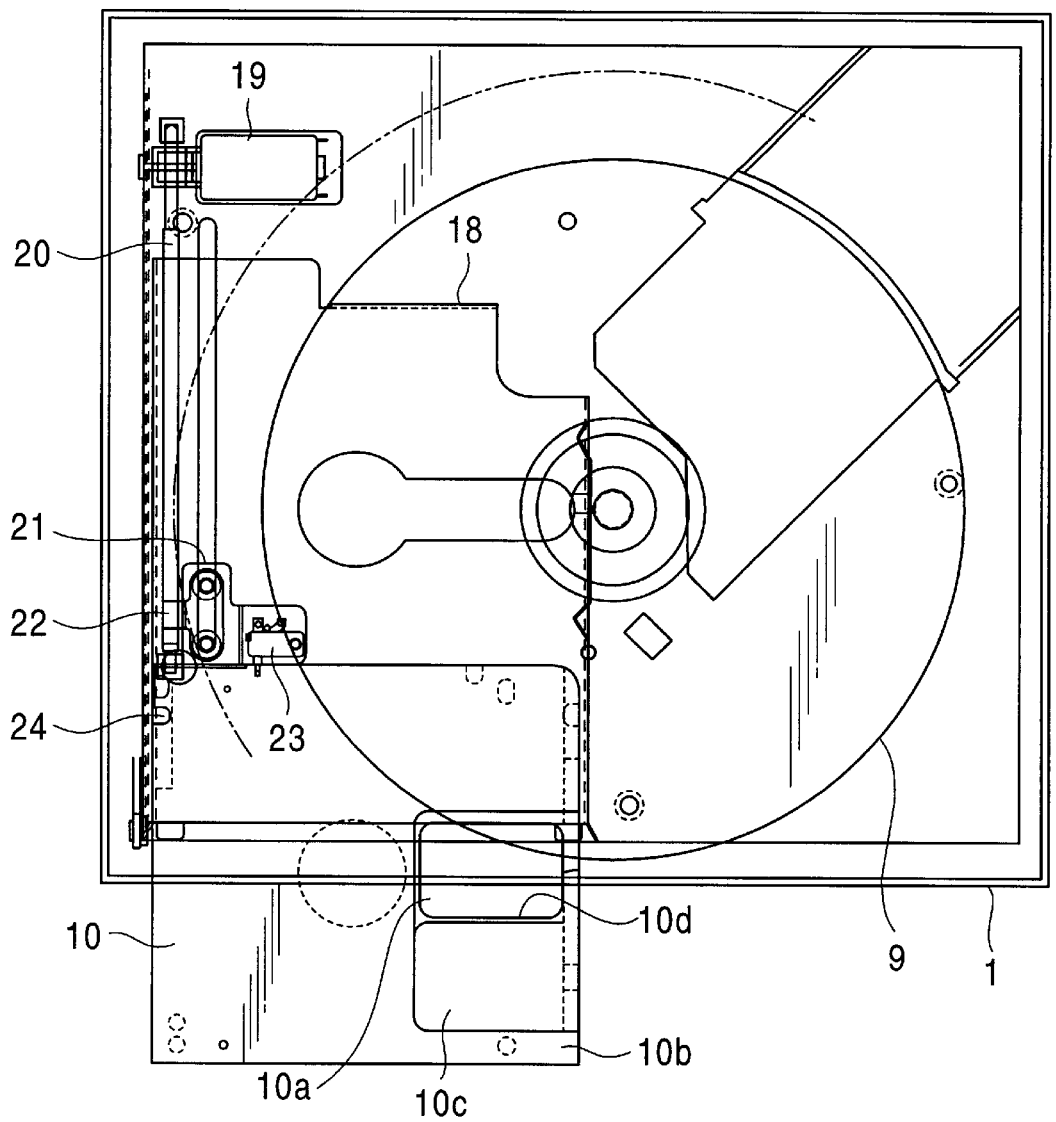
FIG. 12 is a top plan view showing a loaded MD.
Figure 14:
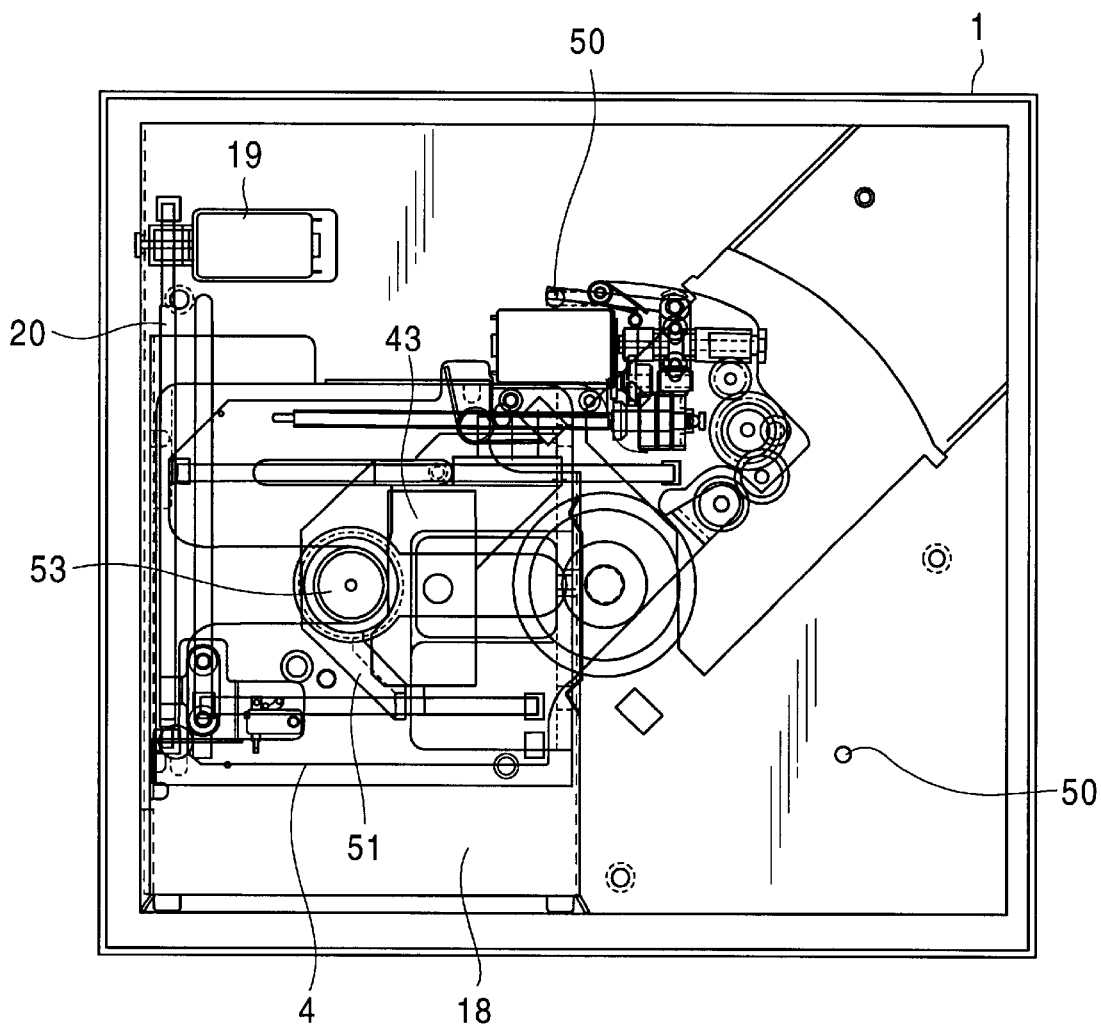
FIG. 14 is a top plan view of the MD in a recording/reproduction mode.
Figure 17:
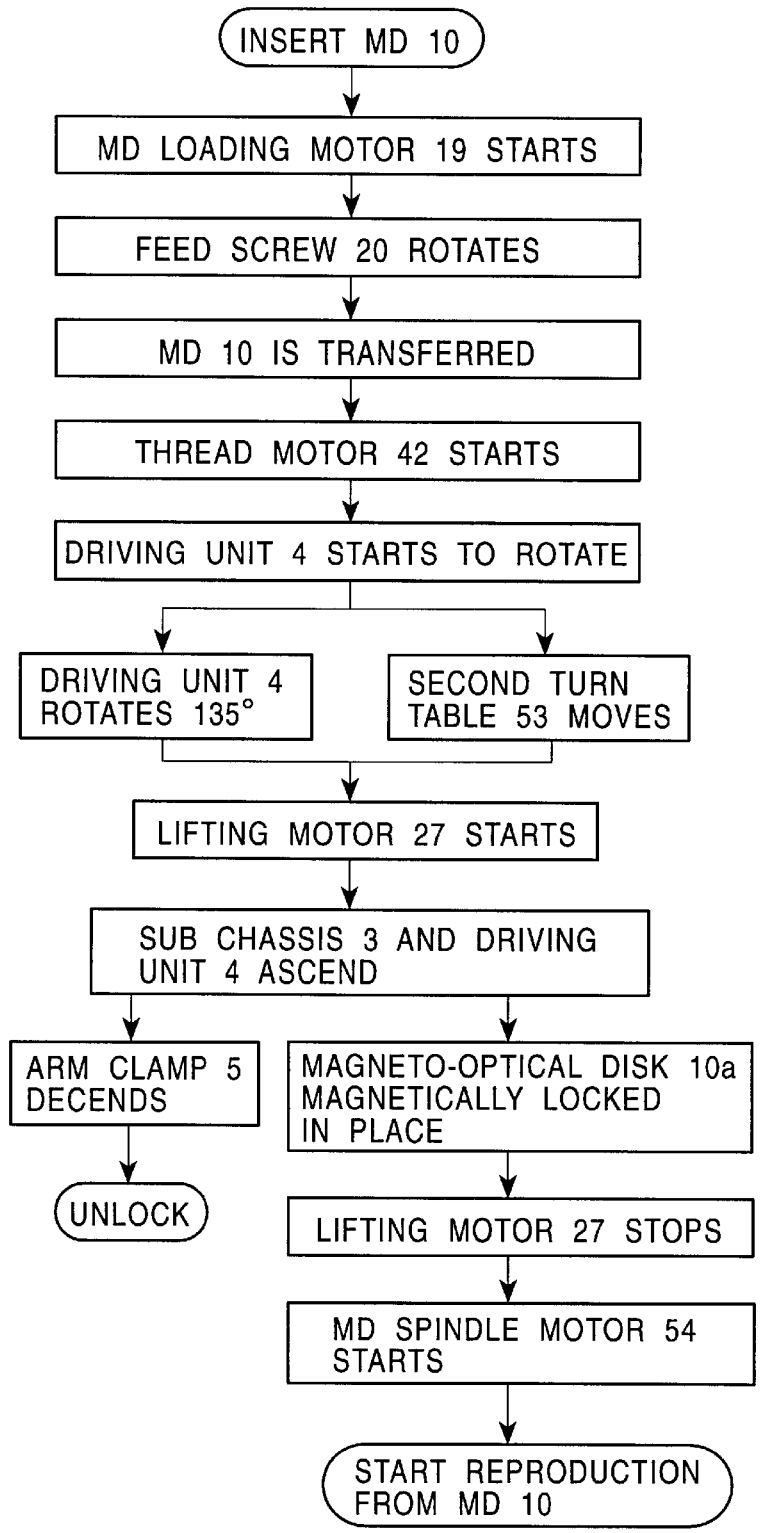
FIG. 17 is a flow chart illustrating a recording/reproducing operation of an MD.

Referring to FIG. 17, to perform recording or reproduction to or from the MD 10, the MD 10 is inserted through the MD insertion slot 8 of the front plate 6. This causes the detection switch (the detecting means) 23 to be turned ON by the cartridge case 10b of the MD 10 as shown in FIG. 12. Based on the ON signal of the detection switch 23, the MD loading motor 19 runs. When the feeding screw 20 is rotated by the rotation of the motor 19, the bracket 21 moves in the axial direction of the feeding screw 20. This in turn causes the MD 10, engaged with the retaining portion 24 of the bracket 21, to be transferred toward the back of the holder 18. In the middle of this transfer, the shutter 10c is opened to expose the magneto-optical disk 10a through the window opening 10d of the cartridge case 10b. At this time, the sub-chassis 3 and the driving unit 4 are in the down positions, and the torque of the thread motor 42 is transmitted to the gear train 38 by the power switching device 44. Therefore, as the thread motor 42 rotates, the driving unit 4 swings on the surface of the sub-chassis 3 on the bearing 33 or the rotating shaft 15 of the first turntable 14. Furthermore, the driving unit 4 swings approximately 135 degrees counterclockwise from the position of approximately 45 degrees on the right skew (the first position) of the sub-chassis 3 shown in FIG. 4, thus reaching a position shown in FIG. 14, namely, the second position. During this swing, the bracket 51 is moved inward by the cam openings 35 of the sub-chassis 3; therefore, as shown in FIG. 14, the second turntable 53 mounted on the bracket 51 and the MD spindle motor 54 move to the same axis or directly under the center of the magneto-optical disk 10a of the MD 10. The moment the lifting motor 27 rotates under this condition, the sub-chassis 3 and the driving unit 4 ascend as in the case of the reproduction from the CD 9, and the arm clamp 5 descends, rendering the unlocked state.

Furthermore, as the sub-chassis 3 ascends, the second turntable 53 attracts the metal hub 10h of the magneto-optical disk 10a of the MD 10, causing the lifting motor 27 to stop, then the second turntable 53 is turned by the MD spindle motor 54. At this time, as shown in FIG. 15, the sub-chassis 3 and the driving unit 4 go up in the frame member 1 to approach the main chassis 2; hence, the distal end of the swing lever 46 comes in contact with the tapered boss 50 thereby to transmit the torque of the thread motor 42 to the screw shaft 41. Thus, the rotation of the thread motor 42 causes the optical pickup 43 to be transferred in the radial direction of the magneto-optical disk 10a of the MD 10, and the recording or reproduction operation of the MD 10 is begun. The CD 9 is ejected by rotationally driving the roller 56 in the direction opposite from that mentioned above. The MD 10 is ejected also by rotationally driving the motor 19 in the direction opposite from that mentioned above.

In the first embodiment set forth above, it is possible to accommodate both media, namely, the CD 9 and the MD 10, in the mechanism at the same time and to perform reproduction selectively from either of the media or to insert or eject either of the media while the other medium is undergoing reproduction. For instance, to carry out recording or reproduction to or from the MD 10 already set in the holder 18 in place of the CD 9 in the reproduction mode, the sub-chassis 3 and the driving unit 4 in the up position descend to the down position with the CD 9 still resting on the first turntable 14, then the driving unit 4 swings as described above. After that, the sub-chassis 3 and the driving unit 4 ascend to begin the recording or reproducing operation of the MD 10. At that time, when the arm clamp 5 goes up as the sub-chassis 3 comes down, the CD 9 chucked between the damper 11 and the first turntable 14 is released; however, the CD 9 is retained in a reproduction position because the center hole thereof is fitted to the first turntable 14. Alternatively, the CD 9 may be retained on the first turntable 14 by a different holding means from the clamper 11 only while the arm clamp 5 is up. Furthermore, to perform reproduction from the CD 9 already resting on the first turntable 14 in place of the MD 10 in the recording/reproduction mode, the sub-chassis 3 and the driving unit 4 descend to the down position, with the MD 10 placed in the holder 18, then the driving unit 4 swings as illustrated in FIG. 4. Thereafter, the sub-chassis 3 and the driving unit 4 ascend to begin the reproduction from the CD 9. Thus, the sub-chassis 3 is moved up or down and the driving unit 4 is swung with the CD 9 and the MD 10 simultaneously set in the frame member 1, thereby enabling recording or reproduction to be accomplished selectively to or from either of the media. Moreover, the CD insertion slot 7W and the MD insertion slot 8 are separately formed, and the CD 9 loading mechanism constituted by the roller 56 and the guide top 13 and the MD 10 loading mechanism constituted by the feeding screw 20 and the bracket 21 are provided so that they can be independently operated. This arrangement makes it possible to insert or eject one of the media while the other medium is undergoing reproduction, thus permitting great convenience to users.

In addition, the second turntable 53 and the MD spindle motor 54 move toward or away from the rotating shaft 15 of the first turntable 14 as the driving unit 4 swings, so that the space required for the driving unit 4 to swing can be made smaller. More specifically, when the second turntable 53 and the MD spindle motor 54 do not move in relation to the driving unit 4, the swing track of the outermost periphery of the driving unit 4 would be as indicated by the broken line P1 of FIG. 4. In the present embodiment, the rotational track of the outermost periphery of the driving unit 4 will be as indicated by the broken line P of FIG. 4. This means that the MD 10 can be disposed more closely to the rotational center of the CD 9, enabling the entire apparatus to be made smaller.

The rotating shaft 15 of the first turntable 14 is supported by the bearing 33 provided on the driving unit 4, and the optical pickup 43 is mounted on the driving unit 4; therefore, the relative positional accuracy between the first turntable 14 that rotatively drives the CD 9 and the optical pickup 43, that is, between the CD 9 and the optical pickup 43, can be improved. Furthermore, the entire mechanism including the main chassis 2 and the sub-chassis 3 can be locked to or unlocked from the frame member 1 by engaging or disengaging the locking pins 58 provided on the frame member 1 with or from the locking holes 59 provided in the sub-chassis 3. This arrangement makes it possible to achieve a vibration-proof structure by a simple construction.

Referring now to FIG. 19 through FIG. 27, a recording medium driving apparatus in accordance with a second embodiment of the present invention will be described.

Figure 19:
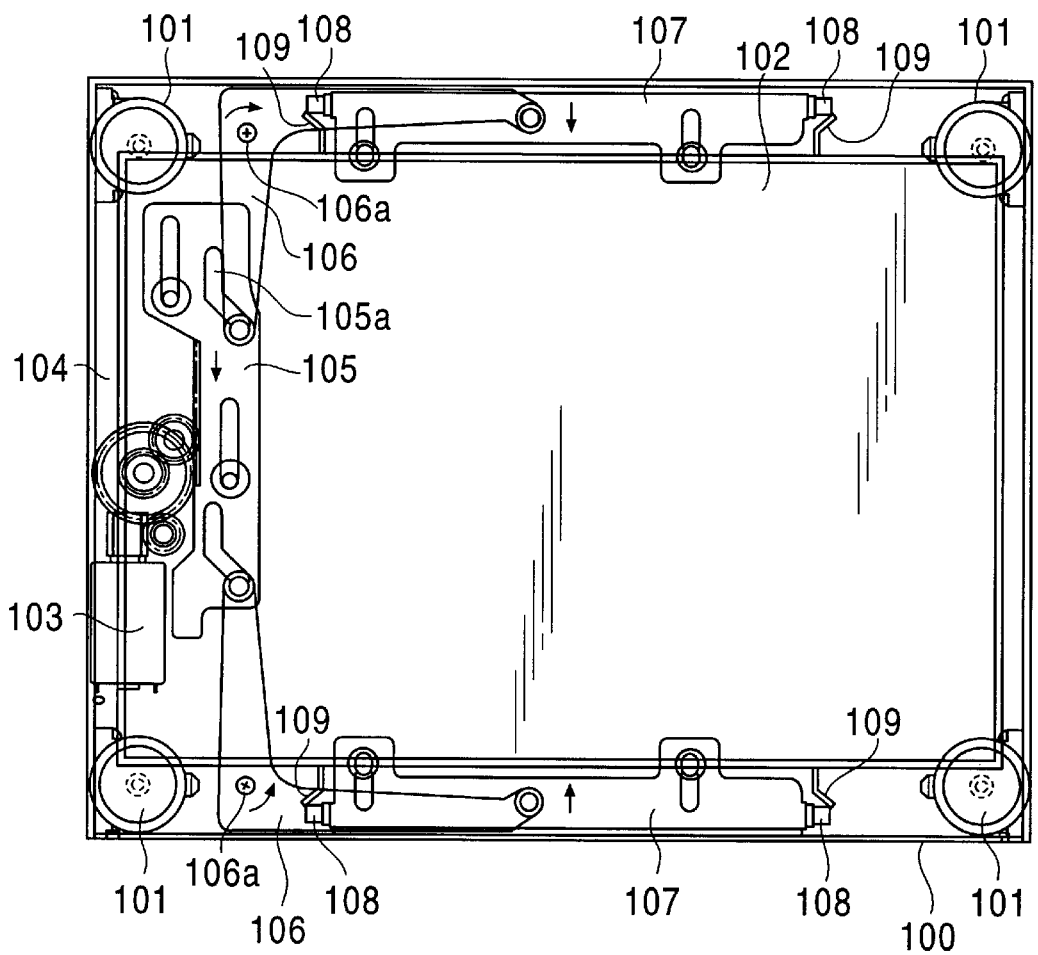
FIG. 19 is a top plan view of a locking mechanism provided on a recording medium driving unit in accordance with a second embodiment of the invention.

In the recording medium driving apparatus according to the second embodiment, as illustrated in FIG. 19, the four corners of a main chassis 102 are elastically supported in a frame member 100 via elastic members 101 such as oil dampers, and the main chassis 102 can be selectively locked by a locking mechanism. The locking mechanism is equipped with a locking motor 103 attached to the frame member 100, a slider 105 that meshes with the locking motor 103 via a gear train 104 and can be moved forward or backward, a pair of locking arms 106 that are respectively coupled to cam openings 105a of the slider 105 and turn on support shafts 106a as the slider 105 moves forward or backward, and a pair of locking levers 107 that move forward or backward in synchronization with the rotation of the locking arms 106. Locking pins 108 provided on both ends of each of the locking levers 107 oppose retaining pieces 109 provided at four locations at the front and back of the main chassis 102. Each of the retaining pieces 109 is bent at about 45 degrees as shown in the drawing, the distal end thereof being provided with a V-shaped notch as observed sideways.

FIG. 19 shows the main chassis 102 in the unlocked state. In this mode, the locking pins 108 are disengaged from the notches of the retaining pieces 109, and the main chassis 102 is elastically supported by the frame member 100 via the elastic members 101. When the locking motor 103 rotates in one direction from the unlocked state, the slider 105, the locking arms 106, and the locking levers 107 move in the directions of the arrows in the drawing, causing the locking pins 108 to engage the notches of the retaining pieces 109. Hence, the main chassis 102 is placed in the locked state wherein it is fixedly supported by the frame member 100. When the locking motor 103 rotates in the other direction from the locked state, the slider 105, the locking arms 106, and the locking levers 107 move in the opposite directions from those indicated by the arrows, thus setting the main chassis 102 back in the unlocked state illustrated in FIG. 19.

Figure 20:
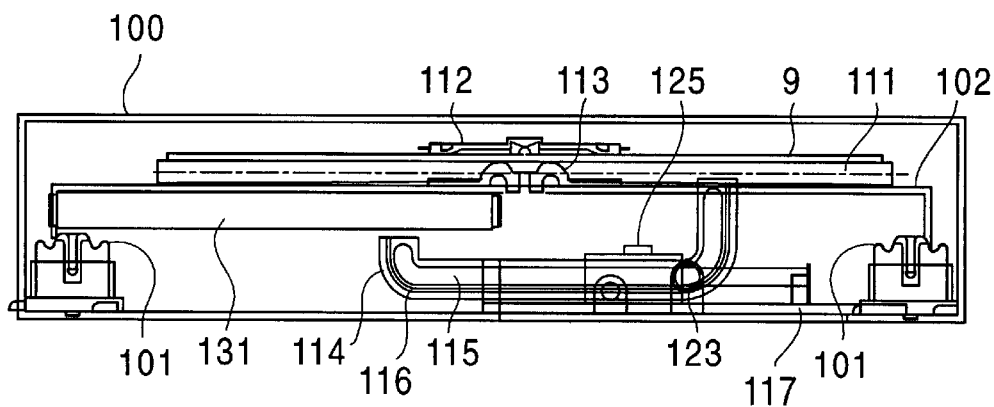
FIG. 20 is a front view illustrating a standby mode.
Figure 21:
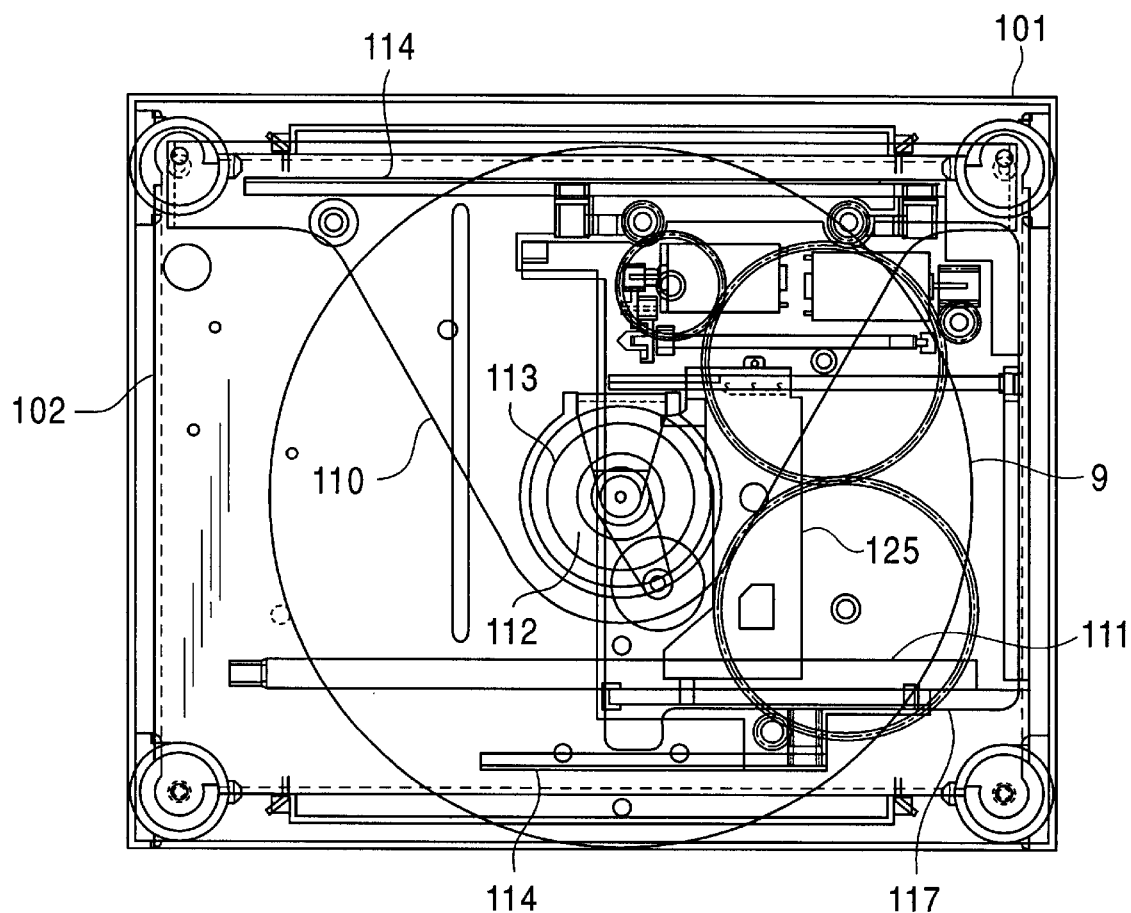
FIG. 21 is a top plan view of a loaded CD.
Figure 22:
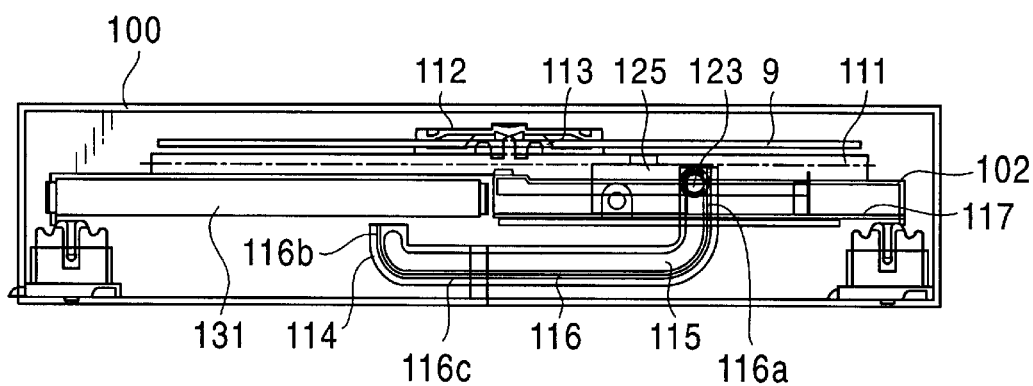
FIG. 22 is a front view showing the CD in a reproduction mode.

Referring to FIG. 20 through FIG. 22, an arm clamp 110 and a roller 111 (a first loading mechanism) are provided above the main chassis 102, the roller 111 being positioned at the back of the CD insertion slot similar to the one shown in FIG. 2. A damper 112 is rotatably supported by the arm clamp 110, and a first turntable 113 (a first mount section) opposing the damper 112 is rotatably supported by the main chassis 102. A pair of guiding brackets 114 are fixed at the front and back of the main chassis 102, and each of the guiding brackets 114 is provided with a guide opening 115 and a rack 116. The rack 116 is formed of a long vertical portion 116a that extends vertically, a short vertical portion 116b, and a horizontal portion 116c that couples the long vertical portion 116a and the short vertical portion 116b. The guide opening 115 is formed roughly in a U shape along the rack 116. Of the paired guiding brackets 114, only the front one is shown in FIG. 22; however, the guiding bracket 114 at the rear side is also provided with the paired rack 116 and guide opening 115 arranged in the lateral direction of the drawing. A driving unit 117 is disposed below the main chassis 102. The driving unit 117 is configured so that it may travel vertically and horizontally in relation to the main chassis 102. The rack 116 constitutes a guiding section for guiding the movement of the driving unit 117 in the vertical or first direction and in the horizontal or second direction.

Figure 23:
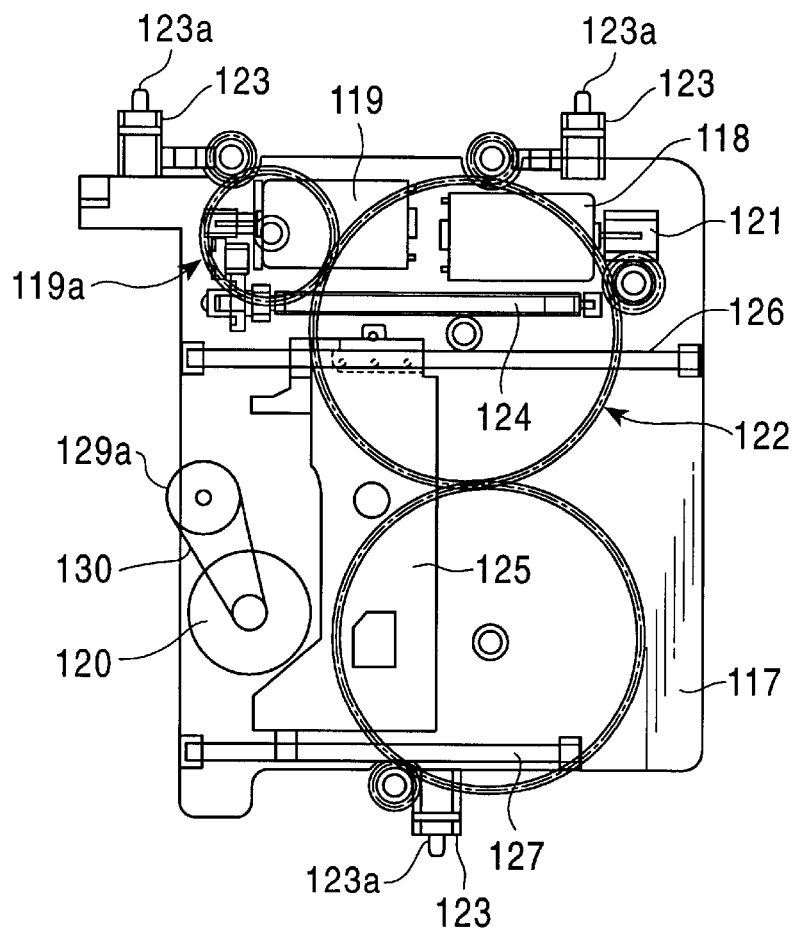
FIG. 23 is a top plan view of a driving unit.

Referring to FIG. 23, a transporting motor 118, a thread motor 119, and a spindle motor 120 are mounted on the driving unit 117. The torque of the transporting motor 118 is transmitted to transporting gears 123 provided at three locations in the front and rear of the driving unit 117 via a worm 121 and a gear train 122. One of the transporting gears 123 meshes with the rack 116 of the guiding bracket 114 at the front side, and the remaining two transporting gears 123 mesh with the rack 116 of the guiding bracket 114 at the rear side. Pins 123a at the distal ends of the transporting gears 123 are inserted in the guide openings 115 associated with the racks 116. Hence, when the transporting motor 118 rotates in the forward or reverse direction, the transporting gears 123 move along the guide openings 115 while meshing with the racks 116, causing the driving unit 117 to continuously move vertically or horizontally to move toward or away from the main chassis 102.

Figure 24:
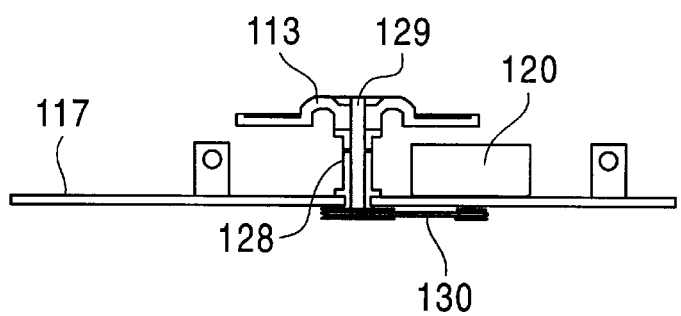
FIG. 24 is a schematic representation illustrating a state wherein a driving shaft and a turntable are coupled.

A screw shaft 124 rotatably supported on the driving unit 117 rotates via a gear train 119a by using the thread motor 119 as its driving source. The rotation of the screw shaft 124 causes the optical pickup 125 to reciprocate along a main shaft 126 and a sub shaft 127, which are parallel to each other, via an internal thread member (not shown) that meshes with the screw shaft 124. Furthermore, a spindle bearing 128 is fixed to the driving unit 117 as shown in FIG. 24, and a driving shaft 129 is rotatably supported by the spindle bearing 128. A pulley 129a secured to the lower end of the driving shaft 129 and the rotating shaft of the spindle motor 120 are coupled by a belt 130 on the bottom surface side of the driving unit 117. As it will be discussed hereinafter, the upper end of the driving shaft 129 is selectively connected to the first turntable 113 as the driving unit 117 moves up or down. When the moving gear 123 is positioned at the right end of the horizontal portion 116c of the rack 116 in the drawing, the driving unit 117 is located at the first position where the optical pickup 125 opposes the CD 9. Conversely, when the moving gear 123 is positioned at the left end of the horizontal portion 116c of the rack 116 in the drawing, the driving unit 117 is located at the second position where the optical pickup 125 opposes the MD 10.

Figure 25:
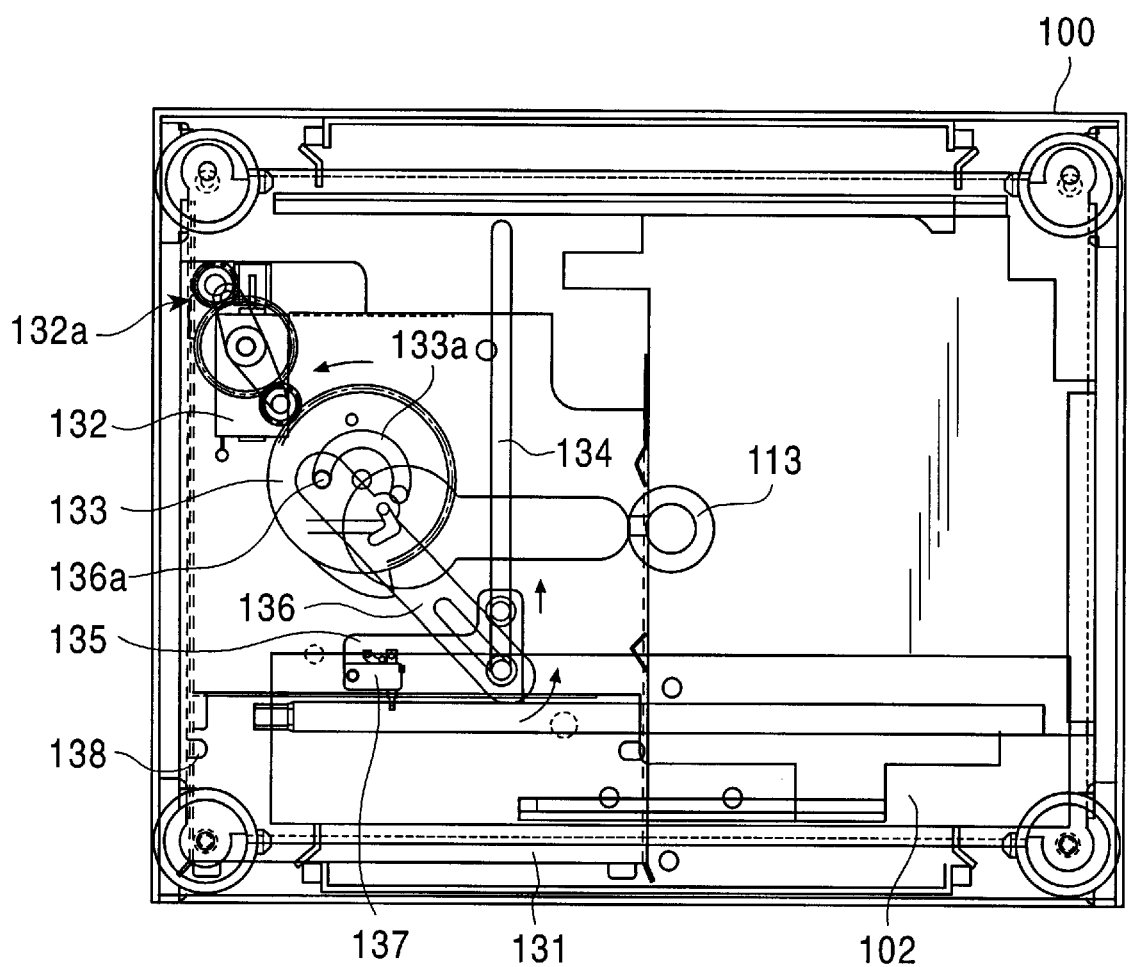
FIG. 25 is a top plan view illustrating a loaded MD.
Figure 26:
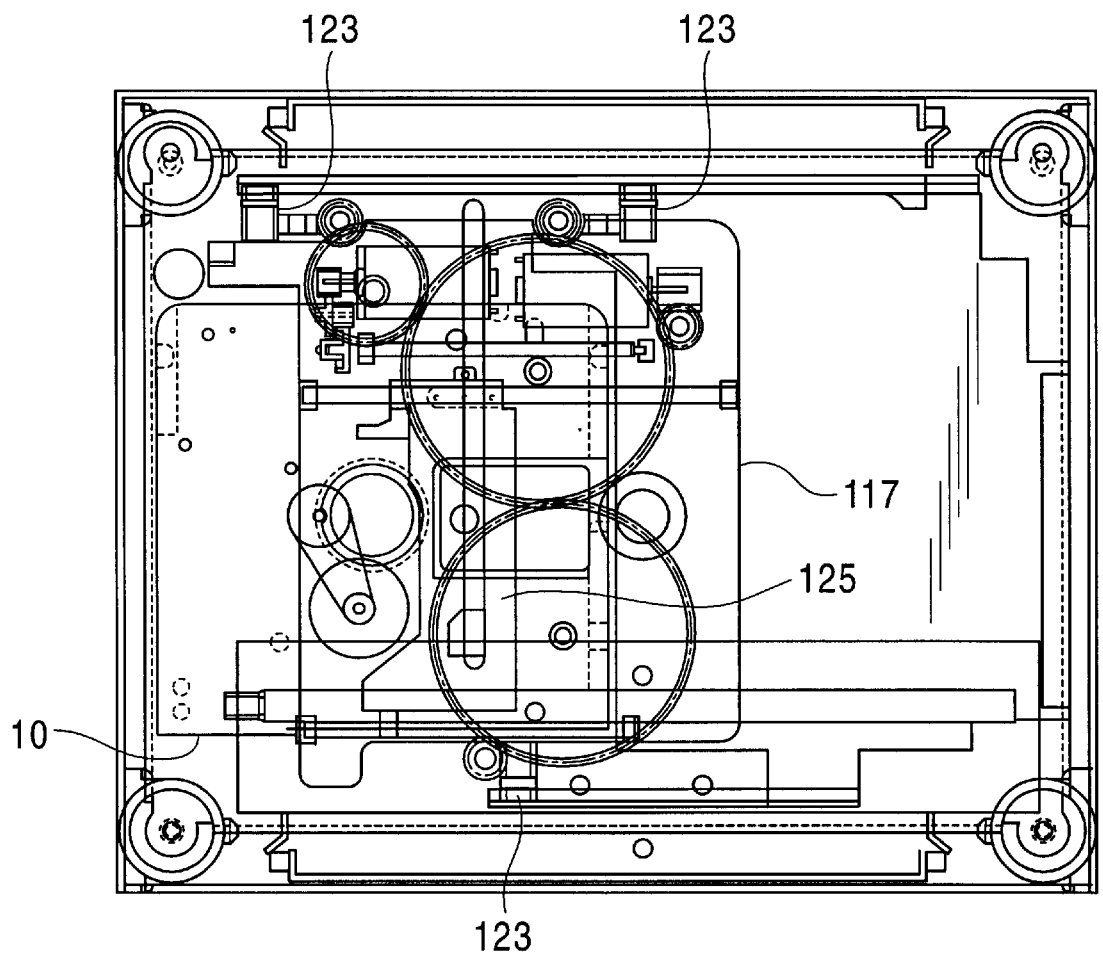
FIG. 26 is a top plan view of the MD in the recording/reproduction mode.
Figure 27:
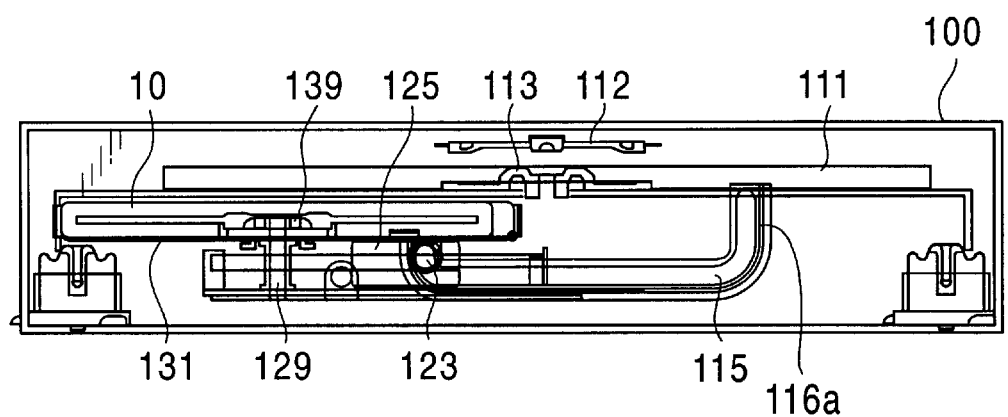
FIG. 27 is a front view of the MD in the recording/reproduction mode.

Referring now to FIG. 25 through FIG. 27, a holder 131 (a second mount section) is fixed to the left side of the bottom surface of the main chassis 102. The holder 131 is positioned at the back of the MD insertion slot similar to the one shown in FIG. 2. As in the case of the first embodiment, the holder 131 is disposed so that a part thereof extends under the first turntable 113, thus decreasing the width of the apparatus in the lateral direction in the drawing. An MD loading motor 132 is installed at the left back of the main chassis 102. A cam member 133 that rotates via a gear train 132a by using the motor 132 as its driving source is rotatably supported on the main chassis 102. The main chassis 102 is provided with a slot 134 that extends longitudinally. A bracket 135 slidably fitted in the slot 134 and the cam member 133 are coupled by a moving lever 136. The gear train 132a, the cam member 133, the bracket 135, and the moving lever 136 make up a second loading mechanism. A detection switch 137 operated as the MD 10 is inserted is mounted on the bracket 135. The MD loading motor 132 runs on the basis of output signals from the detection switch 137. The bracket 135 is provided with a retaining portion 138. A locking notch 10d formed in the MD 10 is locked to the retaining portion 138, and the MD 10 is carried together with the bracket 135 to a predetermined position in the holder 131.

FIG. 25 shows the state before the MD 10 is inserted. In this state, when the MD 10 is inserted through the MD insertion slot, the cam member 133 and the moving lever 136 coupled to a cam opening 133a of the cam member 133 via a pin 136a rotate in the direction of the arrow in the drawing as the MD loading motor 132 rotates in one direction, and the bracket 135 moves back in the direction of the arrow in the drawing along the slot 134. Thus, the MD 10 is transferred to the predetermined position in the holder 131 while being engaged with the retaining portion 138 of the bracket 135. In the course of the transfer, the shutter 10c is released to expose the magneto-optical disk 10a through the window opening 10d of the cartridge case 10b. A second turntable 139 is elastically supported under the holder 131. As it will be described later, the upper end of the driving shaft 129 is also selectively coupled to the second turntable 139 as the driving unit 117 moves.

The operation of the second embodiment will now be described. In the standby mode wherein both media, namely, the CD 9 and the MD 10, have been ejected, the transporting gears 123 are in engagement with the horizontal portion 116c of the rack 116, and the driving unit 117 is in the down position as illustrated in FIG. 20. At this time, the upper end of the driving shaft 129 is coupled neither to the first turntable 113 nor the second turntable 139, whereas the locking pins 108 are in engagement with the notches of the retaining pieces 109. Hence, the entire mechanism including the main chassis 102 and the driving unit 117 is in the locked state wherein it is fixedly supported by the frame member 100.

To perform reproduction from the CD 9 which has been set in the standby mode, the CD 9 is inserted in the CD insertion slot. The inserted CD 9 is detected by a detecting means such as a photosensor (not shown), and the roller 111 rotates in response to an output of the detection so as to transfer the CD 9 to the inside by the torque. The moment the center hole of the CD 9 reaches a point directly above the first turntable 113, a detection switch (not shown) outputs a transfer END signal. In response to the detection signal, the rotation of the roller 111 is stopped, so that the CD 9 is stopped directly above the first turntable 113 as shown in FIG. 21. Furthermore, based on the transfer END signal, the transporting motor 118 rotates, and the transporting gears 123 move from the horizontal portion 116c to the long vertical portion 116a while being engaged with the rack 116, causing the driving unit 117 to ascend to the up position as shown in FIG. 22. As the driving unit 117 ascends, the upper end of the driving shaft 129 is connected to the first turntable 113 (see FIG. 24), causing the CD 9 to be chucked between the damper 112 and the first turntable 113. The transporting motor 118 stops upon completion of the chucking procedure. After that or at the moment the driving unit 117 rises, the locking motor 103 rotates to cause the locking pins 108 to be released from the notches of the retaining pieces 109, leading to the unlocked state. Thus, the entire mechanism including the main chassis 102 and the driving unit 117 is elastically supported by the frame member 100 via the elastic members 101. Then, the driving shaft 129 and the first turntable 113 are rotated by the spindle motor 120, and the optical pickup 125 is transferred in the radial direction of the CD 9 by the thread motor 119 so as to begin the reproducing operation of the CD 9. Since the entire mechanism is elastically supported in the frame member 100 as in the case of the first embodiment, the occurrence of a problem of sound skipping can be inhibited.

To perform recording or reproduction to or from the MD 10, the MD 10 is inserted through the MD insertion slot. This turns the detection switch 137 ON. Based on the ON signal of the detection switch 137, the MD loading motor 132 runs. When the cam member 133 and the moving lever 136 are rotated in the direction of arrow of FIG. 25 by the rotation of the motor 132, the bracket 135 moves in the direction of arrow of the drawing along the slot 134. This in turn causes the MD 10 engaged with the retaining portion 138 of the bracket 135 to be transferred toward the back of the holder 131. In the middle of this transfer, the shutter 10c is opened to expose the magneto-optical disk 10a through the window opening 10d of the cartridge case 10b. When the center of the magneto-optical disk 10a of the MD 10 reaches a point directly above the second turntable 139, a transfer END signal is output from a detection switch (not shown).

Based on this detection signal, the MD loading motor 132 stops, and the transporting motor 118 begins to run instead. In this case, the transporting gears 123 move from the horizontal portion 116c to the short vertical portion 116b while being engaged with the rack 116; therefore, as shown in FIG. 27, the upper end of the driving shaft 129 is coupled to the second turntable 139 as the driving unit 117 goes up, causing the metal hub 10h of the magneto-optical disk 10a of the MD 10 to be magnetically attracted to the second turntable 139. Upon completion of the attraction, the transporting motor 118 stops. After that or at the moment the driving unit 117 rises, the locking motor 103 rotates to engage the unlocked state. In this state, the driving shaft 129 and the second turntable 139 are rotated by the spindle motor 120, and the optical pickup 125 is transferred in the radial direction of the MD 10 by the thread motor 119 so as to begin the recording/reproducing operation of the MD 10.

In the second embodiment, in order to perform the recording/reproducing operation of the MD 10, which has already been set in the holder 131, in place of the CD 9 in the reproduction mode, the driving unit 117 in the up position is lowered and transferred to a point for the standby mode, with the CD 9 left on the first turntable 113. Then, the transporting gears 123 move on the horizontal portion 116c of the rack 116 to cause the driving unit 117 to horizontally travel to the position where it opposes the MD 10. Subsequently, the transporting gears 123 move on the short vertical portion 116b of the rack 116, and the driving unit 117 goes up, thus starting the recording/reproducing operation of the MD 10. When the driving unit 117 comes down, the driving shaft 129 leaves the first turntable 113 and the first turntable 113 slightly descends; however, the damper 112 also descends thereby to hold the CD 9 in the chucked state.

When reproduction is to be performed from the CD 9, already chucked by the first turntable 113 and the damper 112, in place of the MD 10 in the recording/reproduction mode, the driving unit 117 comes down once and moves to a point for the standby mode, with the MD 10 left in the holder 131. Then, the transporting gears 123 move on the horizontal portion 116c and the long vertical portion 116a of the rack 116. This causes the driving unit 117 to go up again to begin the reproducing operation of the CD 9. Hence, either of the media can be selected for reproduction by moving the driving unit 117 vertically and horizontally with the CD 9 and the MD 10 both accommodated in the frame member 100 at the same time. Moreover, as shown in FIG. 2, separate insertion slots are provided for the different media, and the CD 9 loading mechanism constituted by the roller 111, and the MD 10 loading mechanism constituted primarily by the cam member 133, the bracket 135, and the moving lever 136 are provided so that they can be independently operated. This arrangement makes it possible to insert or eject one of the media while the other medium is undergoing reproduction, thus permitting great convenience to users.

Referring now to FIG. 28 through FIG. 59, a recording medium driving apparatus in accordance with a third embodiment of the present invention will be described.

Figure 28:
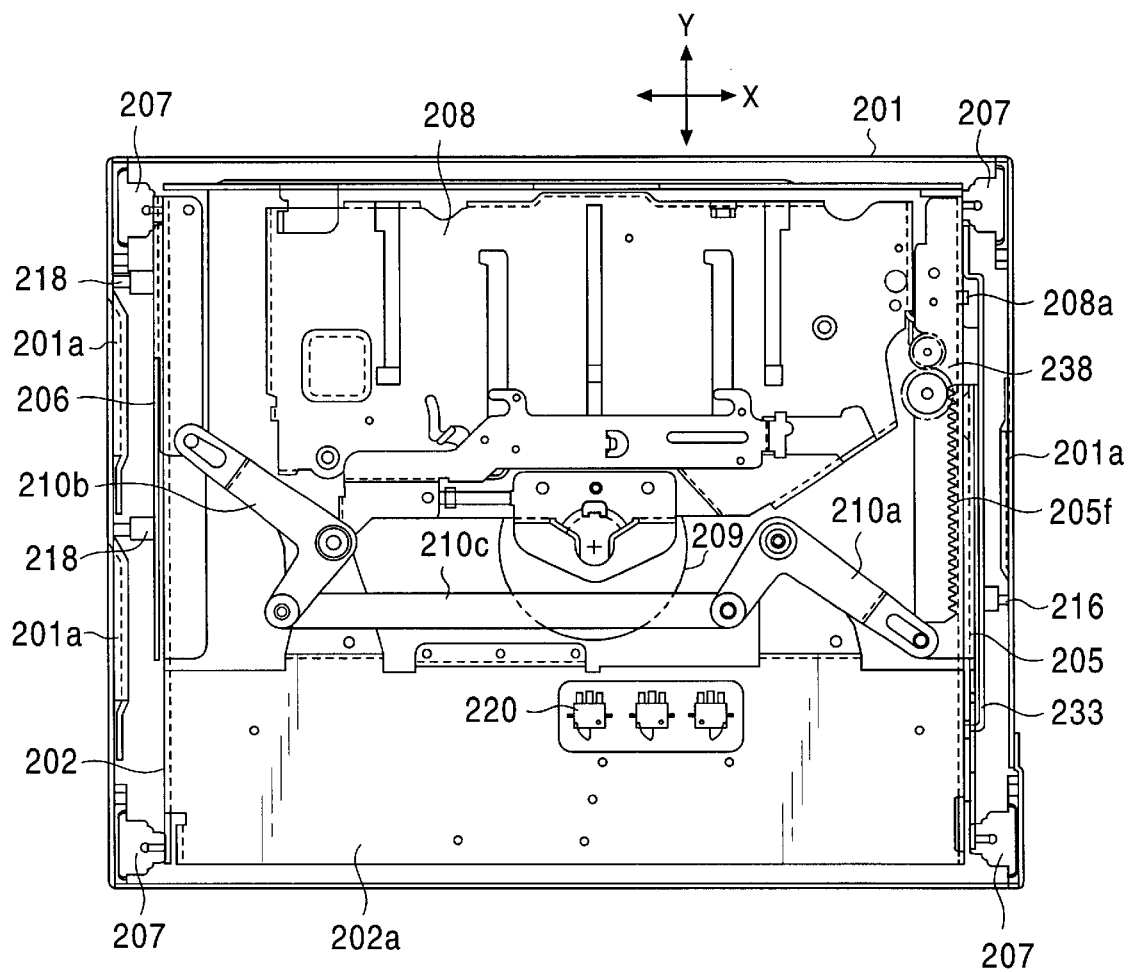
FIG. 28 is a top plan view of a recording medium driving apparatus in accordance with a third embodiment of the invention.
Figure 29:
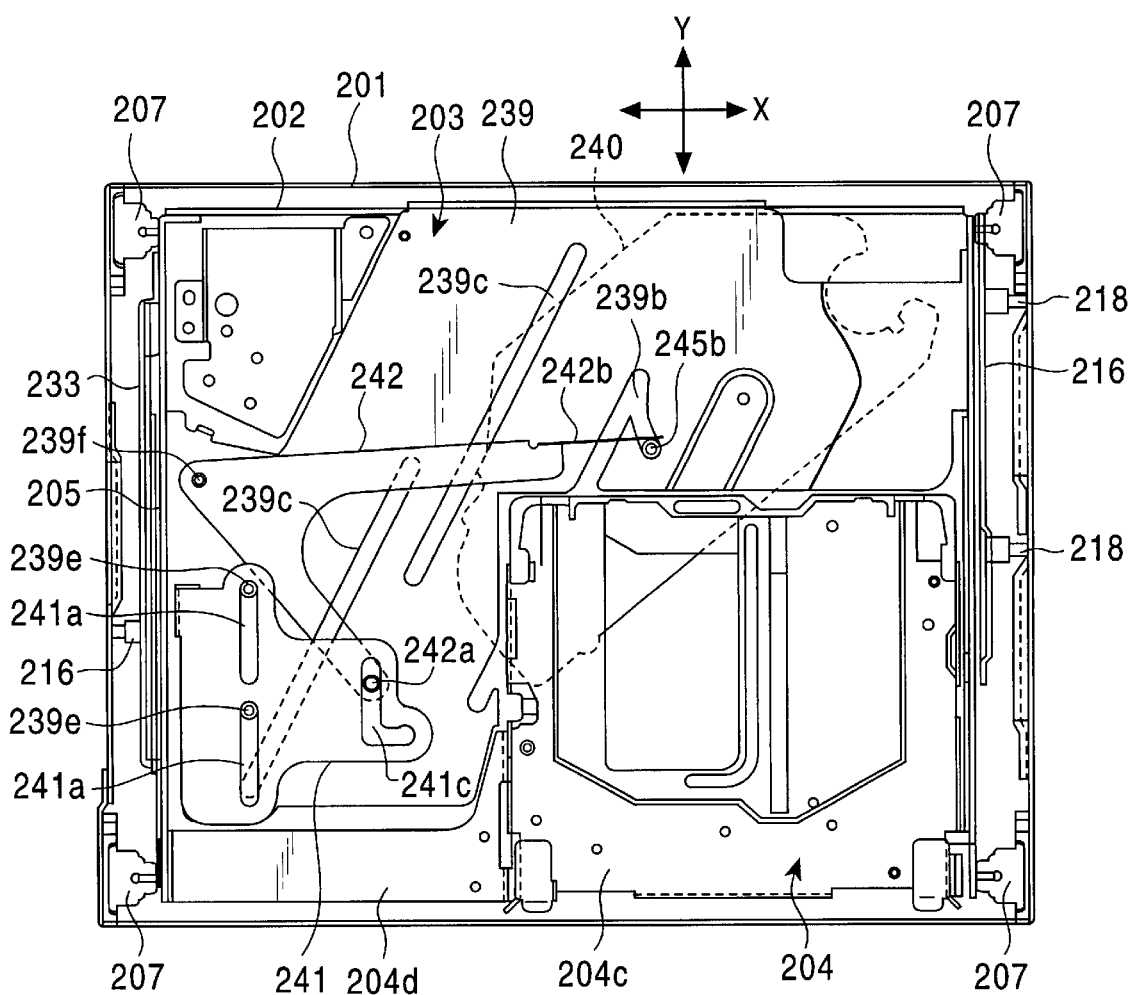
FIG. 29 is a bottom view of the recording medium driving apparatus.

As illustrated in FIG. 28 and FIG. 29, the recording medium driving apparatus in accordance with this embodiment is equipped with a frame member 201 installed in a predetermined position (e.g. in a console) in a vehicle, a main chassis 202 disposed in the frame member 201, a driving unit 203 capable of moving horizontally (in X and Y directions in the drawing) and vertically (in a Z direction in the drawing) with respect to the main chassis 202, a holder 204 for holding an MD that is capable of moving in a vertical direction with respect to the main chassis 202, and a pair of right and left slide cam plates 205 and 206 for driving the driving unit 203, the holder 204, etc.

The main chassis 202 is elastically supported by the frame member 201 via elastic members 207 such as oil dampers disposed at the four corners of the frame member 201. The main chassis 202 can be selectively locked by a locking mechanism which will be discussed hereinafter. In the locked state, the main chassis 202 is fixedly supported by the frame member 201. An arm clamp 208 is swingably supported at above the rear edge of the main chassis 202, a damper 209 being rotatably retained at the distal end of the arm clamp 208. A pair of link levers 210a and 210b is rotatably supported by an upper face plate 202a at the front of the main chassis 202, one end of each of the link levers 210a and 210b being coupled to another link lever 210c. The other ends of the link levers 210a and 210b are respectively coupled to the right and left slide cam plates 205 and 206. The two slide cam plates 205 and 206 are coupled so that they move in the opposite directions from each other in the longitudinal direction, namely, in the Y direction, via the link levers 210a, 210b, and 210c. The amount of longitudinal movement or the movement positions of the slide cam plates 205 and 206 are detected by a detecting means such as a linear position sensor (not shown).

Figure 30:
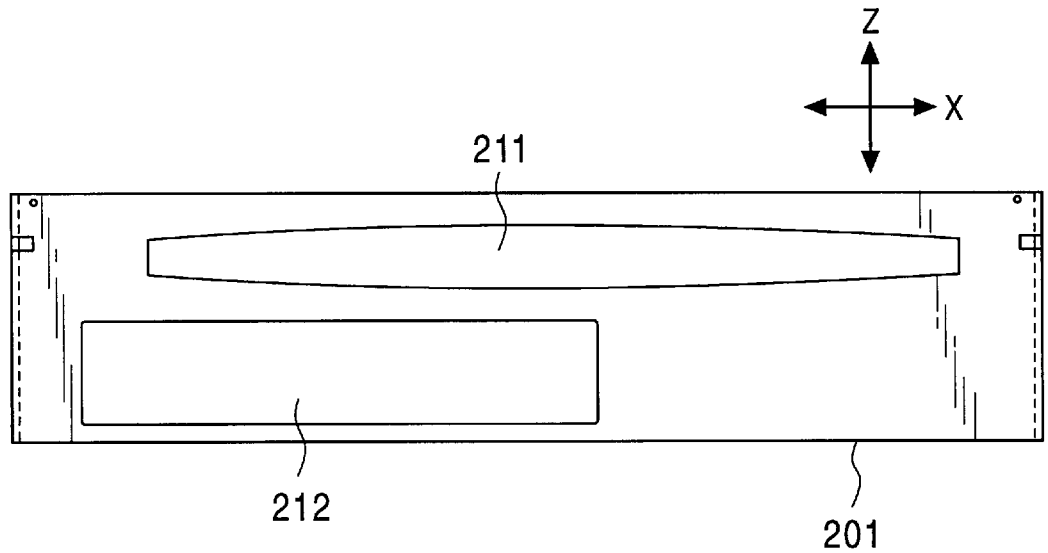
FIG. 30 is a front view of the recording medium driving apparatus.

As illustrated in FIG. 30, a CD insertion slot 211 and an MD insertion slot 212 are formed in the front plate of the frame member 201, the MD insertion slot 212 being positioned at bottom left in relation to the CD insertion slot 211. A CD 9, which is a first medium, is inserted in or ejected from the CD insertion slot 211, while an MD 10, which is a second medium, is inserted in or ejected from the MD insertion slot 212. The recording medium driving apparatus of the present embodiment is able to accommodate the CD 9 and the MD 10 simultaneously in the frame member 201 as it will be discussed hereinafter. In this case, the CD 9 and the MD 10 are accommodated so that they are flatly overlapped in the Z direction with each other at least partly.

Figure 31:
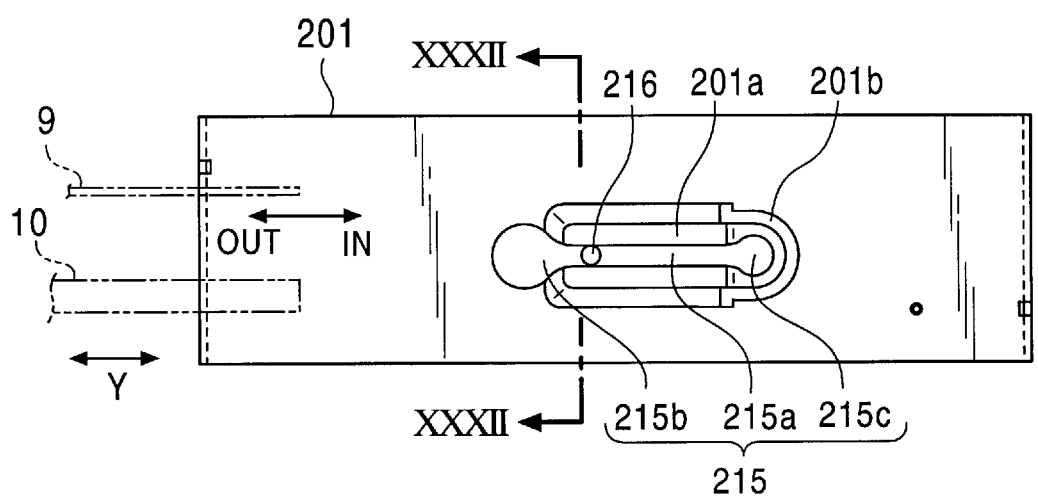
FIG. 31 is a right side view of the recording medium driving apparatus.
Figure 32:
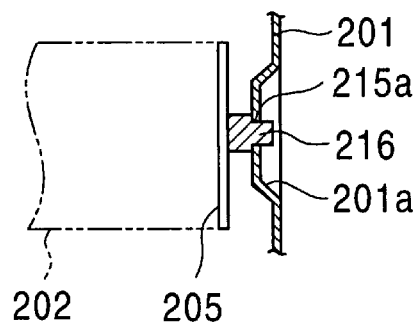
FIG. 32 is a sectional view taken at the line XXXII—XXXII of FIG. 31.
Figure 33:
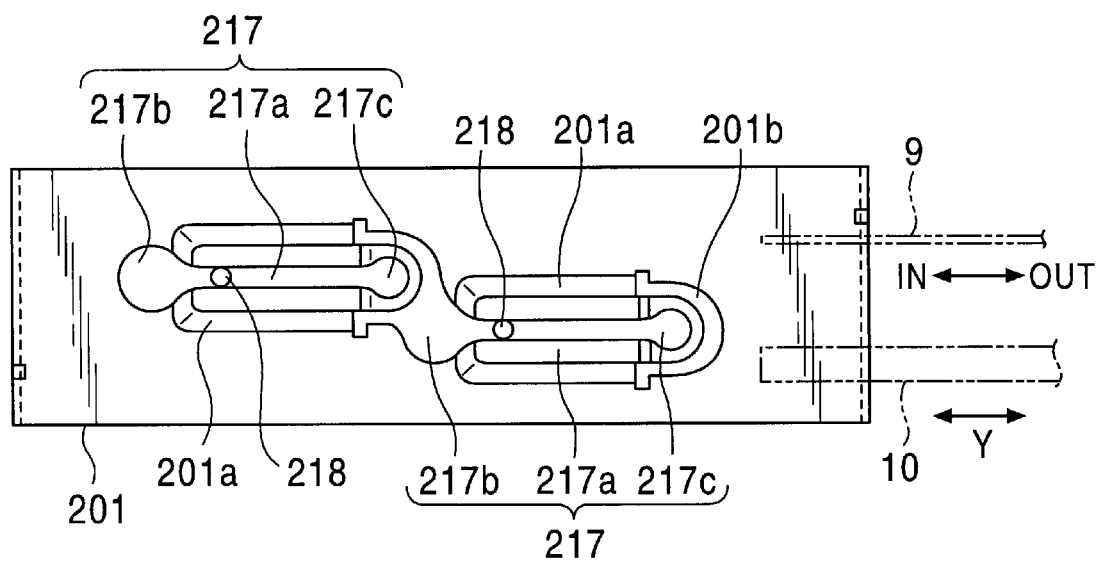
FIG. 33 is a left side view of the recording medium driving apparatus.

Referring to FIG. 31 and FIG. 32, an engaging opening 215 is provided in the right side plate of the frame member 201, the engaging opening 215 having a narrow locking portion 215a extending in the Y direction, and a large-diameter portion 215b and a small-diameter portion 215c being located at the ends of the locking portion 215a. In the right side plate of the frame member 201, a bulging portion 201a that surrounds the locking portion 215a is press-machined inward, and a relief hole 201b that surrounds the small-diameter portion 215c is provided. The locking pin 216 is free to reciprocate in the Y direction in the engaging opening 215, the locking pin 216 being implanted in the right slide cam plate 205. As shown in FIG. 33, the left side plate of the frame member 201 is provided with a pair of engaging openings 217. Each of these engaging openings 217 has a narrow locking portion 217a that extends in the Y direction, and a large-diameter portion 217b and a small-diameter portion 217c located at both ends of the locking portion 217a. As in the case of the right side plate, the left side plate of the frame member 201 is also provided with the bulging portion 201a which surrounds each locking portion 217a and which is press-machined inward, and the relief hole 201b that surrounds the small-diameter portion 217c. The locking pins 218 are free to reciprocate in the Y direction in the engaging openings 217, the locking pins 218 being implanted in the left slide cam plate 206.

The foregoing locking mechanism is constructed by the engaging openings 215 and 217, and the locking pins 216 and 218 associated with the engaging openings 215 and 217. As illustrated in FIGS. 31 and 33, when the locking pins 216 and 218 are in engagement with the locking portions 215a and 217a, the main chassis 202 is in the locked state wherein it is fixedly supported by the frame member 201. From this locked state, when the two slide cam plates 205 and 206 slide and the locking pins 216 and 218 reach the large-diameter portions 215b and 217b, or the small-diameter portions 215c and 217c, the main chassis 202 is placed in the unlocked state wherein it is elastically supported by the frame member 201 via the elastic members 207. The movement stroke amount or the amplitude of the main chassis 202 in the unlocked state is determined by a clearance produced between the locking pins 216 and 218 and the circumferences of the large-diameter portions 215b and 217b or the small-diameter portions 215c and 217c. This embodiment has been set so that, when the locking pins 216 and 218 are located in the large-diameter portions 215b and 217b, the movement stroke amount ranges from about ±3.5 mm to about ±2.6 mm, or when the locking pins 216 and 218 are located in the small-diameter portions 215c and 217c, the movement stroke amount is approximately ±1.5 mm.

Figure 34:
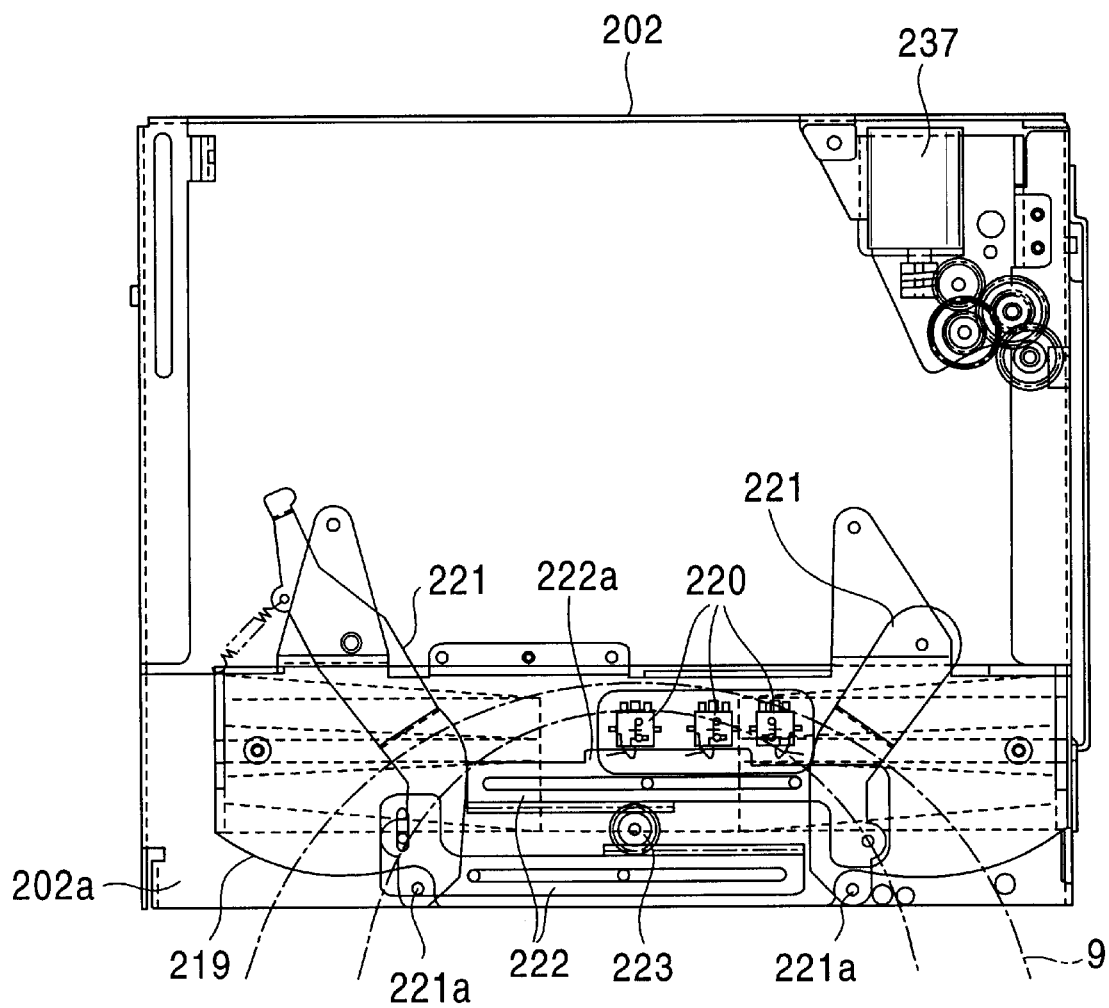
FIG. 34 is a top plan view showing a CD detecting mechanism.
Figure 35:
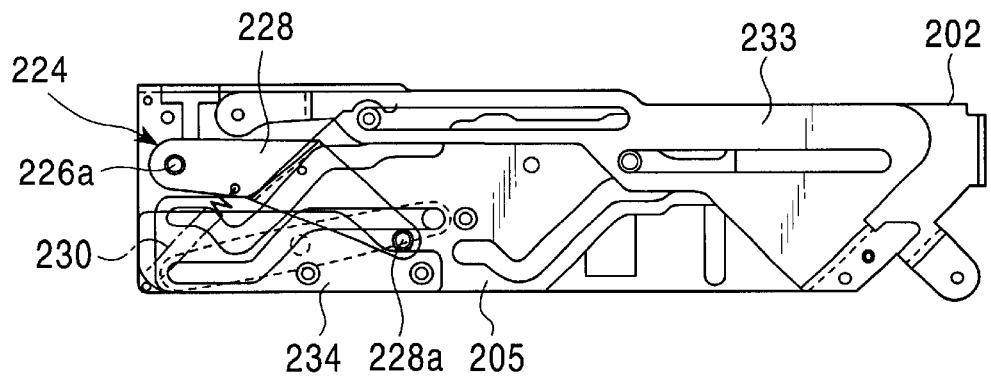
FIG. 35 is a right side view of the main chassis.
Figure 36:
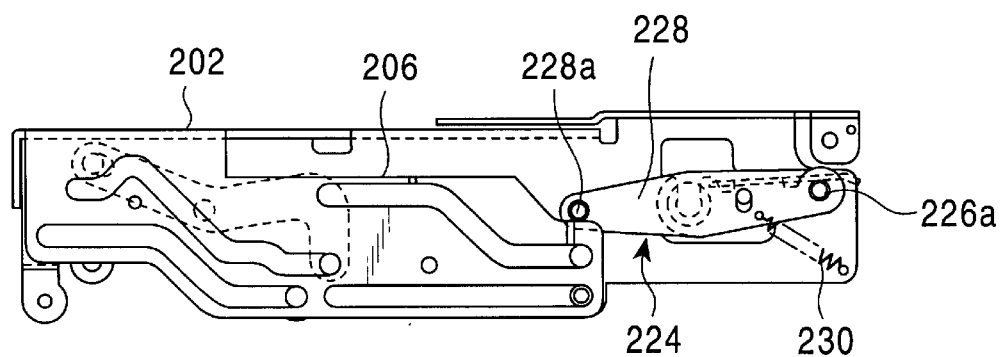
FIG. 36 is a left side view of the main chassis.
Figure 37:
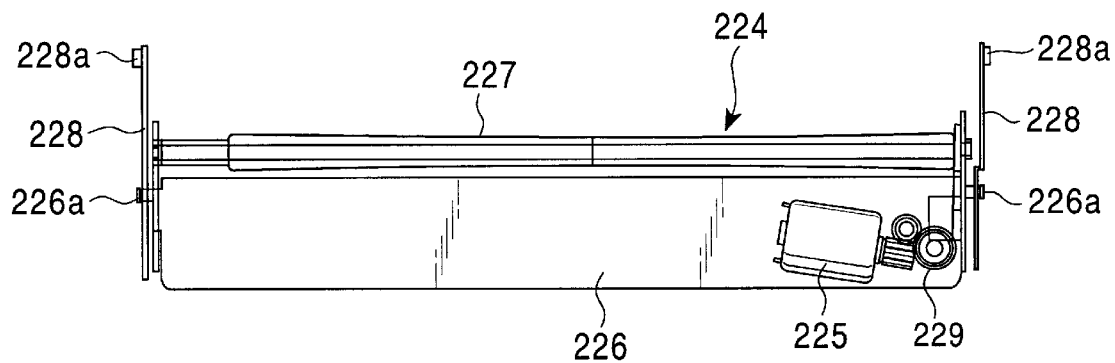
FIG. 37 is a schematic representation of a roller unit.
Figure 38:
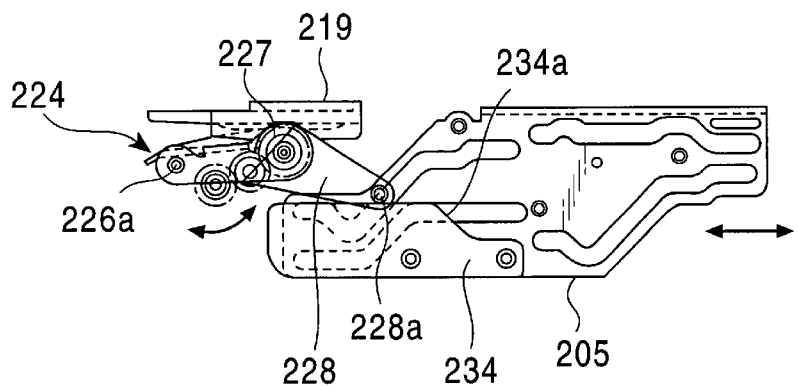
FIG. 38 is a right side view showing an operating mechanism of the roller unit.
Figure 39:
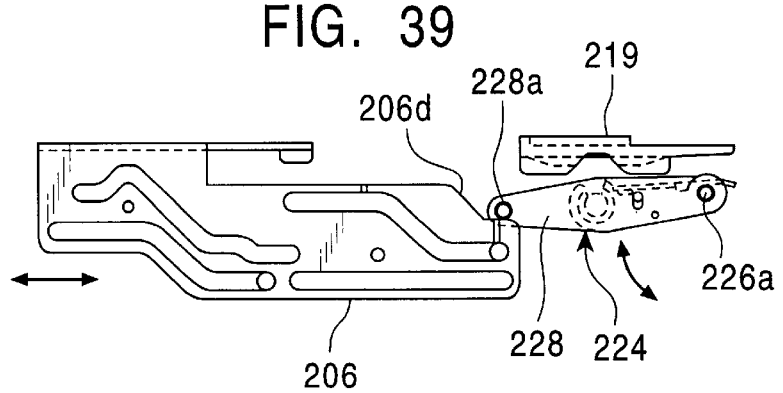
FIG. 39 is a left side view showing an operating mechanism of the roller unit.

Referring now to FIG. 34, a guide plate 219 made of a synthetic resin is attached to the back side of the top face plate 202a of the main chassis 202, a plurality of detection switches or detecting means 220 being mounted on the guide plate 219. A pair of rotatable detection levers 221, a pair of rack plates 222 that slides in synchronization with the rotation of the detection levers 221, and an idler gear 223 engaging the rack plates 222 are provided on the back surface of the top face plate 202a. The two detection levers 221 synchronously swing via the rack plates 222 and the idler gear 223. Detection pins 221a are provided at the distal ends of the detection levers 221, the detection pins 221a reaching a CD transport passage formed below the guide plate 219. Hence, when the CD 9 is inserted through the CD insertion slot 211, the circumferential edge of the CD 9 comes in contact with these two detection pins 221a, causing the two detection levers 221 to turn by a predetermined angle. A cam portion 222a is formed on one of the rack plates 222. The detection switches 220 are turned ON or OFF by the cam portion 222a. The detection switches 220 are selectively turned ON or OFF on the basis of the displacement amounts of the rack plates 222, that is, the rotational amounts of the detection levers 221. Therefore, it is possible to detect the size of the inserted CD 9, namely, whether the diameter of the CD 9 is 8 cm or 12 cm, or whether the CD 9 has been inserted or ejected, etc. on the basis of a combination of ON/OFF signals received from the detection switches 220. The detection switches 220, the detection levers 221 and the detection pins 221a, the rack plates 222 and the cam portion 222a, and the idler gear 223 constitute the CD insertion detecting means.

Referring now to FIG. 35 through FIG. 39, a roller unit 224 is supported at the front of the main chassis 202, the roller unit 224 facing the bottom surface of a guide plate or an opposing member 219 via the CD transport passage. The rear surface of the roller unit 224 is provided with a roller plate 226 to which a roller motor 225 is attached, a driving roller or a transporting member 227 rotatably supported by the roller plate 226, and a pair of roller brackets 228 integrally formed on both sides of the roller plate 226. The torque of the roller motor 225 is transmitted to the driving roller 227 via a reduction gear train 229. The roller unit 224 and the opposing member 219 constitute a CD carrying mechanism. The support shafts 226a of the roller plate 226 are rotatably supported by the right and left side plates of the main chassis 202, and urged by a spring 230 in a direction away from the bottom surface of the guide plate 219. Roller pins 228a are provided at the distal ends of the two roller brackets 228. As it will be described later, the roller pins 228a are operated by the right and left slide cam plates 205 and 206, and the roller unit 224 swings on the support shafts 226a as the roller pins 228a are operated. As is obvious from FIG. 59, the driving roller 227 and the roller unit 224 are provided at positions where they flatly overlap the holder 204.

Figure 40:
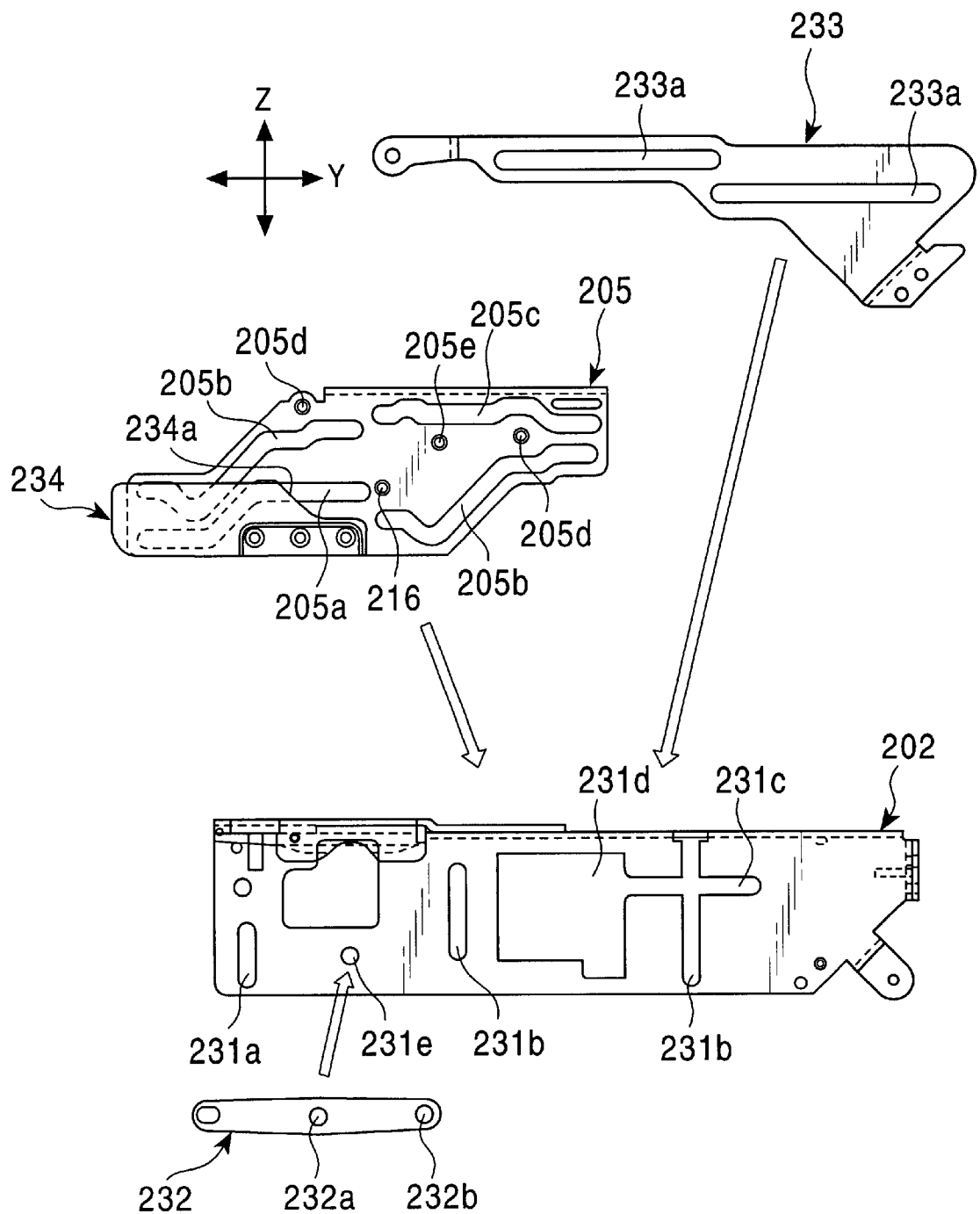
FIG. 40 is an exploded schematic representation of members incorporated in a right side plate of the main chassis.

Referring now to FIG. 40, the right side plate of the main chassis 202 is provided with a first vertical slot 231 a extending in the Z direction, a pair of second vertical slots 231b, and a horizontal slot 231c extending in the Y direction. A relief opening 231d is provided at one end of the horizontal slot 231c. A shaft hole 231e is provided between the first vertical slot 231a and the second vertical slot 231b on the front side, and a support shaft 232a of a phase reversing lever 232 is rotatably installed in the shaft hole 231e. An auxiliary plate 233 is screwed to the outside of the right side plate of the main chassis 202 with a predetermined clearance provided therebetween, the foregoing right slide cam plate 205 being movably disposed in the clearance.

The slide cam plate 205 is provided with a first cam slot 205a and a pair of second cam slots 205b, and a third cam slot 205c, the two second cam slots 205b being formed in the same shape. The locking pin 216 and a pair of guide pins 205d extend outward and a kicking pin 205e extends inward from the slide cam plate 205. Both guide pins 205d are in engagement with guide slots 233a provided in the auxiliary plate 233, so that the slide cam plate 205 is guided in the Y direction or in the longitudinal direction of the main chassis 202. The kicking pin 205e penetrates the relief opening 231d and reaches the inside of the right side plate of the main chassis 202. The kicking pin 205e reciprocates in the horizontal slot 231c as the slide cam plate 205 moves longitudinally. Furthermore, a cam plate 234 is screwed to the lower outer surface of the slide cam plate 205. The first cam slot 205a and the second cam slots 205b are partly covered by the cam plate 234. A stepped cam portion 234a is formed on the top surface of the cam plate 234. The right roller pin 228a of the aforesaid roller unit 224 is pressed into contact with the cam portion 234a (see FIG. 38).

Figure 41:
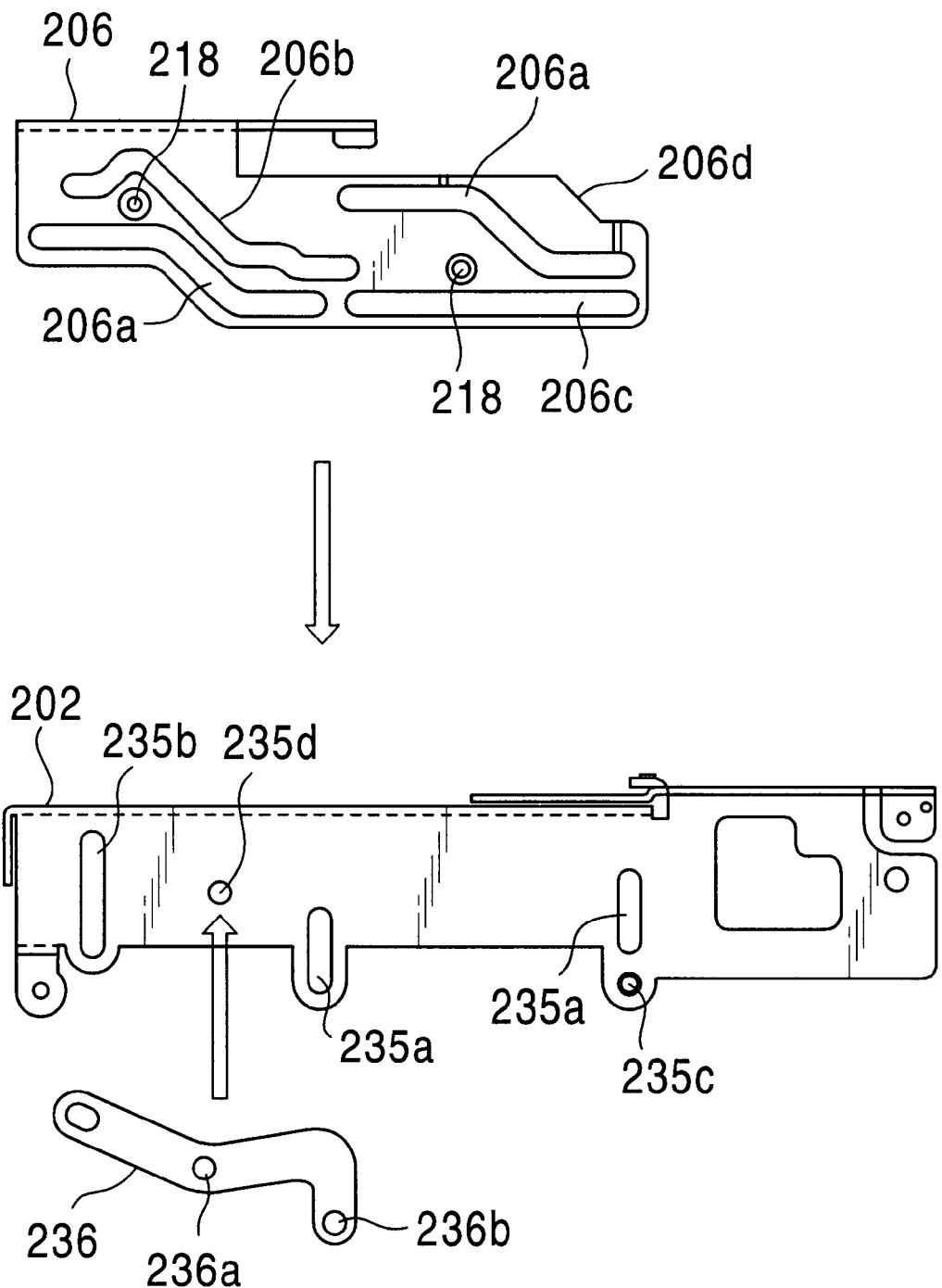
FIG. 41 is an exploded schematic representation of members incorporated in a left side plate of the main chassis.

Referring to FIG. 41, the left side plate of the main chassis 202 is provided with a pair of first vertical slots 235a and a second vertical slot 235b that extend in the vertical direction, a guide pin 235c being positioned under the first vertical slot 235a on the front side. Furthermore, a shaft hole 235d is provided between the first vertical slot 235a on the rear side and the second vertical slot 235b. A support shaft 236a of a phase reversing lever 236 is rotatably installed in the shaft hole 235d. The aforesaid left slide cam plate 206 is disposed on the outer side of the phase reversing lever 236. The slide cam plate 206 is provided with a pair of first cam slots 206a sharing the same configuration, a second cam slot 206b, and a guide slot 206c. The guide slot 206c is in engagement with the guide pin 235c of the main chassis 202, so that the slide cam plate 206 is guided in the Y direction or in the longitudinal direction of the main chassis 202. Furthermore, a stepped cam portion 206d is formed on the top surface on the front side of the slide cam plate 206. The left roller pin 228a of the foregoing roller unit 224 is pressed into contact with the cam portion 206d (see FIG. 39).

Referring to FIG. 42, a pin 204a provided on the right side portion of the holder 204 penetrates the first vertical slot 231a of the main chassis 202 and is coupled to one end of the phase reversing lever 232. A pin 232b provided on the other end of the phase reversing lever 232 is slidably inserted in the first cam slot 205a of the slide cam plate 205. Two pins 203a provided on the right side portion of the driving unit 203 are inserted in the second vertical slots 231b of the main chassis 202 and further inserted in the second cam slots 205b of the slide cam plate 205. A pin 208a provided on the right side portion of the arm clamp 208 is inserted in the second vertical slot 231b of the main chassis 202 and further inserted in the third cam slot 205c of the slide cam plate 205.

Referring now to FIG. 43, two pins 204b provided on the left side portion of the holder 204 are inserted in the first vertical slots 235a of the main chassis 202 and engaged with the first cam slots 206a of the slide cam plate 206. Furthermore, a pin 203b provided on the left side portion of the driving unit 203 is inserted in the second vertical slot 235b of the main chassis 202 and coupled to one end of the phase reversing lever 236. A pin 236b provided on the other end of the phase reversing lever 236 is inserted in the second cam slot 206b of the slide cam plate 206.

Figure 44:
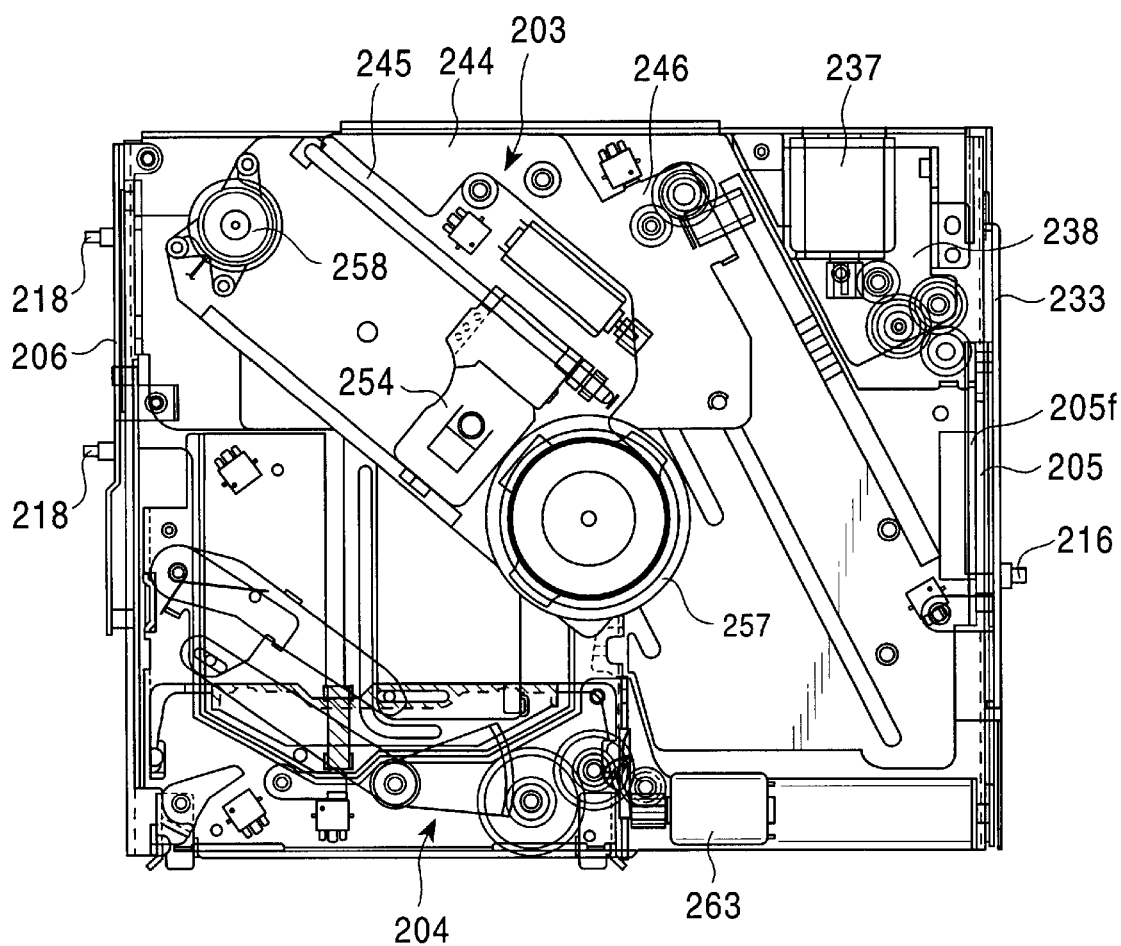
FIG. 44 is a top plan view of a driving unit and a holder when a CD is in the reproduction mode.

Referring to FIG. 44, a driving motor 237 is attached to the bottom plate of the main chassis 202, and the torque of the driving motor 237 is transmitted to a rack portion 205f of the right slide cam plate 205 via a reduction gear train 238. Hence, when the driving motor 237 is rotated in the forward or reverse direction, the two slide cam plates 205 and 206 coupled via the link levers 210a, 210b, and 210c move forward or backward in the opposite directions to each other on both side plates of the main chassis 202 (see FIG. 28). Furthermore, the aforesaid driving unit 203 and the holder 204 are disposed inside the main chassis 202, and the driving unit 203, the holder 204, and the roller unit 224 are transferred in the vertical direction or the Z direction by a driving mechanism composed of the driving motor 237, the reduction gear train 238, the link levers 210a, 210b, and 210c, and the two slide cam plates 205 and 206. The driving unit 203 and the holder 204 will now be described in detail.

Figure 46:
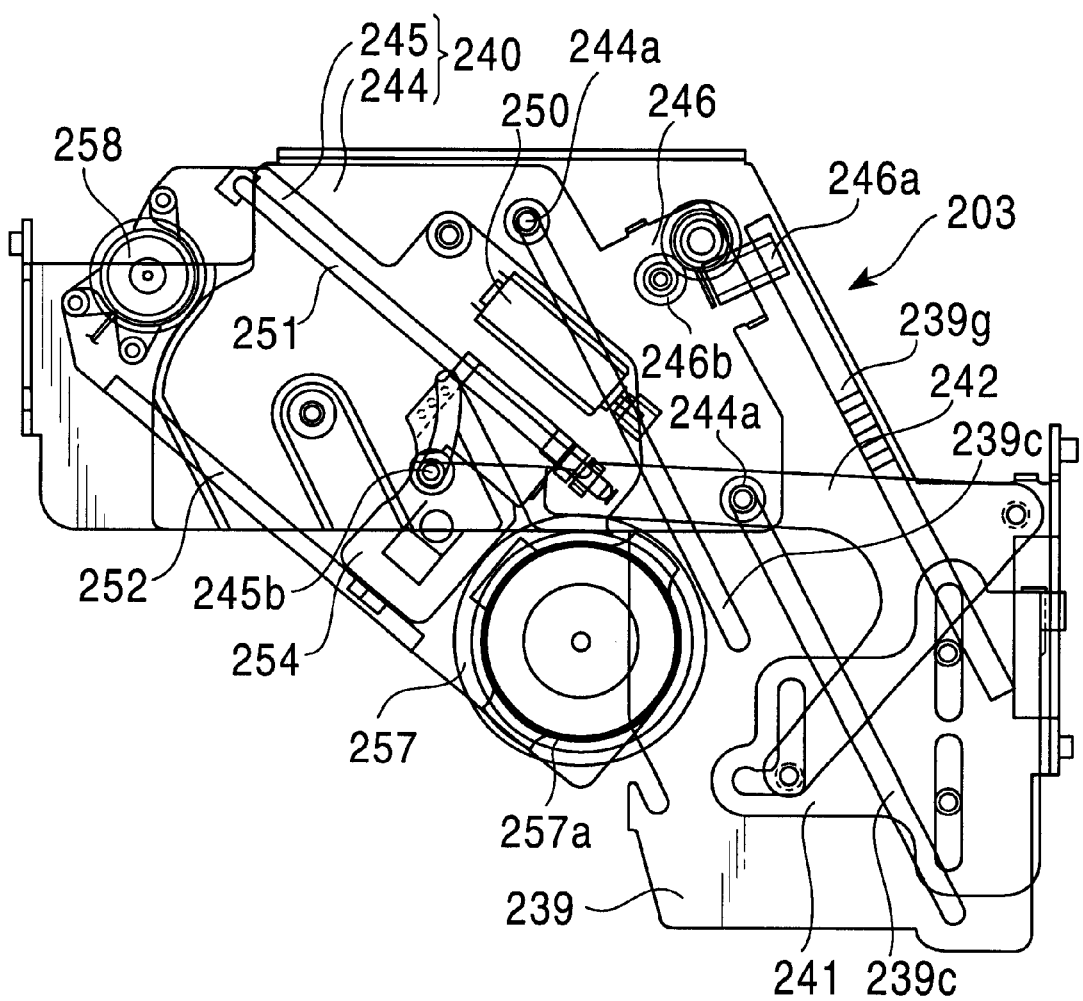
FIG. 46 is a top plan view of the driving unit when the CD is in the reproduction mode.
Figure 47:
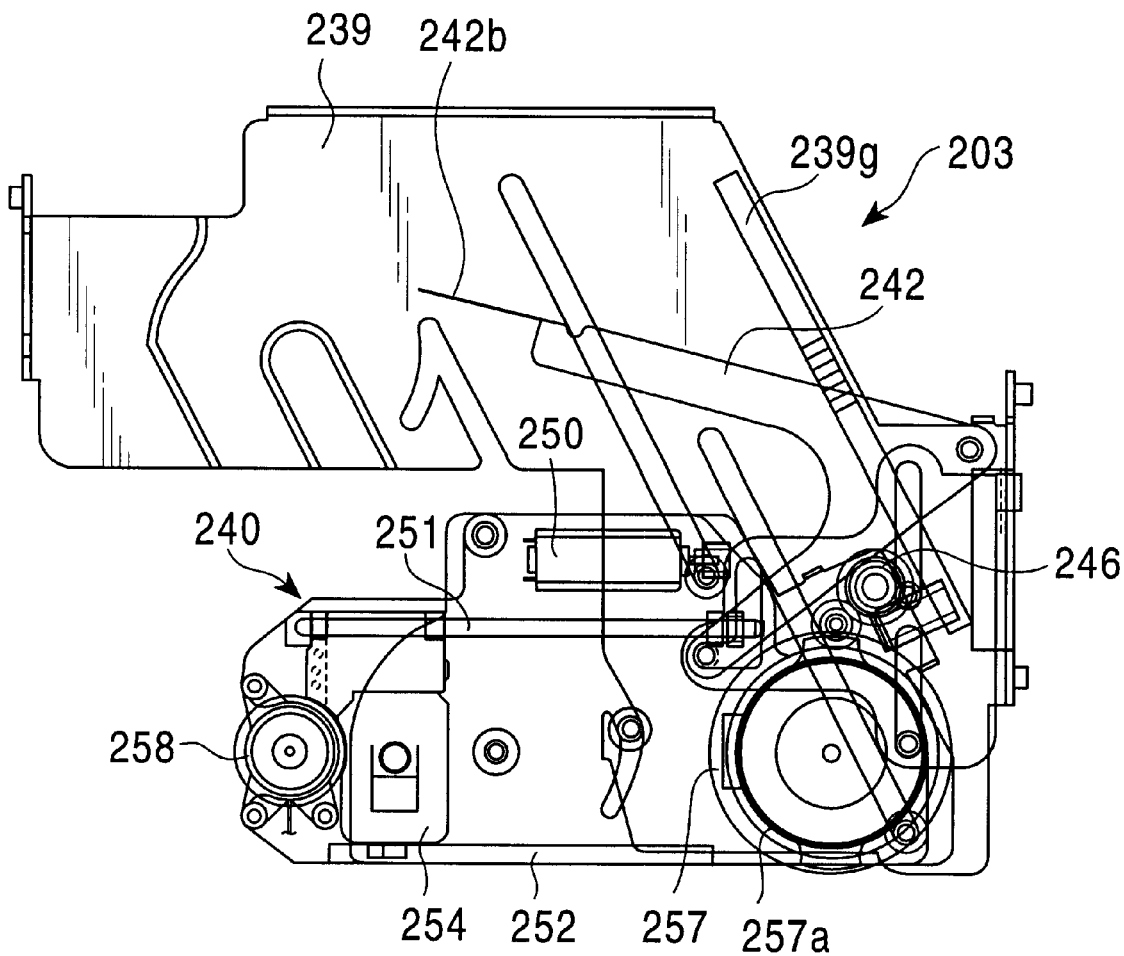
FIG. 47 is a top plan view of a driving unit when an MD is in a recording/reproduction mode.
Figure 48:
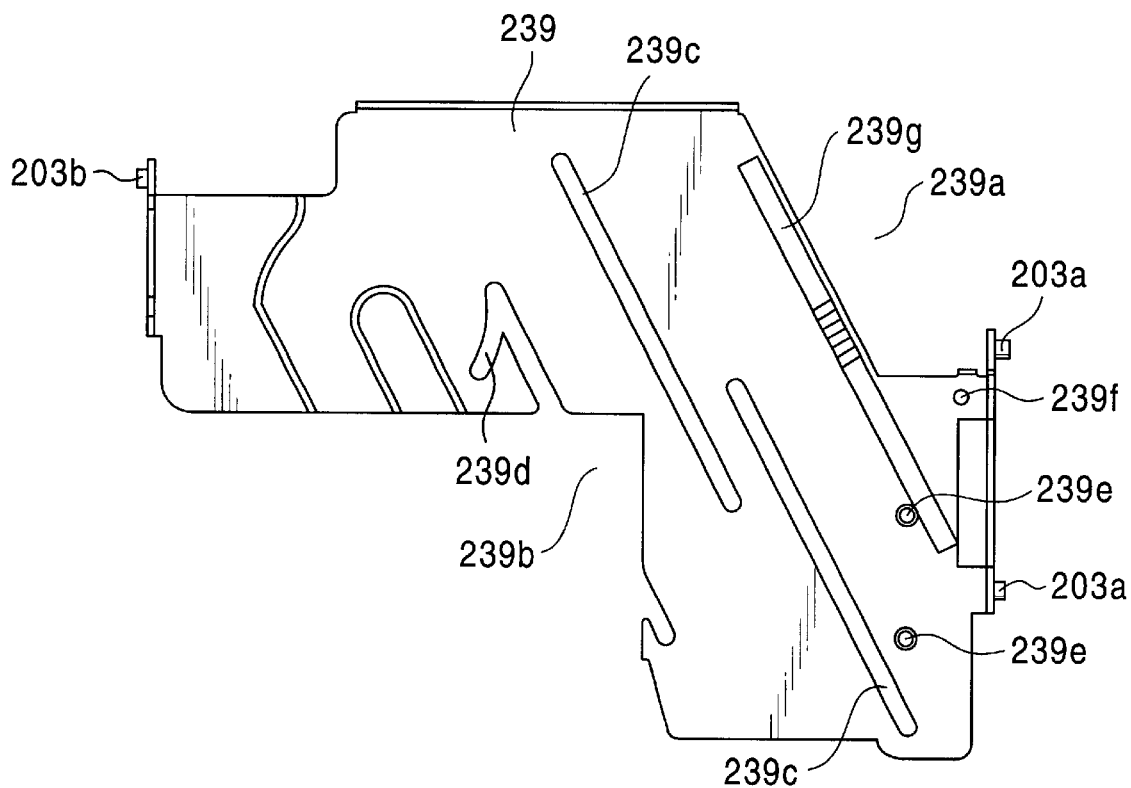
FIG. 48 is a top plan view of a sub-chassis.

Referring to FIG. 29 and FIG. 45 through FIG. 47, the driving unit 203 is equipped with a sub-chassis 239 and a driving chassis 240, the driving chassis 240 being rested on the sub-chassis 239. As shown in FIG. 48, the foregoing pins 203a and 203b are implanted in the right side portion and the left side portion, respectively, of the sub-chassis 239. These pins 203a and 203b are driven as the right and left slide cam plates 205 and 206 move forward or backward, causing the sub-chassis 239 to move in the vertical or Z direction in relation to the main chassis 202. Cutouts 239a and 239b are formed at the top right corner and the bottom left corner, respectively, of the sub-chassis 239 in FIG. 48. The cutout 239a at the top right comer prevents the sub-chassis 239 and the driving motor 237 from coming into contact with each other, while the cutout 239b at the bottom left corner prevents the sub-chassis 239 and the holder 204 from coming into contact with each other. Furthermore, an obliquely extending self-propelling rack 239g is provided on the sub-chassis 239, and a pair of linear guide slots 239c extending in parallel to the self-propelling rack 239g and a semi-arc guide slot 239d are also provided.

Figure 49:
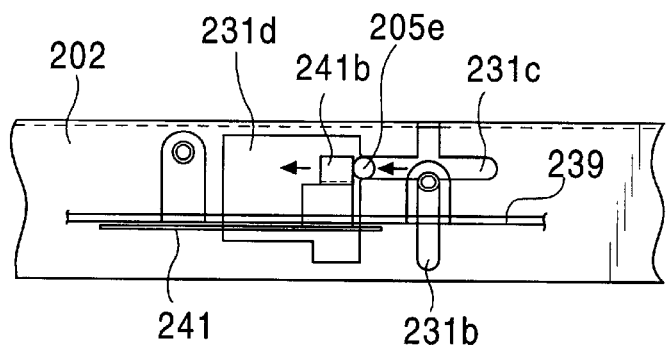
FIG. 49 is a schematic representation illustrating an operating mechanism of a slide lever.

A slide lever 241 and a swing lever 242 are provided on the rear surface of the sub-chassis 239. Two support shafts 239e provided on the sub-chassis 239 are inserted in a pair of slots 241 a formed in the slide lever 241. The slide lever 241 is urged toward the rear of the sub-chassis 239 by a spring 243, and an abutting portion 241b projecting above the sub-chassis 239 is formed on the right side portion of the slide lever 241 by bending as illustrated in FIG. 49. The abutting portion 241 b opposes the kicking pin 205e provided on the right slide cam plate 205. When the kicking pin 205e pushes the abutting portion 241b as the slide cam plate 205 moves forward, the slide lever 241 moves forward against the urging force of the spring 243. The swing lever 242 is rotatably supported by a support shaft 239f provided on the sub-chassis 239. A pin 242a provided on one end of the swing lever 242 engages an L-shaped cam slot 241c of the slide lever 241. Therefore, the pin 242a moves in the cam slot 241c as the slide lever 241 moves forward or backward, and the swing lever 242 turns on the support shaft 239f. The other end of the swing lever 242 provides a driving portion 242b that extends toward the semi-arc guide slot 239d of the sub-chassis 239.

Figure 50:
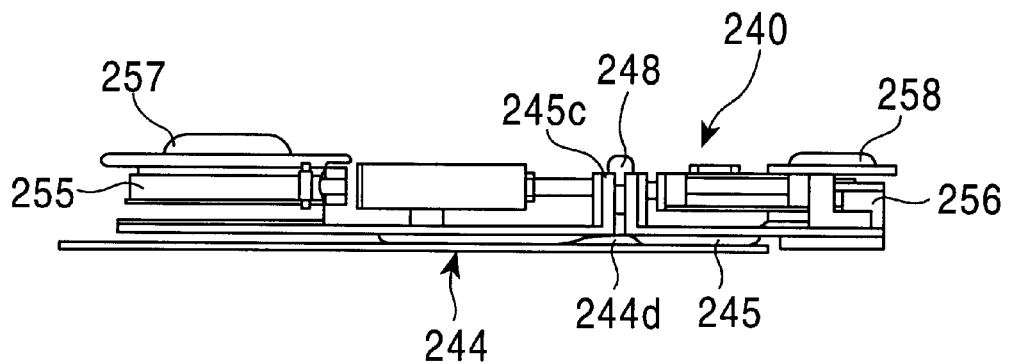
FIG. 50 is a rear view of a driving chassis.
Figure 51:
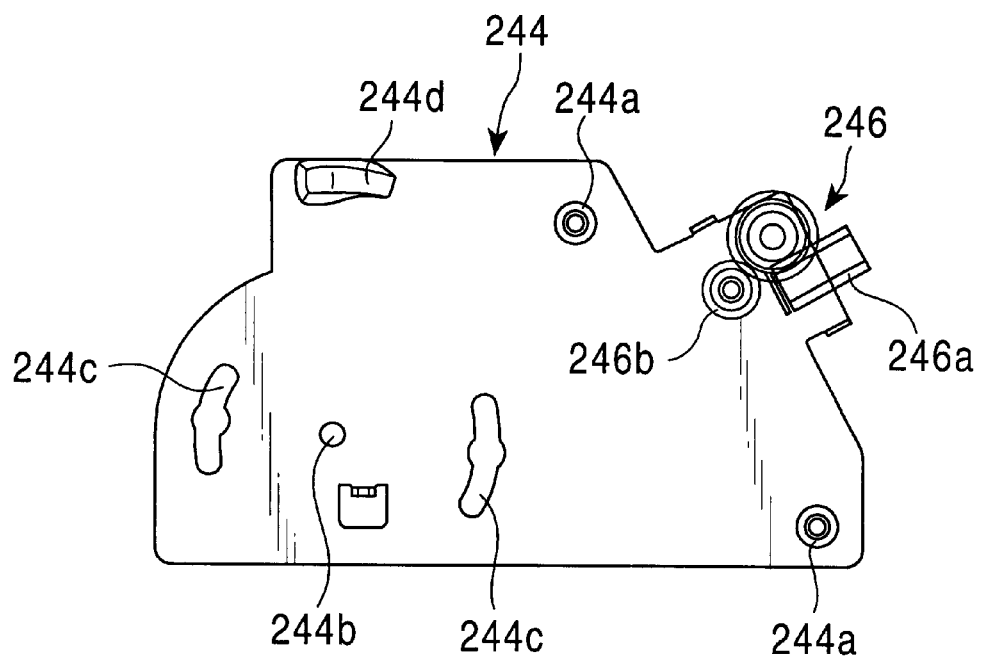
FIG. 51 is a top plan view of a base.

Referring to FIG. 50, the driving chassis 240 is formed by a base 244 placed on the sub-chassis 239 and a support member 245 placed on the base 244. Referring now to FIG. 51, two guide pins 244a are provided on the base 244. The guide pins 244a are slidably inserted in the linear guide slots 239c thereby to enable the base 244 to reciprocate aslant in a horizontal surface, i.e. an X-Y plane, along the self-propelling rack 239g on the sub-chassis 239. In this case, a part of the base 244 moves across a cutout 239b of the sub-chassis 239. A driven gear train 246 is provided on the base 244. A gear 246a of the driven gear train 246 is always in engagement with the self-propelling rack 239g. The base 244 is further provided with a shaft hole 244b, a pair of relief openings 244c, and a tapered protruding cam portion 244d formed at the rear end thereof. The cam portion 244d functions as a control means for controlling the amount of the projection of a first locator pin 248, which will be described later, from the support member 245.

Figure 52:
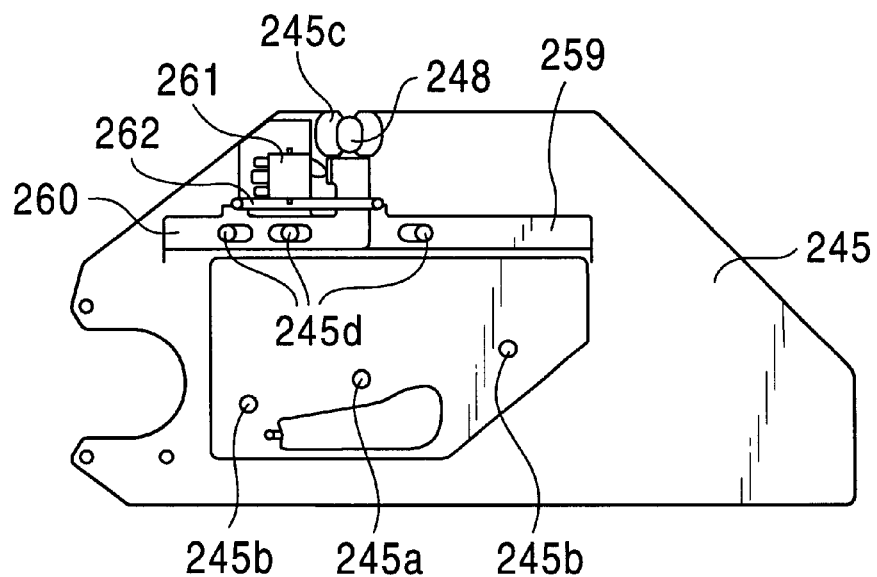
FIG. 52 is a top plan view of a support assembly.

Referring now to FIG. 52, a support shaft 245a and a pair of guide pins 245b are provided on the support member 245, the support shaft 245a and the guide pins 245b being inserted in the shaft hole 244b and the relief openings 244c, respectively, of the base 244. Referring back to FIG. 29, one of the guide pins 245b penetrates a relief opening 244c of the base 244 and reaches the semi-arc guide opening 239d of the sub-chassis 239 so that it opposes the driving portion 242b of the swing lever 242 at the rear surface of the sub-chassis 239. Therefore, when the driving portion 242b pushes the guide pin 245b as the swing lever 242 turns, the support member 245 swings on the support shaft 245a by a predetermined angle (approximately 40 degrees in this embodiment) within a horizontal plane on the base 244. In this case also, a part of the support member 245 swings across the cutout 239b of the sub-chassis 239. A spring 247 is tightly stretched between the base 244 and the support member 245 (see FIG. 45), and the support member 245 is urged counterclockwise by the spring 247.

Figure 53A:
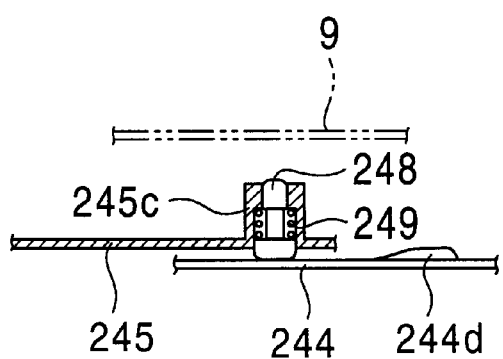
FIG. 53 is a schematic representation of an operation of a first locator pin.
Figure 53B:
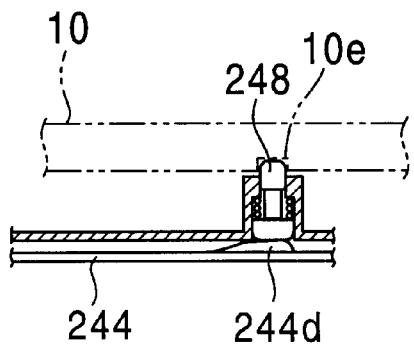

A tubular guide portion 245c protrudes from the rear end of the support member 245. In the guide portion 245c, the first locator pin 248 is retained so that it may move vertically (extend or retract vertically), and a spring 249 serving as an elastic member for urging the first locator pin 248 downward or toward the base 244 is also accommodated. The first locator pin 248 that positions the cartridge case 10b of the MD 10 changes the amount of its projection from the guide portion 245c according to the swing of the support member 245. To be more specific, as shown in FIG. 53A, when the support member 245 has turned by the predetermined angle with respect to the base 244, the lower end of the first locator pin 248 is in contact with the flat surface of the base 244 under a spring force of the spring 249, and the upper end of the first locator pin 248 hardly projects from the guide portion 245c. Conversely, as illustrated in FIG. 53B, when the support member 245 is in a state where it is overlapped with the base 244 without turning, the lower end of the first locator pin 248 is on the cam portion 244d of the base 244 to compress the spring 249, causing the upper end of the first locator pin 248 to project considerably from the guide portion 245c. As it will be discussed later, the first locator pin 248 is in the retracted state as shown in FIG. 53A during the reproducing operation of the CD 9; hence, a sufficient clearance is secured between the upper end of the first locator pin 248 and the bottom surface of the CD 9, thereby reliably preventing damage to the recording surface of the CD 9 caused by contact with the first locator pin 248. In addition, during the recording/reproducing operation of the MD 10, the first locator pin 248 is in the projected state as illustrated in FIG. 53B, so that the upper end of the first locator pin 248 is sufficiently inserted in a locator hole 10e provided in the back side of the cartridge case 10b, leading to higher accuracy of positioning of the MD 10.

Referring back to FIG. 45 through FIG. 47, a thread motor 250 is mounted on the support member 245, and a screw shaft 251 and a guide shaft 252 are supported in parallel to each other. The screw shaft 251 uses the thread motor 250 as a driving source and rotates via a gear train 253. The rotation of the screw shaft 251 is transmitted to an optical pickup 254 via an internal thread member (not shown), thereby reciprocating the optical pickup 254 along the screw shaft 251 and the guide shaft 252. The foregoing thread motor 250, the screw shaft 251, the guide shaft 252, and the gear train 253 constitute a transferring mechanism of the optical pickup 254. On the support member 245, a CD spindle motor 255 and an MD spindle motor 256 are mounted with the moving area of the optical pickup 254 lying therebetween (see FIG. 50). A CD turntable 257 and an MD turntable 258 are installed on the rotating shafts of the two spindle motors 255 and 256. A driving gear 257a is integrally provided on the bottom peripheral surface of the CD turntable 257. The driving gear 257a and a gear 246b of the driven gear train 246 provided on the base 244 are adapted to selectively mesh as the support member 245 rotates. The aforesaid driving gear 257a, the driven gear train 246, and the self-propelling rack 239g make up a horizontal moving mechanism for horizontally moving the driving chassis 240, including the base 244 and the support member 245, in the longitudinal direction in the horizontal plane on the sub-chassis 239.

Figure 45:
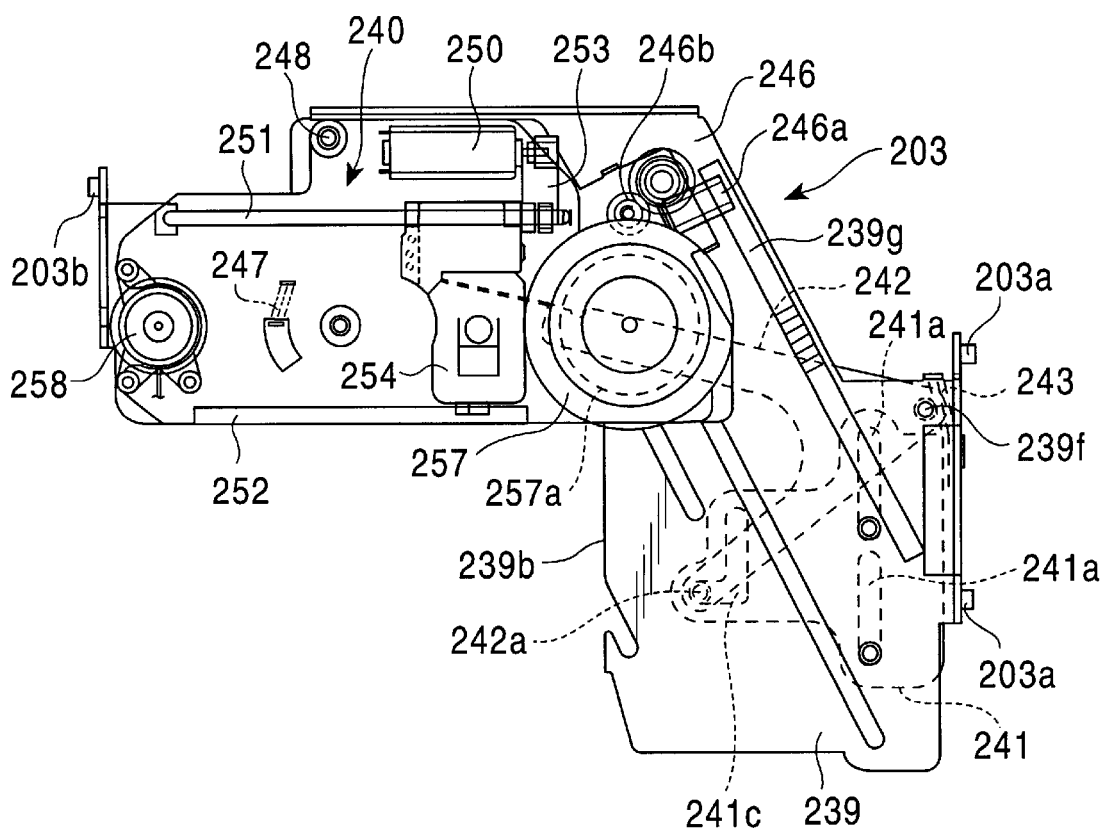
FIG. 45 is a top plan view of the driving unit.

More specifically, when the support member 245 has turned by a predetermined angle with respect to the base 244 as shown in FIG. 46, the driving gear 257a and the gear 246b of the driven gear train 246 are away from each other, so that the rotation of the CD turntable 257 is not transmitted to the driven gear train 246. When the support member 245 turns counterclockwise from this state to reach the position where the support member 245 overlaps the base 244 as illustrated in FIG. 45, the driving gear 257a meshes with the gear 246b of the driven gear train 246. Thus, when the CD turntable 257 rotates in one direction in that state, the rotation is transmitted from the driving gear 257a via the gear 246b to the gear 246a of the driven gear train 246. This causes the base 244 together with the support member 245 to move forward obliquely on the sub-chassis 239 along the self-propelling rack 239g as shown in FIG. 47. When the CD turntable 257 rotates in the other direction in the state illustrated in FIG. 47, the base 244 together with the support member 245 return to a position shown in FIG. 45 by using the rotation of the CD turntable 257 as its driving source, and when the support member 245 rotates clockwise at that position, the driving gear 257a and the gear 246b of the driven gear train 246 are placed in a state where they are away from each other as illustrated in FIG. 46. Thus, the support member 245 itself functions as a transmitting mechanism for selectively transmitting the torque of the CD spindle motor 255 to the horizontal moving mechanism.

Figure 54:
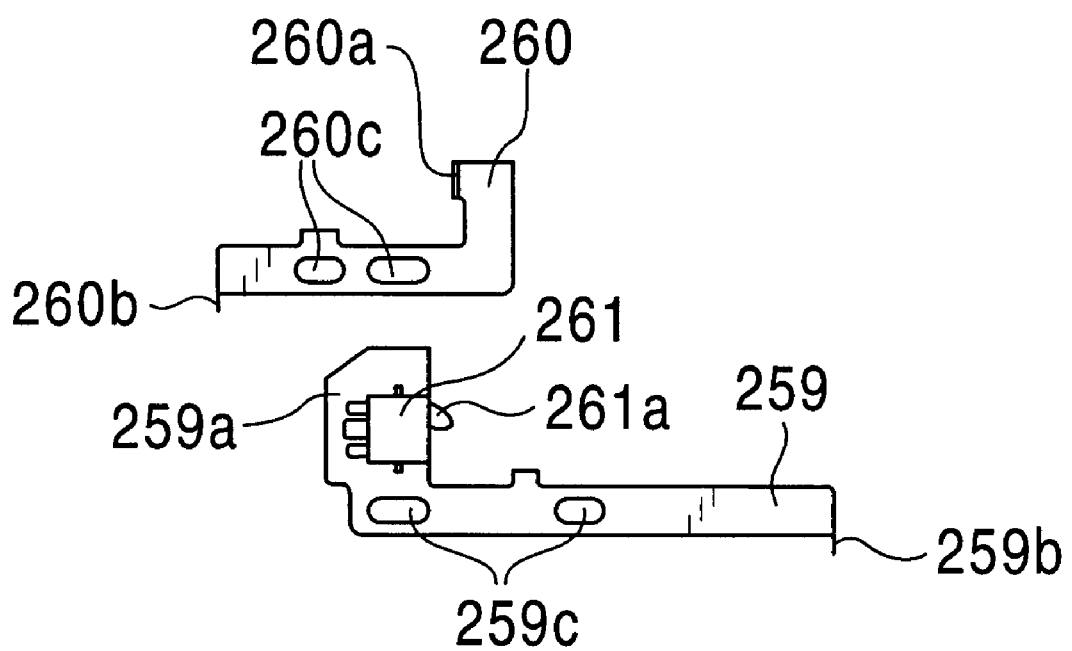
FIG. 54 is a schematic representation of a first lever member and a second lever member.

First and second lever members 259 and 260 are slidably provided on the support member 245, and a limit switch 261 is mounted on the first lever member 259. Referring to FIG. 52 and FIG. 54, the first lever member 259, which is L-shaped, is provided with a mounting portion 259a on one end thereof and a receiving portion 259b on the other end thereof, and a pair of slots 259c at the middle thereof. The limit switch 261 is mounted on the mounting portion 259a. The receiving portion 259b extends into the moving area of the optical pickup 254 so as to oppose the right side surface of the optical pickup 254. The two slots 259c are fitted to the guide pins 245d provided on the support member 245 thereby to enable the lever member 259 to slide on the support member 245 in an axial direction of both shafts 251 and 252, i.e. in the same direction as the direction in which the optical pickup 254 moves.

The second lever member 260 formed in a reversed L shape is provided with an operating portion 260a at one end thereof, a receiving portion 260b at the other end thereof, and a pair of slots 260c at the middle thereof. The middle portion of the second lever 260 is placed over the middle portion of the first lever member 259, both lever members 259 and 260 being urged by a spring 262 in such directions that the mounting portion 259a and the operating portion 260a are away from each other. The operating portion 260a opposes a driving portion 261a of the limit switch 261, and the receiving portion 260b extends into the moving area of the optical pickup 254 so that it opposes the left side surface of the optical pickup 254. The two slots 260c are fitted to the guide pins 245d thereby to also enable the second lever member 260 to slide on the support member 245 in an axial direction of both shafts 251 and 252, i.e. in the same direction as the direction in which the optical pickup 254 moves.

Figure 55A:
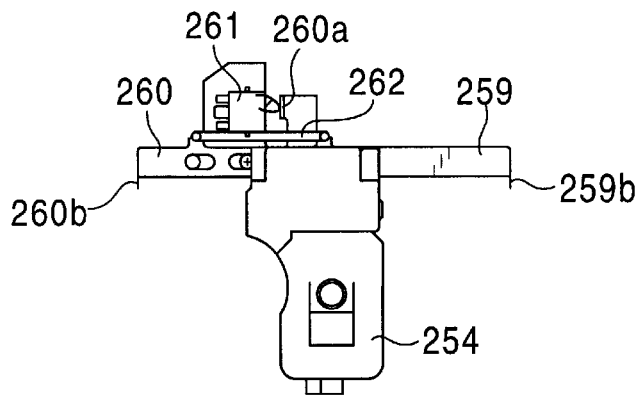
FIG. 55 is a schematic representation of an operation of a limit switch actuated by an optical pickup.

The limit switch 261 is used to detect the position of the inner circumferential edge of the optical pickup 254 in relation to the CD 9 and the MD 10. The limit switch 261 is operated when the optical pickup 254 is transferred to a right or left end. To be more specific, when the optical pickup 254 is in a neutral position other than the ends of the screw shaft 251 and the guide shaft 252 as illustrated in FIG. 55A, the receiving portions 259b and 260b of the two lever members 259 and 260 are away from the side surface of the optical pickup 254, and the operating portion 260a is not pressing the driving portion 261a of the limit switch 261; therefore, the limit switch 261 is maintained in an OFF state.

Figure 55B:
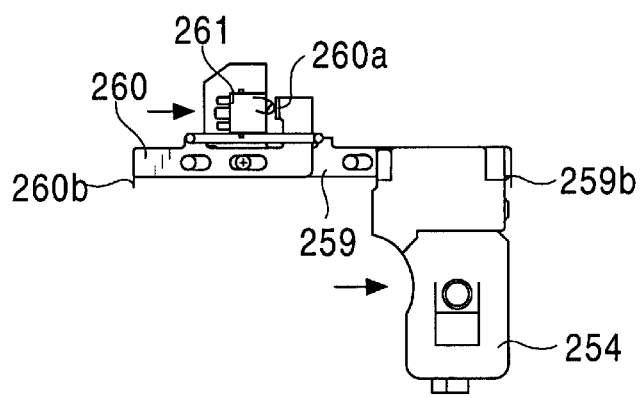
Figure 55C:
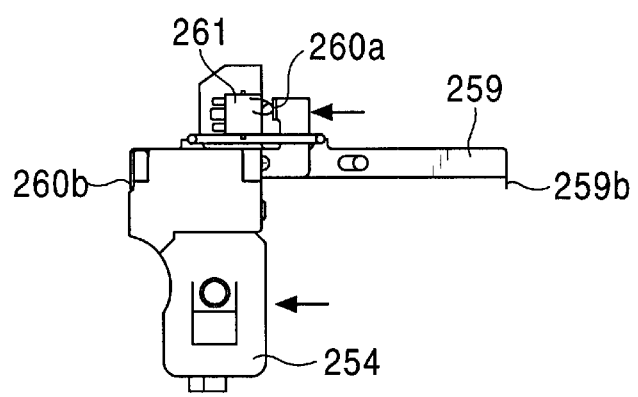

When the optical pickup 254 is transferred to a position in the vicinity of the right end to press the receiving portion 259b of the first lever member 259 as illustrated in FIG. 55B, the first lever member 259 moves to the right in relation to the second lever member 260; therefore, the limit switch 261 approaches the operating portion 260a so that it is turned ON. The ON signal makes it possible to detect that the optical pickup 254 has moved to the position of the inner circumferential edge of the CD 9. Conversely, when the optical pickup 254 is transferred to a position in the vicinity of the left end so as to press the receiving portion 260b of the second lever member 260 as illustrated in FIG. 55C, the second lever member 260 moves to the left in relation to the first lever member 259; therefore, the operating portion 260a approaches the limit switch 261 to turn it ON. The ON signal makes it possible to detect that the optical pickup 254 has moved to the position of the inner circumferential edge of the magneto-optical disk 10a of the MD 10. Whether the optical pickup 254 has moved to the inner circumference of the CD 9 or the inner circumference of the MD 10 can be determined by monitoring the rotational direction or the current direction of the thread motor 250 at the time when the limit switch 261 is turned ON. More specifically, a control unit formed of a microcomputer or the like determines whether the inner circumference to which the optical pickup 254 has moved is the one of the CD 9 or the MD 10 on the basis of an AND of the rotational direction or a signal for monitoring the current direction of the thread motor 250 and the ON is signal of the limit switch 261.

Figure 56:
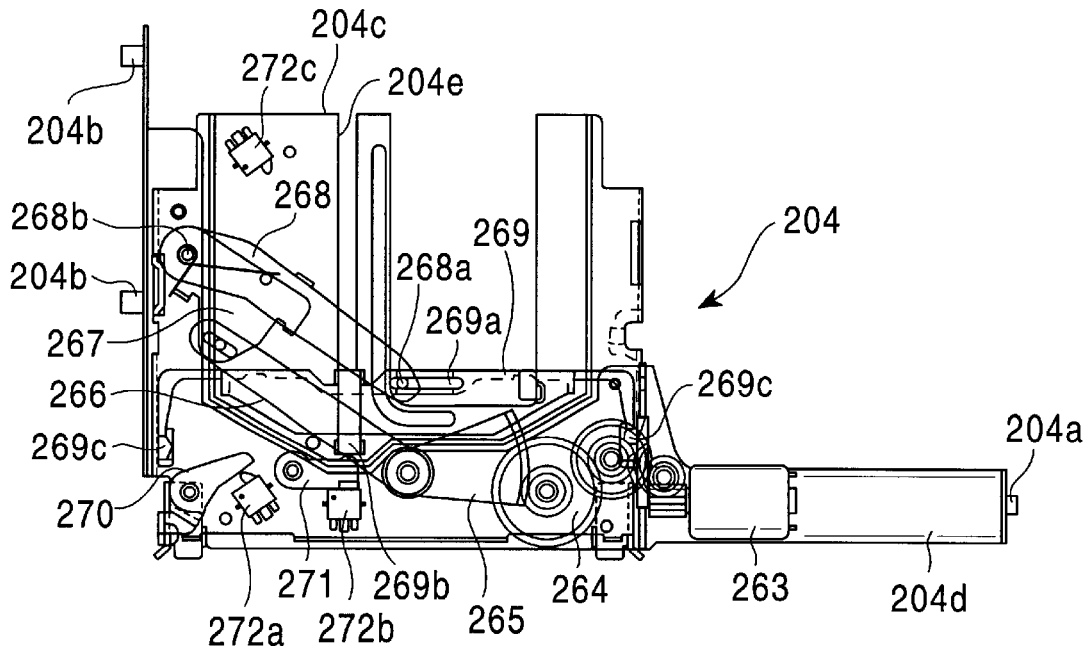
FIG. 56 is a top plan view of a holder when an MD has been ejected.
Figure 57:
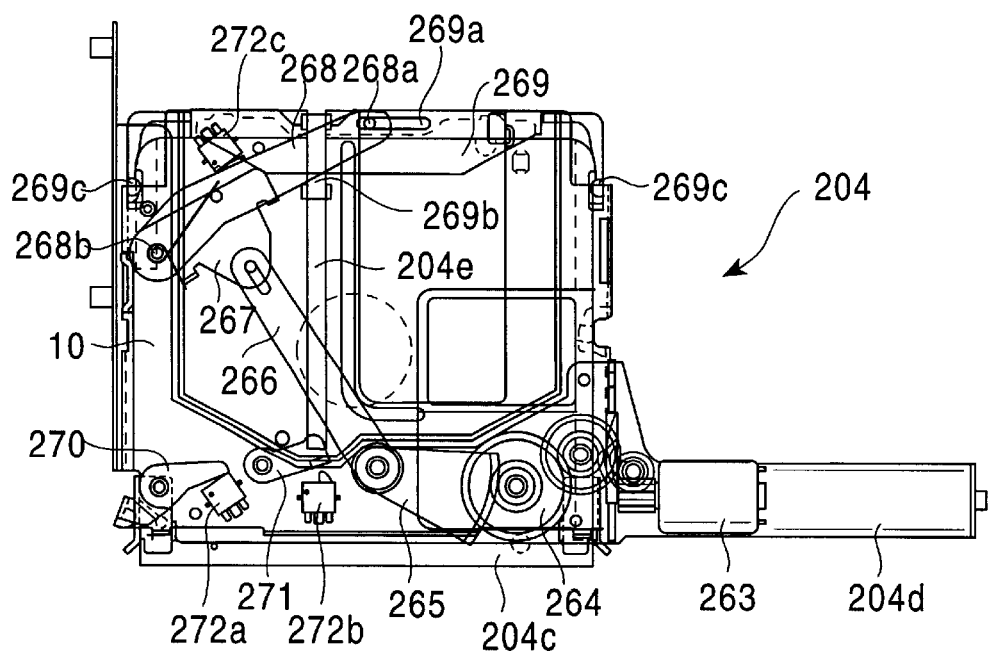
FIG. 57 is a top plan view of the holder when the MD has been inserted.

Referring to FIG. 56 and 57, the holder 204 is formed of a retaining portion 204c for holding an inserted MD 10 and a bridging portion 204d made integral with the retaining portion 204c. As shown in FIG. 29, the retaining portion 204c is positioned in a space that includes the cutout 239b of the sub-chassis 239, and the bridging portion 204d is positioned in a space between the front plate of the frame member 201 and the sub-chassis 239. The pins 204a and 204b mentioned above are positioned at the right side portion of the bridging portion 204d and the left side portion of the retaining portion 204c, respectively. These pins 204a and 204b are driven as the right and left slide cam plates 205 and 206 move forward or backward, thereby to cause the holder 204 to move in the vertical or Z direction in relation to the main chassis 202.

An MD motor 263 is mounted on the bridging portion 204d of the holder 204, the revolution of the MD motor 263 being transmitted to a fan-shaped first lever 265 provided on the retaining portion 204c via a reduction gear train 264. A fourth lever 268 is coupled to the first lever 265 via a second lever 266 and a third lever 267. A pin 268a provided on the distal end of the fourth lever 268 is slidably inserted in a horizontal slot 269a of a slider 269 disposed in the retaining portion 204c. The slider 269 is provided with a guide protuberance 269b that engages a slit 204e formed in the retaining portion 204c. Hence, when the first lever 265 is turned by the MD motor 263, the fourth lever 268 swings on a support shaft 268b via the second lever 266 and the third lever 267 so as to cause the slider 269 to move forward or backward in the retaining portion 204c along the slit 204e. Furthermore, a pair of locking protuberances 269c formed on the right and left inner walls of the slider 269 can be locked in the engaging notches 10d (see FIG. 18) formed in both side faces of the cartridge case 10b of the MD 10. The MD motor 263, the reduction gear train 264, the first lever 265, the second lever 266, the third lever 267, the fourth lever 268, and the slider 269 constitute an MD carrying mechanism.

On the retaining portion 204c of the holder 204, a first detection lever 270 and a second detection lever 271 are rotatably supported on the front side thereof, and three detection switches 272a, 272b, and 272c are also mounted thereon. The first detection lever 270 is turned by the cartridge case 10b of an inserted MD 10, and the second detection lever 271 is turned by the guide protuberance 269b of the slider 269. The detection switch or the detecting means 272a is turned ON by the swing motion of the first detection lever 270, thereby detecting that the MD 10 has been inserted. The detection switch 272b is turned ON by the swing motion of the second detection lever 271, thereby detecting a loading start or an ejection end of the MD 10. The detection switch 272c is turned ON by the swing motion of the fourth lever 268, thereby detecting a loading end of the MD 10. The first detection lever 270 and the detection switch 272a make up an MD insertion detecting means.

FIG. 56 illustrates the state before the MD 10 is inserted. When the MD 10 is inserted through the MD insertion slot 212 from this state, the detection switch 272a turns ON. At this time, the positions of the slide cam plates 205 and 206 in the longitudinal direction are detected by a detecting means such as the linear position sensor previously mentioned, and a microcomputer or the like determines whether the locking pins 216 and 218 are positioned in the locking portions 215a and 217a. If it is determined that the locking pins 216 and 218 are not positioned in the locking portions 215a and 217a, then the driving motor 237 starts to drive the slide cam plates 205 and 206 so as to transfer the slide cam plates 205 and 206 until the locking pins 216 and 218 enter the locking portions 215a and 217a. Subsequently, as the MD 10 is further pushed in, the slider 269 abutted against the MD 10 slightly retracts, causing the detection switch 272b to turn ON; hence, based on the ON signal, the MD motor 263 runs in one direction to start loading the MD 10. When the MD motor 263 revolves in one direction, the revolution is transmitted to the fourth lever 268 via the reduction gear train 264, and the levers 265, 266, and 267. This causes the fourth lever 268 to begin to swing on the support shaft 268b, causing in turn the slider 269 to move back along the slit 204e. The moment the fourth lever 268 reaches a position for recording/reproduction shown in FIG. 57, the detection switch 272c turns ON. Based on the ON signal, the MD motor 263 stops, completing the loading of the MD 10. In this loading operation, the MD 10 is transferred to the recording/reproduction position of the holder 204 with the locking notches 10d thereof engaged with the locking protuberances 269c of the slider 269, and in the middle of the transfer, the shutter 10c is opened to expose the magneto-optical disk 10a through the window opening 10g of the cartridge case 10b.

Referring to FIG. 58, a support lever 273 is rotatably supported at the bottom left end of the retaining portion 204c of the holder 204, a second locator pin 274 being fixed to the distal end of the support lever 273. The second locator pin 274 positions the cartridge case 10b of the MD 10 in cooperation with the first locator pin 248. The support lever 273 is urged downward or clockwise by a spring (not shown). As it will be described later, when the support member 245 approaches the retaining portion 204c as the driving unit 203 rises, the support lever 273 also rises together with the second locator pin 274, and the second locator pin 274 is inserted in the locator hole 10f provided at the front side of the cartridge case 10b of the MD 10.

The operation of the recording medium driving apparatus configured as described above will be described.

Figure 58A:
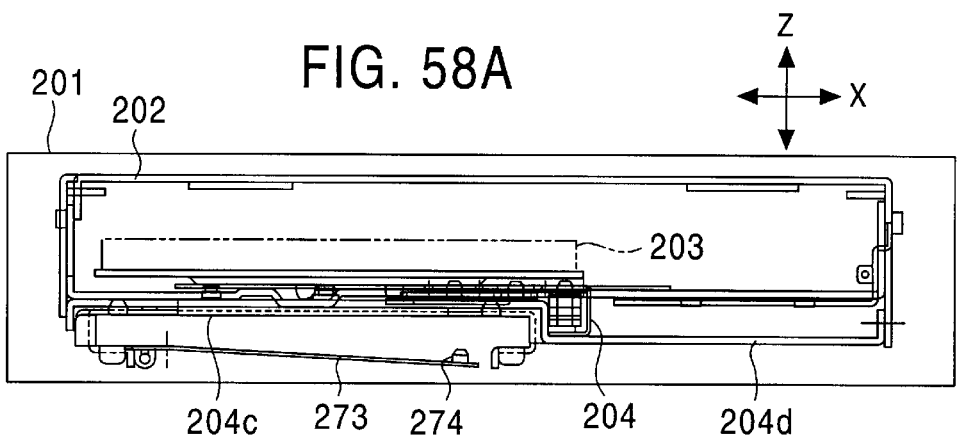
FIG. 58 is a schematic representation illustrating a positional relationship between the driving unit and the holder.
Figure 58B:
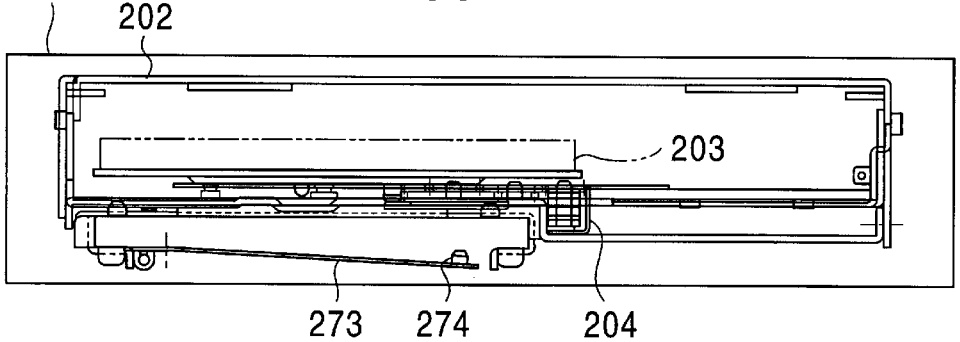
Figure 58C:
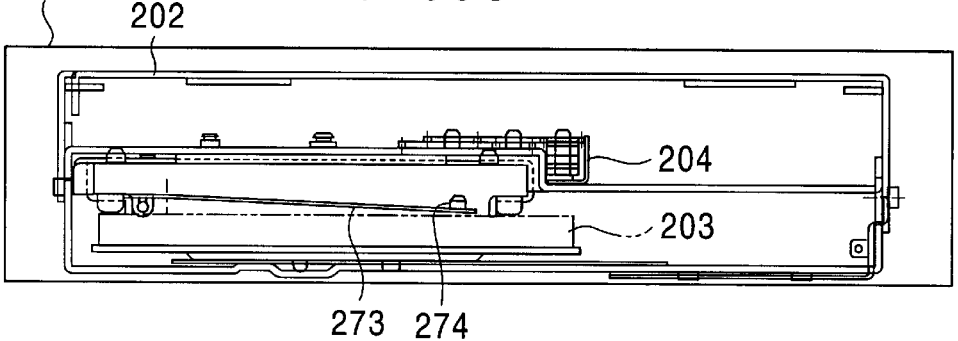
Figure 59A:
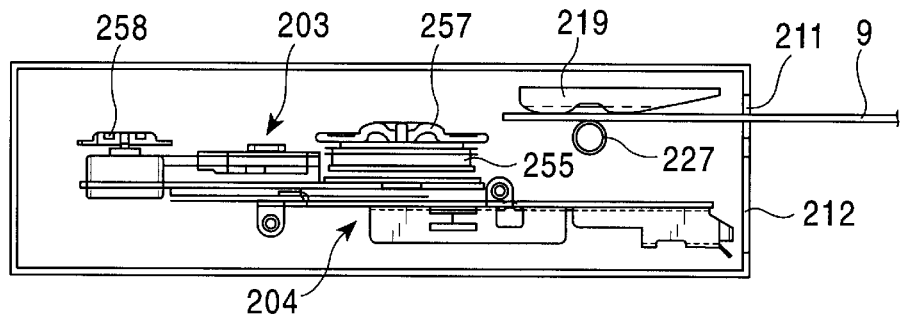
FIG. 59 is a schematic representation illustrating a positional relationship between the driving unit, the holder, and a roller unit.

First will be described the case wherein the reproducing operation of the CD 9 is started from the standby mode in which both media, namely, the CD 9 and the MD 10, have been ejected or not yet inserted. In the standby mode, the right slide cam plate 205 is in the position illustrated in FIG. 42B, while the left slide cam plate 206 is in the position illustrated in FIG. 43B. At this time, the pins 203a and 203b of the driving unit 203 are positioned above the second vertical slots 231b and 235b of the main chassis 202, while the pins 204a and 204b of the holder 204 are positioned at the lower ends of the first vertical slots 231a and 235a of the main chassis 202. Therefore, the driving unit 203 ascends to the up position, while the holder 204 descends to the down position to face the insertion slot 212 as shown in FIG. 58B and FIG. 59A.

The right roller pin 228a of the roller unit 224 is pressed into contact with the top step of the cam portion 234a formed on the cam plate 234, and the left roller pin 228a is pressed into contact with the top step of the cam portion 206d formed on the slide cam plate 206. Hence, the roller unit 224 is rotated upward, and the driving roller 227 is pressed into contact with the guide plate 219. Furthermore, the locking pins 216 and 218 provided on the right and left slide cam plates 205 and 206 are in engagement with the locking portions 215a and 217a of the engaging openings 215 and 217 formed in the frame member 201 as shown in FIG. 31 and FIG. 33. Thus, the entire mechanism including the main chassis 202, the driving unit 203, the holder 204, etc. is in the locked state wherein it is fixedly supported with respect to the frame member 201.

In the standby mode, the abutting portion 241b of the slide lever 241 is pressed by the kicking pin 205e of the slide cam plate 205 (see FIG. 49), so that the slide lever 241 moves forward against the urging force of the spring 243, causing the swing lever 242 to swing on the support shaft 239f. This in turn causes the driving portion 242b of the swing lever 242 to press the guide pin 245b of the support member 245, so that the support member 245 swings on the support shaft 245a by approximately 40 degrees on the base 244 as shown in FIG. 46. At this time, since the driving unit 203 is in the up position illustrated in FIG. 59A as previously mentioned, the support member 245 swings above the retaining portion 204c of the holder 204, and the support member 245 which has swung flatly overlaps the retaining portion 204c as shown in FIG. 44. In other words, the driving unit 203 reaches the first position where the driving unit 203 partly overlaps the holder 204 at a position above the holder 204. Furthermore, as shown in FIG. 53A, the lower end of the first locator pin 248 shifts from the cam portion 244d of the base 244 to a flat surface as the support member 245 swings; hence, the first locator pin 248 is retracted or sunk by the spring force of the spring 249, thus securing a sufficient clearance for carrying the CD 9 to a position above the first locator pin 248.

In the standby mode, when the CD 9 is inserted through the CD insertion slot 211, the two detection levers 221 are swung by the inserted CD 9, and the roller motor 225 starts to run in one direction in response to loading start signals output from the detection switches 220, causing the driving roller to 227 to rotate via the reduction gear train 229. Thus, the CD 9, held between the guide plate 219 and the driving roller 227, is automatically carried to a reproduction position by the torque of the driving roller 227. At this time, the first locator pin 248 is in the retracted state to provide the sufficient clearance between the bottom surface or the recording surface of the CD 9 and the first locator pin 248 as previously mentioned, so that damage to the CD 9 caused by the first locator pin 248 can be prevented. When the detecting means (not shown) detects that the CD 9 has been carried to the reproduction position, the driving motor 237 starts to run. The revolution of the driving motor 237 causes the right and left slide cam plates 205 and 206 to be driven in opposite directions from each other via the link levers 210a, 210b, and 210c so as to move the right slide cam plate 205 to the position illustrated in FIG. 42A, and the left slide cam plate 206 to the position illustrated in FIG. 43A. As these two slide cam plates 205 and 206 move, the locking pins 216 and 218 move from the locking portions 215a and 217a of the engaging openings 215 and 217 to the large-diameter portions 215b and 217b so as to secure a large clearance of about ±3.5 mm to about ±2.6 mm between the locking pins 216 and 218 and the peripheral edges of large-diameter portions 215b and 217b. Thus, the entire mechanism is placed in a first unlocked state wherein it is elastically supported by the frame member 201 via the elastic members 207 so as to be able to vibrate with a large movement stroke.

Figure 59B:
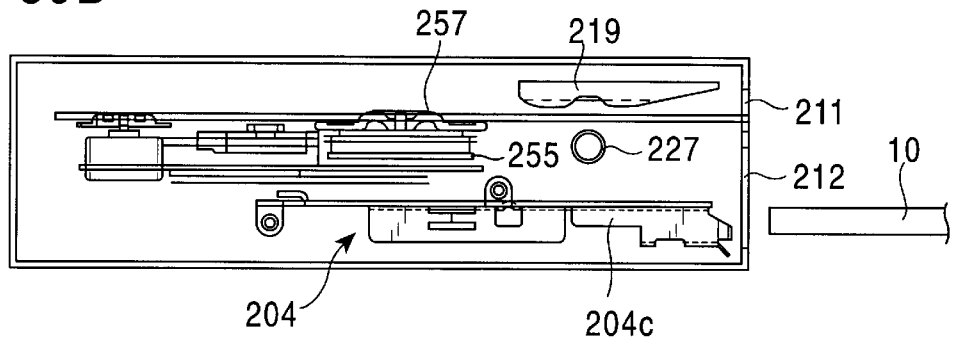
Figure 59C:
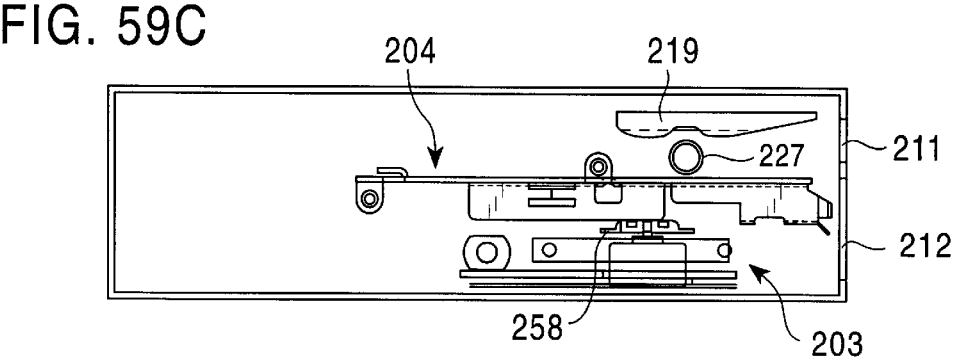

The roller motor 225 stops as soon as the CD 9 reaches the reproduction position, so that the CD 9 stops directly above the CD turntable 257 mounted on the support member 245. Meanwhile, the right pin 203a engaging the second cam slot 205b of the slide cam plate 205 moves to the upper end of the second vertical slot 231b. The movement of the pin 236b engaging the second cam slot 206b of the slide cam plate 206 is reversed by the phase reversing lever 236 and transmitted to the left pin 203b. The pin 203b moves to the upper end of the second vertical slot 235b, so that the driving unit 203 slightly rises, and the CD turntable 257 is fitted to the central hole of the CD 9 as illustrated in FIG. 58A and FIG. 59B. At the same time, the pin 208a of the arm clamp 208 moves to the rear end of the third cam slot 205c of the slide cam plate 205, and the pin 208a descends into the second vertical slot 231b of the main chassis 202, causing the arm clamp 208 to turn downward. Furthermore, the two roller pins 228a of the roller unit 224 shift to the lower steps of the cam portions 234a and 206d, respectively; therefore, the roller unit 224 is turned downward by the spring force of the spring 230, and the driving roller 227 moves away from the bottom surface of the CD 9. As a result, the CD 9 is chucked between the damper 209 and the CD turntable 257, and the driving motor 237 stops upon the completion of the chucking operation. In this case, the pin 232b of the phase reversing lever 232 coupled to the right pin 204a of the holder 204 moves in the horizontal portion of the first cam slot 205a of the slide cam plate 205, and the right pin 204b of the holder 204 also moves in the horizontal portion of the first cam slot 206a of the slide cam plate 206. Thus, the roller unit 224 swings in the space above the holder 204, while the holder 204 being maintained in the down position.

At the reproduction position, the CD spindle motor 255 is started, the CD 9 is turned while being chucked between the damper 209 and the CD turntable 257, and the optical pickup 254 is transferred in the radial direction of the CD 9 by the thread motor 250 thereby to start the reproducing operation of the CD 9. In this case, as illustrated in FIG. 55B, when the optical pickup 254 approaches the center of the CD 9 and presses the receiving portion 259b of the first lever member 259, the limit switch 261 is turned ON by the operating portion 260a as the first lever member 259 moves, thus making it possible to detect that the optical pickup 254 has moved to the inner circumferential edge position of the CD 9. As previously mentioned, in the reproducing operation of the CD 9, the entire mechanism is elastically supported in the frame member 201 with the large movable stroke (about ±3.5 mm to about ±2.6 mm), thereby making it possible to prevent such a problem as sound skipping caused by external vibration being directly transmitted to the optical pickup 254.

A description will now be given of the case wherein the recording/reproducing operation of the MD 10 is started from the standby mode set forth above. In this case, as previously mentioned, when the MD 10 is inserted through the MD insertion slot 212 and the cartridge case 10b reaches the entrance of the retaining portion 204c of the holder 204, the detection switch 272a is turned ON by the first detection lever 270. At this time, as mentioned above, the locking pins 216 and 218 provided on the two slide cam plates 205 and 206 are in the positions where they engage the locking portions 215a and 217a of the engaging openings 215 and 217, in the standby mode; hence, the driving motor 237 remains at rest.

Inserting the MD 10 further under the aforesaid condition causes the engaging notches 10d of the MD 10 to engage the locking protuberances 269c of the slider 269. At the same time, the slider 269 is pushed by the MD 10 and slightly moved back to turn the detection switch 272b ON. In response to the ON signal, the MD motor 263 starts running. When the fourth lever 268 swings on the support shaft 268b as the MD motor 263 revolves, the slider 269 moves back toward the back of the retaining portion 204c of the holder 204 along the long slit 204e, and the MD 10 is automatically transferred to the recording/reproduction position with its locking notches 10d engaged with the locking protuberances 269c of the slider 269. In the middle of the transfer, the shutter 10c is opened to expose the magneto-optical disk 10a through the window opening 10g of the cartridge case 10b. As soon as the MD 10 reaches the recording/reproduction position, the detection switch 272c issues a loading end signal. In response to the loading end signal, the MD motor 263 stops. Instead, the driving motor 237 starts to run in response to the loading end signal from the detection switch 272c, and the right slide cam plate 205 moves back from the position shown in FIG. 42B to the position shown in FIG. 42E, while the left slide cam plate 206 advances from the position shown in FIG. 43B to the position shown in FIG. 43E. Hence, the vertical positional relationship between the driving unit 203 and the holder 204 is reversed.

Figure 42A:
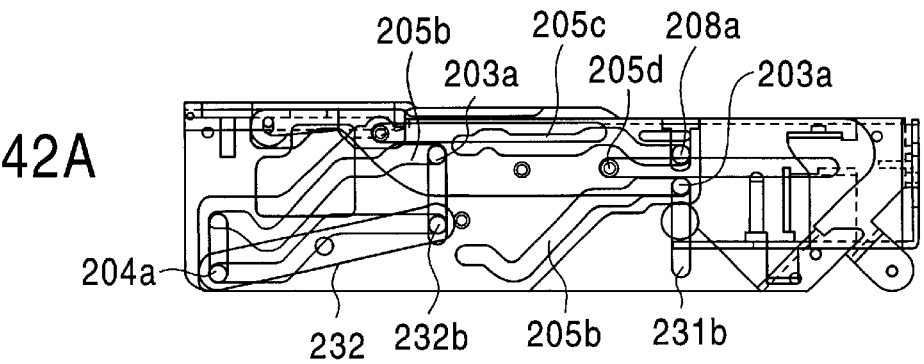
FIG. 42 is a schematic representation of an operation of a right slide cam plate.
Figure 42B:
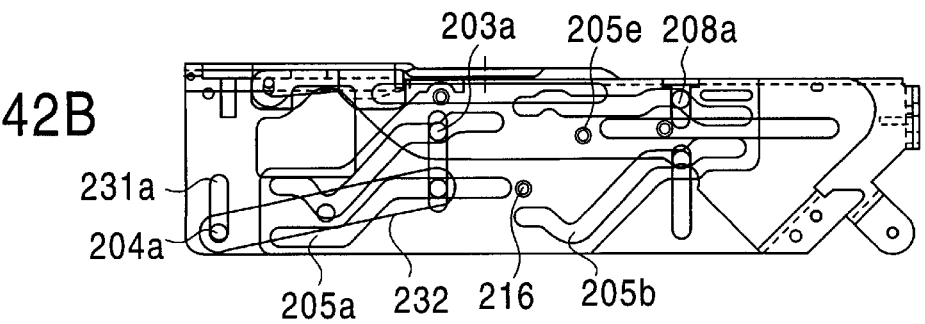
Figure 42C:
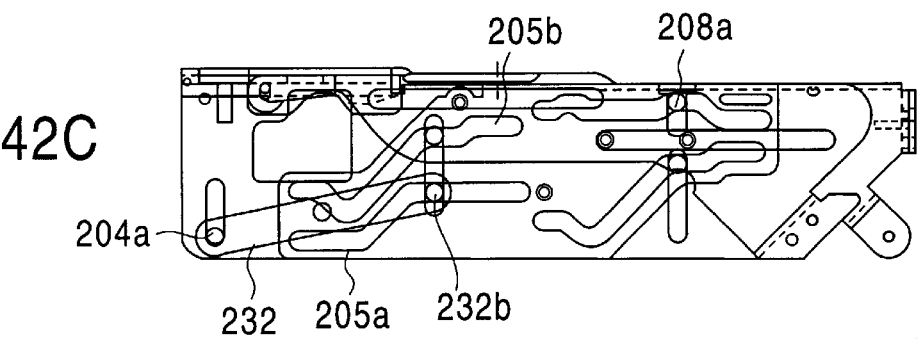
Figure 43A:
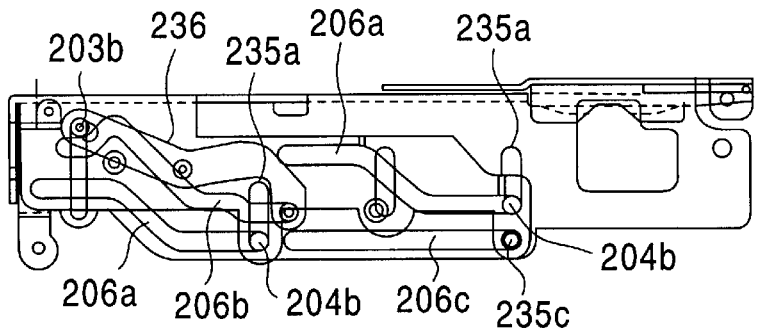
FIG. 43 is a schematic representation of an operation of a left slide cam plate.
Figure 43B:
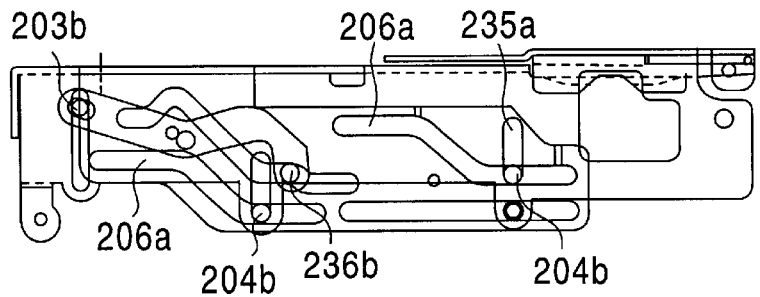
Figure 43C:
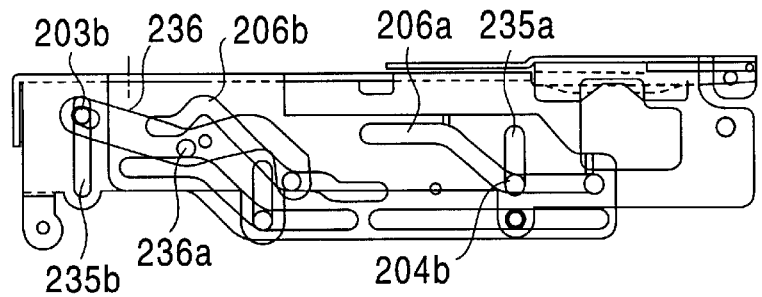

More specifically, when the right slide cam plate 205 shifts from the position in FIG. 42B to the position in FIG. 42C, while the left slide cam plate 206 shifts from the position in FIG. 43B to the position in FIG. 43C, the kicking pin 205e of the slide cam plate 205 moves away from the abutting portion 241b of the slide lever 241. This causes the slide lever 241 to move back by the spring force of the spring 243, causing in turn the swing lever 242 to swing clockwise in FIG. 46. As a result, the guide pin 245b which has been under the pressure applied by the driving portion 242b of the swing lever 242 is released, so that the support member 245 is turned counterclockwise by the spring force of the spring 247 to be placed over the base 244, and the driving gear 257a of the CD turntable 257 engages the gear 246b of the driven gear train 246 as shown in FIG. 45. Furthermore, as illustrated in FIG. 53B, since the lower end of the first locator pin 248 rides onto the cam portion 244d of the base 244 to compress the spring 249 as the support member 245 turns, the upper end of the first locator pin 248 considerably projects from the guide portion 245c.

Figure 42D:
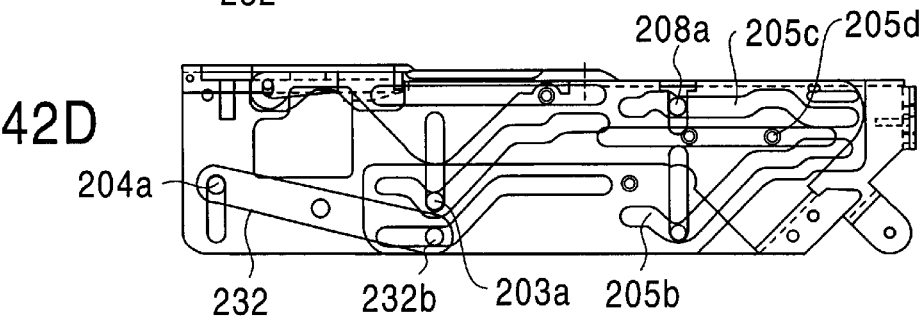
Figure 43D:
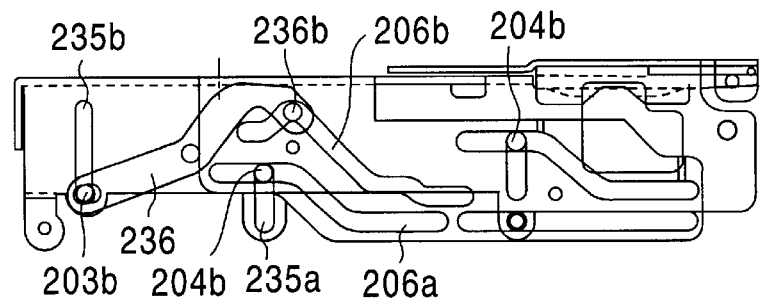

Subsequently, when the right slide cam plate 205 moves to the position shown in FIG. 42D and the left slide cam plate 206 moves to the position shown in FIG. 43D, the pins 203a and 203b of the driving unit 203 shift to the lower ends of the second vertical slots 231b and 235b of the main chassis 202, while the pins 204a and 204b of the holder 204 shift to the upper ends of the first vertical slots 231a and 235a of the main chassis 202. Hence, the driving unit 203 descends to the down position, while the holder 204 ascends to the up position. Furthermore, the two roller pins 228a of the roller unit 224 shift to the upper stages of the cam portions 234a and 206d, and the roller unit 224 also turns upward as the holder 204 ascends, so that the holder 204 can be prevented from coming in contact with the roller unit 224, and the holder 204 can be raised higher as compared with the case wherein the roller unit 224 stays in the position shown in FIG. 59B. In this case, the support member 245 is not projecting into the cutout 239b of the sub-chassis 239, and the driving unit 203 and the holder 204 do not have any part thereof overlapped, so that the vertical relative positions of the driving unit 203 and the holder 204 can be reversed. When the CD turntable 257 is turned, with the driving unit 203 moved so that it is located under the holder 204, the rotation is transmitted from the driving gear 257a to the gear 246a of the driven gear train 246 via the gear 246b. Hence, as shown in FIG. 47, the base 244 together with the support member 245 freely runs obliquely on the sub-chassis 239 along the self-propelling rack 239g to the front side of the main chassis 202. As a result, the MD turntable 258 mounted on the support member 245 is positioned directly under the rotational center of the magneto-optical disk 10a of the MD 10. In other words, the driving unit 203 reaches the position where it partly overlaps the holder 204 under the holder 204.

Figure 42E:
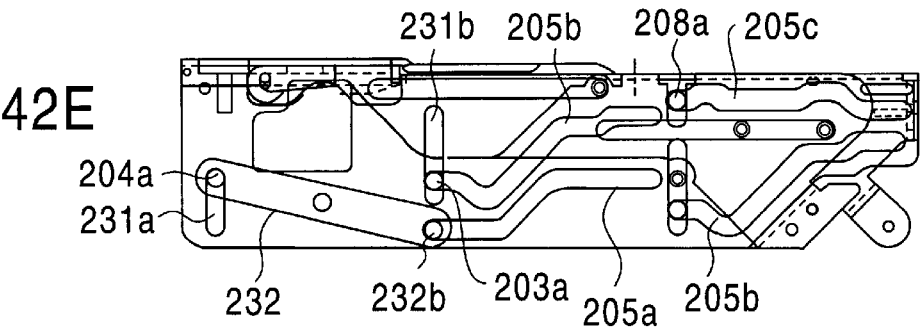
Figure 43E:
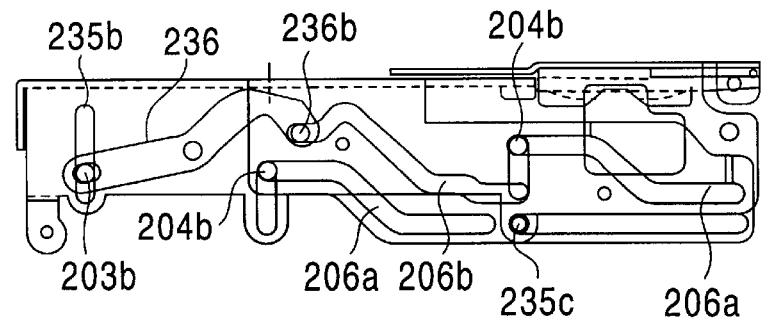
Figure 58D:
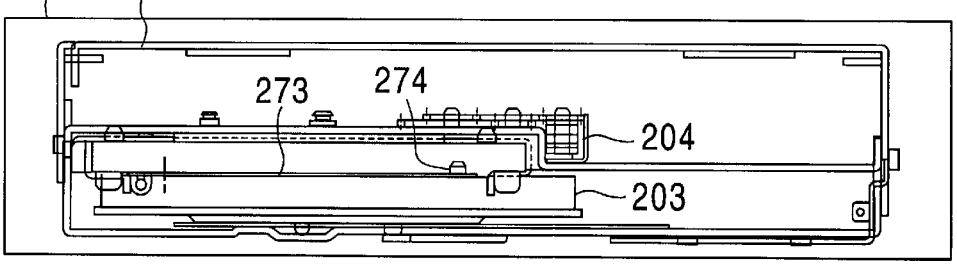
Figure 59D:
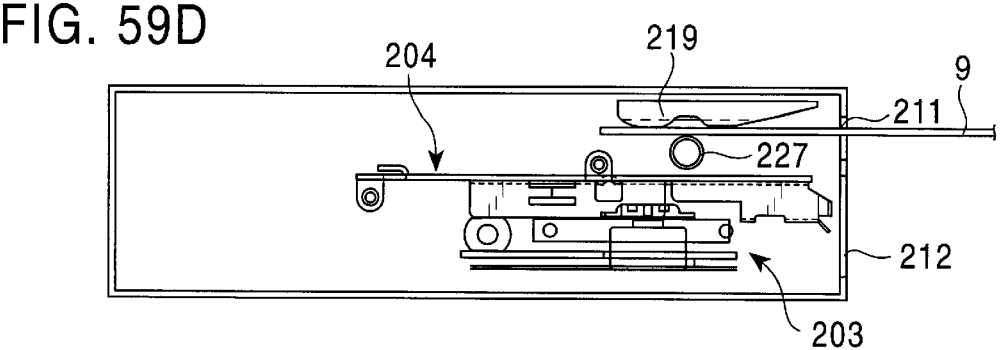

Subsequently, when the right slide cam plate 205 moves backward to the position shown in FIG. 42E, while the left slide cam plate 206 moves forward to the position shown in FIG. 43E, the pins 203a and 203b of the driving unit 203 slightly ascend from the lower ends of the second vertical slots 231b and 235b; therefore, the driving unit 203 ascends and reaches the second position near the holder 204 as shown in FIG. 58D and FIG. 59D. As a result, as illustrated in FIG. 53B, the first locator pin 248 in the protruded state is inserted in the locator hole 10e provided at the back of the cartridge case 10b. At the same time, the support lever 273 is raised as the support member 245 ascends, and the second locator pin 274 is inserted in the locator hole 10f provided on the front side of the cartridge case 10b, thereby accurately positioning the MD 10 at the recording/reproduction position by the two locator pins 248 and 274. Moreover, the driving unit 203 rises to approach the holder 204, causing the metal hub 10h of the magneto-optical disk 10a of the MD 10 to be magnetically drawn to the MD turntable 258. Upon the completion of the magnetic locking, the driving motor 237 stops. At the point when the MD 10 has been carried to the recording/reproduction position, the locking pins 216 and 218 shift to the small-diameter portions 215c and 217c of the engaging. openings 215 and 217 as the two slide cam plates 205 and 206 move, thereby securing a relatively small clearance (approximately ±1.5 mm) between the respective locking pins 216 and 218 and the peripheral edges of the small-diameter portions 215c and 217c. Therefore, the entire mechanism is elastically supported by the frame member 201 via the elastic members 207, and placed in a second locked state wherein it can vibrate with a small movable stroke.

At the recording/reproduction position, the MD spindle motor 256 is run to rotate the MD 10 that is magnetically locked onto the MD turntable 258, and the optical pickup 254 is transferred in the radial direction of the magneto-optical disk 10a by the thread motor 250, thus beginning the recording/reproducing operation of the MD 10. In this case, as illustrated in FIG. 55C, when the optical pickup 254 approaches the center of the MD 10, pressing the receiving portion 260b of the second lever member 260, the operating portion 260a turns ON the limit switch 261 as the second lever member 260 moves, making it possible to detect that the optical pickup 254 has reached the inner circumferential edge position of the magneto-optical disk 10a of the MD 10. During the recording/reproducing operation of the MD 10, the entire mechanism is elastically supported by the frame member 201 with the relatively small movable stroke (approximately ±1.5 mm). Therefore, sound skipping due to external vibration tends to occur more frequently than during the reproducing operation of the CD 9; however, employing a known memory device called a "shock-proof memory" making use of the first-in/first-out (FIFO) feature of a semiconductor memory will significantly improve the vibration-resisting property of the MD 10 during the recording/reproducing operation.

Thus, the situation where the recording/reproduction of the CD 9 and MD 10 is separately carried out, starting from the standby mode, has been described. It is also possible, however, to simultaneously introduce both media, namely, the CD 9 and the MD 10, in the mechanism, and to selectively record to or reproduce from either of the media, or to insert or eject one medium while the other medium is in the recording/reproduction mode.

For example, to carry out the recording/reproducing operation of the MD 10 in place of the CD 9 in the reproduction mode, the MD 10 can be inserted in the MD insertion slot 212 without ejecting the CD 9 because the holder 204 is positioned to oppose the MD insertion slot 212 as shown in FIG. 59B when the CD 9 is in the reproduction mode. The moment the MD 10 is inserted, the driving motor 237 starts running in response to a detection signal from the detection switch 272a, and the right slide cam plate 205 moves from the position shown in FIG. 42A to the position shown in FIG. 42B, while the left slide cam plate 206 moves from the position shown in FIG. 43A to the position shown in FIG. 43B as previously described. As a result, the roller unit 224 turns upward, so that the CD 9 is left in the mechanism while being sandwiched between the driving roller 227 and the guide plate 219. Furthermore, since the locking pins 216 and 218 engage the locking portions 215a and 217a of the engaging openings 215 and 217, the entire mechanism is set in the locked state wherein it is fixedly supported by the frame member 201. After that, as in the case of the recording/reproducing operation of the MD 10 started from the standby mode described above, the MD 10 is carried to the recording/reproduction position by the slider 269, then the driving unit 203 is moved downward below the holder 204 so as to reverse the vertical positional relationship between the driving unit 203 and the holder 204. This enables the recording/reproducing operation of the MD 10 to be started without ejecting the CD 9.

At the start of inserting the MD 10 (when the CD 9 is in the reproduction mode), the entire mechanism is in the first unlocked state wherein it is allowed to vibrate with a large movable stroke with respect to the frame member 201. However, the magneto-optical disk 10a of the MD 10 is protected by the cartridge case 10b formed of a hard synthetic resin material, so that the magneto-optical disk 10a will not be damaged even if the mechanism vibrates at the beginning of inserting the MD 10. During the transfer of the MD 10, the entire mechanism is locked; hence, sound skipping in reproduced sound of the CD 9 tends to occur due to external vibration. However, using the aforesaid shock-proof memory makes it possible to prevent sound skipping in reproduced sound. This enables the MD 10 to be inserted while performing reproduction from the CD 9 at the same time, contributing greatly to convenience to users.

Conversely, reproduction from the CD 9 in place of the MD 10 in the recording/reproduction mode is performed as follows. Since the roller unit 224 is up and the driving roller 227 is pressed into contact with the guide plate 219 and in the position to oppose the CD insertion slot 211 (see FIG. 59D) in the recording/reproduction mode of the MD 10, the CD 9 can be inserted in the insertion slot 211 without ejecting the MD 10. When the CD 9 is inserted, the driving motor 237 starts running in response to a detection signal from the detection switches 220, and the right slide cam plate 205 moves from the position shown in FIG. 42E to the position shown in FIG. 42B, while the left slide cam plate 206 moves from the position shown in FIG. 43E to the position shown in FIG. 43B, as previously described. As a result, the locking pins 216 and 218 engage the locking portions 215a and 217a of the engaging openings 215 and 217, thereby setting the entire mechanism in the locked state wherein it is fixedly supported by the frame member 201. Thereafter, as in the case of the reproducing operation of the CD 9 which is started from the standby mode described above, the CD 9 is carried to the reproduction position by the driving roller 227. Then, the driving unit 203 is moved so that it is above the holder 204 in order to reverse the vertical positional relationship between the driving unit 203 and the holder 204, thus enabling the reproducing operation of the CD 9 to be started without ejecting the MD 10.

At the start of inserting the CD 9 (when the MD 10 is in the recording/reproduction mode), the entire mechanism is in the second unlocked state wherein the vibration amplitude of the entire mechanism with respect to the frame member 201 is restricted by a small movable stroke. Hence, the mechanism can be led to the locked state without causing damage to the CD 9 when inserting the CD 9 through the CD insertion slot 211. During the transfer of the CD 9, the entire mechanism is locked; hence, sound skipping in reproduced sound of the MD 10 tends to occur due to external vibration. As mentioned above, however, using the aforesaid shock-proof memory makes it possible to prevent sound skipping in reproduced sound. Thus, the CD 9 can be inserted while performing the recording/reproducing operation of the MD 10 at the same time.

Moreover, when both media, namely, the CD 9 and the MD 10, have been inserted, the two slide cam plates 205 and 206 may be moved forward or backward to operate the driving unit 203 and the holder 204 so as to appropriately reverse the relative positions of the driving unit 203 and the holder 204 in the Z or vertical direction. This makes it possible to select either of the media to carry out recording/reproduction, or to eject one medium while the other medium is in the recording/reproduction mode, with both media accommodated in the mechanism. When carrying out this series of operations, the entire mechanism is placed in the locked state once, so that external vibration would be easily transmitted to the mechanism. However, by utilizing the FIFO feature of a shock-proof memory to handle signals makes it possible to prevent sound skipping in reproduced sound and accordingly to prevent a no-sound problem when the mechanism is in operation.

The present invention can be implemented in the forms described above, and provides the following advantages.

A first medium and a second medium are held in a frame member at two different vertically shifted positions, and driving unit on which an optical pickup and its transferring mechanism are mounted is provided so that it may be vertically and horizontally moved in relation to the frame member. This arrangement enables the optical pickup to access both media that are retained at the two different positions in the frame member, so that either of the media can be selected to record or reproduce information to or from the selected medium, while both media are set in the frame member. This feature permits extremely improved convenience to users.

What is claimed is:

1. A recording medium driving apparatus capable of accommodating simultaneously a disk-shaped first medium not housed in a cartridge case and second medium formed of a disk housed in a cartridge case, said first and second media being retained at two vertically shifted positions in a frame member, and information being recorded and/or reproduced on and/or from said first and second media by using a common optical pickup, said recording medium driving apparatus comprising:

a driving unit which can be moved vertically and horizontally with respect to said frame member and on which at least said optical pickup and a transporting mechanism for transporting said optical pickup are mounted;

wherein said driving unit vertically and horizontally moves in said frame member thereby to selectively oppose said optical pickup to either of said first and second media while said first and second media are simultaneously retained in said two vertically shifted positions, allowing information to be recorded on and/or reproduced from either of the first and second media.

2. A recording medium driving apparatus for a disk-shaped first medium not housed in a cartridge case and a second medium formed of a disk housed in a cartridge case, said first and second media being retained at two vertically shifted positions in a frame member, and information being recorded and/or reproduced on and/or from said first and second media by using a common optical pickup, said recording medium driving apparatus comprising:

a driving unit which can be moved vertically and horizontally with respect to said frame member and on which at least said optical pickup and a transporting mechanism for transporting said optical pickup are mounted, wherein said driving unit vertically and horizontally moves in said frame member thereby to selectively oppose said optical pickup to either of said first and second media retained in said two vertically shifted positions;

a holder which is provided so that it may move in a vertical direction in said frame member and which retains said second medium inserted in said frame member;

wherein said driving unit and said holder are respectively moved vertically at positions where said driving unit and said holder do not vertically overlap so as to allow the relative vertical positions of said driving unit and said holder to be reversed, and horizontal movement of said driving unit causes said driving unit to overlap at least a part of said holder at one side or the other side of said holder in a vertical direction; and information is recorded and/or reproduced to and/or from said first medium at a first position where said driving unit overlaps said holder at one side of said holder, while information is recorded and/or reproduced to and/or from said second medium at a second position where said driving unit overlaps said holder at the other side of said holder.

3. A recording medium driving apparatus according to claim 2, wherein said driving unit and said holder are transported in a vertical direction by the same driving mechanism.

4. A recording medium driving apparatus according to claim 3, wherein said driving mechanism comprises a driving motor, a slide cam member moved horizontally in said frame member by said driving motor, and a first cam portion and a second cam portion formed in said slide cam member; and one of said driving unit and said holder engages said first cam portion, while the other engages said second cam portion.

5. A recording medium driving apparatus according to claim 2, wherein a first turntable for rotatively driving said first medium and a second turntable for rotatively driving said second medium are mounted on said driving unit.

6. A recording medium driving apparatus according to claim 2, wherein said driving unit comprises a sub-chassis that is able to move vertically in said frame member and a driving chassis that is able to move horizontally with respect to said sub-chassis; and said optical pickup and said transporting mechanism are mounted on said driving chassis.

7. A recording medium driving apparatus according to claim 6, wherein said driving chassis is provided so that it may turn and slider horizontally with respect to said sub-chassis.

8. A recording medium driving apparatus according to claim 7,
    wherein said driving chassis comprises a base that is horizontally slidable with respect to said sub-chassis, and a support member that is horizontally rotatable on said base; and
    said optical pickup and said transporting mechanism are mounted on said support member.

9. A recording medium driving apparatus according to claim 8, wherein said support member horizontally turns with respect to said base to reach said first position from a position where said driving unit and said holder do not vertically overlap, thereby causing said holder and said support member to overlap at one side of said holder to oppose said optical pickup to said first medium; and
    said base horizontally slides together with said support member with respect to said sub-chassis to reach said second position from a position where said driving unit and said holder do not vertically overlap, thereby causing said holder and said support member to overlap at the other side of said holder to oppose said optical pickup to said second medium.

10. A recording medium driving apparatus according to claim 2, further comprising a carrying member which is provided so that it may be vertically moved at a position where it vertically overlaps said holder, and which inserts or ejects said first medium into or from said frame member;
    wherein said holder and said carrying member are respectively moved away from said first medium in a vertical direction when recording and/or reproducing information to and/or from said first medium;
    said driving unit is moved horizontally toward one side of said holder thereby to oppose said optical pickup to said first medium;
    said holder and said carrying member are respectively moved toward said first medium in the vertical direction when recording and/or reproducing information to and/or from said second medium; and
    said driving unit is moved horizontally toward the other side of said holder thereby to oppose said optical pickup to said second medium.

11. A recording medium driving apparatus according to claim 10,
    wherein an opposing member that faces said carrying member is disposed in said frame member; and
    when recording and/or reproducing information to/from said second medium, said first medium can be sandwiched between said carrying member and said opposing member by movement of said carrying member toward said first medium in the vertical direction.

12. A recording medium driving apparatus according to claim 11,
    wherein a first insertion slot through which said first medium is inserted and ejected and a second insertion slot through which said second medium is inserted and ejected are formed in said frame member; and
    said holder opposes said second insertion slot when information is recorded and/or reproduced to/from said first medium, while said opposing member and said carrying member close to each other and oppose said first insertion slot when information is recorded and/or reproduced to/from said second medium.

13. A recording medium driving apparatus according to claim 11,
    wherein said carrying member comprises a driving roller that rotates by using a motor as a driving source thereof; and
    said first medium is inserted into said frame member or ejected from said frame member by rotating said driving roller with said first medium held between said driving roller and said opposing member.

14. A recording medium driving apparatus according to claim 10, wherein said driving unit, said holder, and said carrying member are vertically transported by the same driving mechanism.

15. A recording medium driving apparatus according to claim 14,
    wherein said driving mechanism comprises a driving motor, a slide cam member moved horizontally in said frame member by said driving motor, and first, second, and third cam portions provided on said slide cam member; and
    said driving unit, said holder, and said carrying member engage said first, second, and third cam portions, respectively.

16. A recording medium driving apparatus according to claim 10, wherein a first turntable for rotatively driving said first medium and a second turntable for rotatively driving said second medium are mounted on said driving unit.

17. A recording medium driving apparatus according to claim 10,
    wherein said driving unit comprises a sub-chassis that is able to move vertically with respect to said frame member, and a driving chassis that is able to move horizontally with respect to said sub-chassis; and
    said optical pickup and said transporting mechanism are mounted on said driving chassis.

18. A recording medium driving apparatus according to claim 17, wherein said driving chassis is provided so that it may turn and slide horizontally with respect to said sub-chassis.

19. A recording medium driving apparatus according to claim 18,
    wherein said driving chassis comprises a base that is horizontally slidable with respect to said sub-chassis, and a support member that is horizontally rotatable on said base; and
    said optical pickup and said transporting mechanism are mounted on said support member.

20. A recording medium driving apparatus for a disk-shaped first medium not housed in a cartridge case and a second medium formed of a disk housed in a cartridge case, said first and second media being retained at two vertically shifted positions in a frame member, and information being recorded and/or reproduced on and/or from said first and second media by using a common optical pickup, said recording medium driving apparatus comprising:
    a driving unit which can be moved vertically and horizontally with respect to said frame member and on which at least said optical pickup and a transporting mechanism for transporting said optical pickup are mounted, wherein said driving unit vertically and horizontally moves in said frame member thereby to selectively oppose said optical pickup to either of said first and second media retained in said two vertically shifted positions;
    insertion slots which are formed in said frame member and through which said media are inserted and ejected;
    detecting means for detecting said media inserted through said insertion slots;
    a carrying mechanism for carrying said media into said frame member on the basis of a detection output of said detecting means;

a main chassis that movably supports said driving unit between a position where recording and/or reproduction to and/or from said first medium is performed and a position where recording and/or reproduction to and/or from said second medium is performed;

an elastic member that elastically and movably supports said main chassis in said frame member; and a locking mechanism for locking or unlocking said main chassis to or from said frame member;

wherein said main chassis is unlocked by said locking mechanism when recording and/or reproduction to and/or from one of said first and second media is performed; and said main chassis is locked by said locking mechanism and the other medium is carried into said frame member by said carrying mechanism when said detecting means detects that the other medium has been inserted through said insertion slot in said unlocked state.

21. A recording medium driving apparatus according to claim 20, wherein a movable stroke amount of said main chassis when recording/reproducing information to/from said first medium is set to be larger than a movable stroke amount of said main chassis when recording/reproducing information to/from said second medium.

22. A recording medium driving apparatus according to claim 21, wherein an engaging opening that has a large-diameter portion and a small-diameter portion is provided in one of said frame member and said main chassis, while a locking pin that is able to relatively move in said engaging opening is provided in the other; and the movable stroke amount of said main chassis is determined according to a clearance produced between said large-diameter portion or said small-diameter portion and said locking pin.

23. A recording medium driving apparatus according to claim 22, wherein a locking portion that connects said large-diameter portion and said small-diameter portion is formed in said engaging opening; and said main chassis is locked with respect to said frame member when said locking pin is in said locking portion.

24. A recording medium driving apparatus according to claim 23, wherein a slide cam member for moving said driving unit is provided on a side portion of said main chassis;

said locking pin is provided on said slide cam member; and said engaging opening is provided in a sidewall of said frame member that opposes said slide cam member.

25. A recording medium driving apparatus for a disk-shaped first medium not housed in a cartridge case and a second formed of a disk housed in a cartridge case, said first and second media being retained at two vertically shifted positions in a frame member while vertically overlapping with each other at least partly, and information being recorded and/or reproduced on and/or from said first and second media by using a common optical pickup, said recording medium driving apparatus comprising:

a driving unit which is provided so that it can be moved horizontally and vertically in said frame member and on which at least said optical pickup and a transporting mechanism for transporting said optical pickup are mounted; and a holder which is provided so that it can be moved vertically in said frame member and which retains said second medium inserted in said frame member;

wherein said driving unit and said holder are respectively moved vertically at positions where said driving unit and said holder do not vertically overlap so as to allow the relative vertical positions of said driving unit and said holder to be reversed, and horizontal movement of said driving unit causes said driving unit to overlap at least a part of said holder at one side or the other side of said holder in a vertical direction; and information is recorded and/or reproduced to/from said first medium at a first position where said driving unit overlaps said holder at one side of said holder, while information is recorded and/or reproduced to and/or from said second medium at a second position where said driving unit overlaps said holder at the other side of said holder.

26. A recording medium driving apparatus for a disk-shaped first medium not housed in a cartridge case and a second medium formed of a disk housed in a cartridge case, said first and second media being retained at two vertically shifted positions in a frame member, and information being recorded and/or reproduced on and/or from said first and second media by using the same optical pickup, said recording medium driving apparatus comprising:

a frame member in which insertion slots through which said media are inserted or ejected are formed;

detecting means for detecting said media inserted through said insertion slots;

a carrying mechanism for carrying said media into said frame member on the basis of a detection output of said detecting means;

a main chassis elastically and movably supported inside said frame member via an elastic member;

a locking mechanism for locking or unlocking said main chassis to or from said frame member; and a driving unit on which at least said optical pickup and a transporting mechanism for transporting said optical pickup are mounted, and which is supported by said main chassis so that it can be moved between a position where recording and/or reproduction to and/or from said first medium is performed and a position where recording and/or reproduction to and/or from said second medium is performed;

wherein said main chassis is unlocked by said locking mechanism when recording and/or reproducing to and/or from one of said first and second medium is performed; and said main chassis is locked by said locking mechanism and the other medium is carried into said frame. member by said carrying mechanism when said detecting means detects that the other medium has been inserted through said insertion slot in said unlocked state.

* * * * *